(12) United States Patent
Montlary et al.

(10) Patent No.: US 12,189,643 B1
(45) Date of Patent: Jan. 7, 2025

(54) PROVIDING USER-CENTRIC DATA FEEDS VIA NON-PERSONALIZED DEVICES

(71) Applicant: C/HCA, INC., Nashville, TN (US)

(72) Inventors: Aaron Montlary, Nashville, TN (US); Bob Rochford, Nashville, TN (US); Timothy Cook, Waddell, AZ (US); Susannah Harris, Nashville, TN (US); Annabaker Garber, Nashville, TN (US); Adam Hedges, Nashville, TN (US); Casey Perkins, Mt. Juliet, TN (US); Paige Simpson, Franklin, TN (US)

(73) Assignee: C/HCA, Inc., Nashville, TN (US)

( * ) Notice: Subject to any disclaimer, the term of this patent is extended or adjusted under 35 U.S.C. 154(b) by 104 days.

(21) Appl. No.: 17/523,190

(22) Filed: Nov. 10, 2021

Related U.S. Application Data

(60) Provisional application No. 63/113,025, filed on Nov. 12, 2020.

(51) Int. Cl.
*G06F 16/248* (2019.01)
*G06F 16/27* (2019.01)

(52) U.S. Cl.
CPC ............ *G06F 16/248* (2019.01); *G06F 16/27* (2019.01)

(58) Field of Classification Search
CPC ...... G06F 16/248; G06F 16/27; H04W 28/00; H04W 12/033; H04W 40/24; H04W 16/00; H04W 12/009; G16H 40/20; G16H 40/06; G16H 10/65; G16H 20/13; G16H 20/10; G16H 40/63; G16H 50/70; G16H 20/40; G16H 80/00
See application file for complete search history.

(56) References Cited

U.S. PATENT DOCUMENTS

| | | | |
|---|---|---|---|
| 9,805,163 B1 * | 10/2017 | Panch | G16H 10/60 |
| 9,880,881 B1 | 1/2018 | Perez et al. | |
| 10,303,519 B1 | 5/2019 | Perez et al. | |
| 10,652,164 B2 | 5/2020 | Garcia et al. | |
| 10,817,342 B1 | 10/2020 | Perez et al. | |
| 11,201,835 B1 | 12/2021 | Roberts et al. | |

(Continued)

OTHER PUBLICATIONS

U.S. Appl. No. 18/176,314, filed Feb. 28, 2023, Notice of Allowance mailed Feb. 15, 2024, all pages.

*Primary Examiner* — Albert M Phillips, III
*Assistant Examiner* — Fatima P Mina
(74) *Attorney, Agent, or Firm* — Polsinelli PC; Kory D. Christensen

(57) ABSTRACT

Techniques are disclosed for providing a data feed, associated with a servicing of a particular user, to a device assigned to a particular location within a service facility for presentation of the data feed to a display at the particular location. In one example, the techniques include a system receiving a request from the device for the data feed, the request being independent of the particular user being serviced at the particular location. The system may determine that the particular user is being serviced at the particular location, and then retrieve first data and second data associated with the user, respectively from a first and second data source of a plurality of data sources. The system may then generate the data feed including at least the first data and the second data, and provide the data feed to the device for presentation at the display at the particular location.

19 Claims, 25 Drawing Sheets

(56) References Cited

U.S. PATENT DOCUMENTS

| | | |
|---|---|---|
| 11,283,690 B1 | 3/2022 | Mosier et al. |
| 11,283,726 B1 | 3/2022 | Houston et al. |
| 11,317,292 B1 | 4/2022 | Feldmann et al. |
| 11,381,506 B1 | 7/2022 | Jindal et al. |
| 11,422,830 B1 | 8/2022 | Hefley |
| 11,595,320 B1 | 2/2023 | Gregg et al. |
| 2007/0194939 A1* | 8/2007 | Alvarez ................. A61B 5/411 348/E7.086 |
| 2008/0155386 A1 | 6/2008 | Jensen |
| 2012/0303827 A1 | 11/2012 | Neystadt et al. |
| 2014/0180711 A1* | 6/2014 | Kamen ................. G06Q 10/10 705/2 |
| 2016/0094410 A1 | 3/2016 | Anwar et al. |
| 2017/0063826 A1* | 3/2017 | Sundaresan ............. H04W 4/70 |
| 2017/0308648 A1* | 10/2017 | Clarke .................. G16H 10/60 |
| 2017/0310605 A1 | 10/2017 | Garcia et al. |
| 2017/0366558 A1* | 12/2017 | Liu ...................... H04L 63/123 |
| 2018/0330115 A1* | 11/2018 | Felton ................. G06F 21/6245 |
| 2019/0133445 A1* | 5/2019 | Eteminan ............... A61B 5/1112 |
| 2019/0174319 A1* | 6/2019 | Backholm ........... H04L 63/0281 |
| 2020/0296053 A1 | 9/2020 | Garcia et al. |
| 2020/0320178 A1* | 10/2020 | Gallagher ............. H04L 9/3263 |
| 2020/0333153 A1* | 10/2020 | Furuichi ............ G01C 21/3484 |
| 2021/0168455 A1* | 6/2021 | Campbell ............. H04W 12/03 |
| 2021/0224634 A1* | 7/2021 | Chen ................. G01R 33/5608 |
| 2022/0385581 A1 | 12/2022 | Delos Reyes et al. |

* cited by examiner

Understanding Heart Rate

Your heart beats approximately 1,000,000 times per day, accelerating and slowing through periods of rest and exertion. Your heart rate refers to how many times your heartbeats per minute and can be an indicator of your cardiovascular health.

Please ask your primary nurse if you have any questions regarding your heart rate.

♥ Heart Rate

Latest  61 bpm

60 — 75 — 61
9am  12pm  3pm

Return to previous screen

FIG. 16

PROVIDING USER-CENTRIC DATA FEEDS VIA NON-PERSONALIZED DEVICES

CROSS-REFERENCE TO RELATED APPLICATION

This application claims the benefit of and priority to U.S. Provisional Application No. 63/113,025, filed Nov. 12, 2020, which is hereby incorporated by reference in its entirety for all purposes.

BACKGROUND

This specification relates in general to managing inbound and outbound messages in a network environment and, but not by way of limitation, to managing generation of tailored messages.

The amount of data generated each day continues to grow. In some environments, some of this data may be stored, while a majority of it may be evaluated and abandoned or ignored. Users and computing devices are beginning to rely more and on this data to make decisions. This may be especially true when the data is introduced as part of an operational flow. However, the time required to sort through stored data can create inefficiencies and the fact that other data may typically be ignored or abandoned may create undesirable outcomes.

SUMMARY

Exemplary embodiments of the description provide systems and methods for providing a unified data feed to a computing device for presentation via a display that is communicatively connected to the computing device. The unified data feed may be personalized for a particular user that is being serviced at a particular location (e.g., a room in a facility), whereby the computing device is associated with the particular location. In some embodiments, a computer system may facilitate determining an identity of the particular user being serviced at the particular location, coordinate retrieving and/or generating data for inclusion within the unified data feed (e.g., based on the identity of the particular user), and then provide the unified data feed to the computing device for presentation.

According to an aspect of the disclosure, a system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a computer-implemented method. The computer-implemented method also includes maintaining, by a computer system, an association between a device identifier of a computing device and a location identifier of a particular location of a service facility, the computing device being assigned to the particular location of the service facility and communicatively connected to a display at the particular location. The method also includes receiving, by the computer system, a request from the computing device for a unified data feed, the request being independent of a particular user presently being serviced at the particular location and including a device identifier of the computing device. The method also includes retrieving, by the computer system from a user processing service, a user identifier that identifies a user that is currently being serviced at the particular location, the user processing service storing real-time data that associates the user currently being serviced with the location identifier. The method also includes determining, by the computer system, that the particular user is the user presently being serviced at the particular location. The method also includes retrieving, by the computer system, first data and second data associated with the servicing of the particular user, respectively from a first data source and a second data source of a plurality of data sources, the first data source being distinct from the second data source, the plurality of data sources including at least one of: (i) a dietary data service, (ii) a real-time location system (RTLS) service, (iii) a user data service, (iv) a user education content service, or (v) an entertainment content service. The method also includes generating, by the computer system, a unified data feed that includes at least the first data and the second data, the unified data feed including parameters for formatting and presenting a home screen on the display, the home screen displaying at least one of (i) content derived from the first data or the second data, or (ii) a selectable element that is associated with displaying additional content associated with the first data or the second data. The method also includes providing, by the computer system, the unified data feed to the computing device for presentation of the home screen at the display at the particular location. Other embodiments of this aspect include corresponding computer systems, apparatus, and computer programs recorded on one or more computer storage devices, each configured to perform the actions of the methods.

Implementations may include one or more of the following features. The computer-implemented method may include: determining, by a user classification model of the computer system, a user classification of the particular user, the user classification determined based at least in part on at least one of: (i) a user record of the particular user or (ii) previous interactions by the particular user with the computer system, and where the unified data feed is generated based at least in part on the user classification, the user classification indicating at least one of: (i) a graphical user interface (GUI) customization according to a user type of the particular user or (ii) a particular data content that is relevant for the particular user. The user classification model may include a machine learning model, the machine learning model being trained based at least in part on: (i) user data of a plurality of users, the service facility being one of a plurality of units, and (ii) previous interactions with the computer system by each of the plurality of users. The home screen displays content based at least in part on the predetermined time interval. The computer-implemented method may include: receiving, by the computer system, a message from the computing device, the message corresponding to an interaction by the particular user with the content presented at the display, the interaction corresponding to at least one of: (i) an acknowledgment by the particular user that they have reviewed information associated with the discharge of the particular user, or (ii) a request by the particular user for follow-up service; updating, by the computer system, a user record of the particular user based at least in part on the message; and terminating, by the computer system, the unified data feed to the computing device based at least in part upon receiving a second indication from the user processing service indicating that the particular user has been discharged from the service facility. The computer-implemented method may include: receiving, by the computer system, traffic data, respectively, from one or more computing devices of a plurality of computing devices of the service facility, the plurality of computing devices including the computing device and respectively assigned to a particular unique location within the service facility, the respective traffic data associated with a data feed between the respective one or more computing devices and a third-party service; analyzing, by the computer system, the respective traffic data from each of the one or more computing devices to determine a respective level of quality of network service between the one or more computing devices and the third-party service; determining, by the computer system and based on analyzing the traffic data, a network traffic pattern, the network traffic pattern indicating that a portion of the one or more computing devices has a lower quality of network service compared to other computing devices of the one or more computing devices that interact with the third-party service; determining, by the computer system, the particular unique location for each computing device of the portion of the one or more computing devices within the service facility; determining, by the computer system, that the network traffic pattern of the portion of the one or more computing devices is localized to a particular region within the service facility based at least in part on the particular unique location for each computing device of the portion of the one or more computing devices; and transmitting, by the computer system, a message to a user device for presentation by the user device, the message providing instructions for performing maintenance service targeting the particular region of the service facility. Implementations of the described techniques may include hardware, a method or process, or computer software on a computer-accessible medium.

One general aspect includes a computer system. The computer system also includes a memory configured to store computer-executable instructions. The system also includes a processor configured to access the memory and execute the computer-executable instructions to at least: maintain an association between a device identifier of a computing device and a location identifier of a particular location of a service facility, the computing device being assigned to the particular location of the service facility and communicatively connected to a display at the particular location; receive a request from the computing device for a unified data feed, the request being independent of a particular user presently being serviced at the particular location and including a device identifier of the computing device; retrieve, from a user processing service, a user identifier that identifies a user that is currently being serviced at the particular location, the user processing service storing real-time data that associates the user currently being serviced with the location identifier; determine that the particular user is the user presently being serviced at the particular location; retrieve first data and second data associated with the servicing of the particular user, respectively from a first data source and a second data source of a plurality of data sources, the first data source being distinct from the second data source, the plurality of data sources including at least one of: (i) a dietary data service, (ii) a real-time location system (RTLS) service, (iii) a user data service, (iv) a user education content service, or (v) an entertainment content service; generate a unified data feed that includes at least the first data and the second data, the unified data feed including parameters for formatting and presenting a home screen on the display, the home screen displaying at least one of (i) content derived from the first data or the second data, or (ii) a selectable element that is associated with displaying additional content associated with the first data or the second data; and provide the unified data feed to the computing device for presentation of the home screen at the display at the particular location. Other embodiments of this aspect include corresponding computer systems, apparatus, and computer programs recorded on one or more computer storage devices, each configured to perform the actions of the methods.

Implementations may include one or more of the following features. The computer system where the processor is further configured to access the memory and execute additional instructions to, at least: receive an assignment instruction that includes (i) a device identifier for the computing device and (ii) a location identifier for the particular location within the service facility, the assignment instruction instructing the computer system to associate the computing device with the particular location; store an association between the computing device and the particular location; receive, by a headend device of the computer system from the computing device, a request for a token, the token being operable for subsequently verifying the computing device to receive a data feed at the particular location; determine, by the headend device, that the computing device is physically located within the service facility based at least in part on determining that the request was transmitted over a local network managed by the headend device and associated with the service facility; and provide the token to the computing device based at least in part on determining that the computing device is physically located within the service facility. The request includes a token and a device identifier of the computing device, the device identifier having been previously associated with the particular location, and where the processor is further configured to access the memory and execute additional instructions to, at least: verifying the token received from the computing device, where the unified data feed is provided to the computing device based at least in part on a successful verification. The processor is further configured to access the memory and execute additional instructions to, at least: receive a first indication of a trigger event occurrence, the trigger event occurrence associated with the servicing of the particular user at the particular location of the service facility; and transmit a second indication of the trigger event occurrence to the computing device assigned to the particular location, where the request is sent by the computing device to the computer system based at least in part on receiving the second indication of the trigger event occurrence. The particular location corresponds to a first location within the service facility, and where the processor is further configured to access the memory and execute additional instructions to, at least: receive a second request from user device previously verified by the computer system, the second request requesting to reassign the computing device from the first location to a second location within the service facility, the request including (i) a device identifier of the computing device that is obtained by the user device using an input sensor of the user device, and (ii) a second location identifier of the second location within the service facility; and store an association between the computing device and the second location based at least in part on determining that the user device is verified by the computer system. The processor is further configured to access the memory and execute additional instructions to, at least: generate, by a server device of the computer system, a new token based at least in part on determining that the user device is verified and that an original token should be updated based at least in part on the second location; and provide a response to the user device indicating that the computing device was successfully reassigned to the second location, the response including the new token for subsequent transmission by the user device to the computing device, the new token operable for subsequently verifying the computing device with the computer system to receive a data feed at the second location. The processor is further configured to access the memory and execute additional instructions to, at least: determine, by a user classification model of the computer system, a user classification of the particular user, the user classification determined based at least in part on at least one of: (i) a user record of the particular user or (ii) previous interactions by the particular user with the computer system, and where the unified data feed is generated based at least in part on the user classification, the user classification indicating at least one of: (i) a graphical user interface (GUI) customization according to a user type of the particular user or (ii) a particular data content that is relevant for the particular user. The processor is further configured to access the memory and execute additional instructions to, at least: receive first training data samples corresponding to a first subset of user data records of users of a plurality of service facilities affiliated with a service organization; train, in a first training round, the user classification model utilizing the first training data samples; receive second training data samples corresponding to a second subset of user data records of users of the service facility, the second subset being a subset of the first subset; and train, in a second training round, the user classification model utilizing the second training data samples. Implementations of the described techniques may include hardware, a method or process, or computer software on a computer-accessible medium.

One general aspect includes one or more non-transitory computer-readable storage devices may include computer-executable instructions that. The one or more non-transitory computer-readable storage devices also includes maintaining an association between a device identifier of a computing device and a location identifier of a particular location of a service facility, the computing device being assigned to the particular location of the service facility and communicatively connected to a display at the particular location. The devices also includes receiving a request from the computing device for a unified data feed, the request being independent of a particular user presently being serviced at the particular location and including a device identifier of the computing device. The devices also includes retrieving, from a user processing service, a user identifier that identifies a user that is currently being serviced at the particular location, the user processing service storing real-time data that associates the user currently being serviced with the location identifier. The devices also includes determining that the particular user is the user presently being serviced at the particular location. The devices also includes retrieving first data and second data associated with the servicing of the particular user, respectively from a first data source and a second data source of a plurality of data sources, the first data source being distinct from the second data source, the plurality of data sources including at least one of: (i) a dietary data service, (ii) a real-time location system (RTLS) service, (iii) a user data service, (iv) a user education content service, or (v) an entertainment content service. The devices also includes generating a unified data feed that includes at least the first data and the second data, the unified data feed including parameters for formatting and presenting a home screen on the display, the home screen displaying at least one of (i) content derived from the first data or the second data, or (ii) a selectable element that is associated with displaying additional content associated with the first data or the second data. The devices also includes providing the unified data feed to the computing device for presentation of the home screen at the display at the particular location. Other embodiments of this aspect include corresponding computer systems, apparatus, and computer programs recorded on one or more computer storage devices, each configured to perform the actions of the methods.

Implementations may include one or more of the following features. The one or more non-transitory computer-readable storage devices may include additional instructions that, when executed by the one or more computer systems, cause the one or more computer systems to perform additional operations may include: determining, by a user classification model of the computer system, a user classification of the particular user, the user classification determined based at least in part on at least one of: (i) a user record of the particular user or (ii) previous interactions by the particular user with the computer system, and where the unified data feed is generated based at least in part on the user classification, the user classification indicating at least one of: (i) a graphical user interface (GUI) customization according to a user type of the particular user or (ii) a particular data content that is relevant for the particular user. The user classification model may include a machine learning model, the machine learning model being trained based at least in part on: (i) user data of a plurality of users, the service facility being one of a plurality of units, and (ii) previous interactions with the computer system by each of the plurality of users. The home screen displays content based at least in part on the predetermined time interval. The one or more non-transitory computer-readable storage devices may include additional instructions that, when executed by the one or more computer systems, cause the one or more computer systems to perform additional operations may include: receiving a message from the computing device, the message corresponding to an interaction by the particular user with the content presented at the display, the interaction corresponding to at least one of: (i) an acknowledgment by the particular user that they have reviewed information associated with the discharge of the particular user, or (ii) a request by the particular user for follow-up service; updating a user record of the particular user based at least in part on the message; and terminating the unified data feed to the computing device based at least in part upon receiving a second indication from the user processing service indicating that the particular user has been discharged from the service facility. The one or more non-transitory computer-readable storage devices may include additional instructions that, when executed by the one or more computer systems, cause the one or more computer systems to perform additional operations may include: receiving an assignment instruction that includes (i) a device identifier for the computing device and (ii) a location identifier for the particular location within the service facility, the assignment instruction instructing the computer system to associate the computing device with the particular location; storing an association between the computing device and the particular location; receiving, by a headend device of the computer system from the computing device, a request for a token, the token being operable for subsequently authenticating the computing device to receive a data feed at the particular location; determining, by the headend device, that the computing device is physically located within the service facility based at least in part on determining that the request was transmitted over a local network managed by the headend device and associated with the service facility; and providing the token to the computing device based at least in part on determining that the computing device is physically located within the service facility.

Other objects, advantages, and novel features of the present description will become apparent from the following detailed description of the description when considered in conjunction with the accompanying drawings.

BRIEF DESCRIPTION OF THE DRAWINGS

Various examples in accordance with the present disclosure will be described with reference to the drawings, in which:

FIG. 16 illustrates another example graphical user interface for providing a unified data feed to a computing device, according to at least one example;

DETAILED DESCRIPTION

Figure 1:
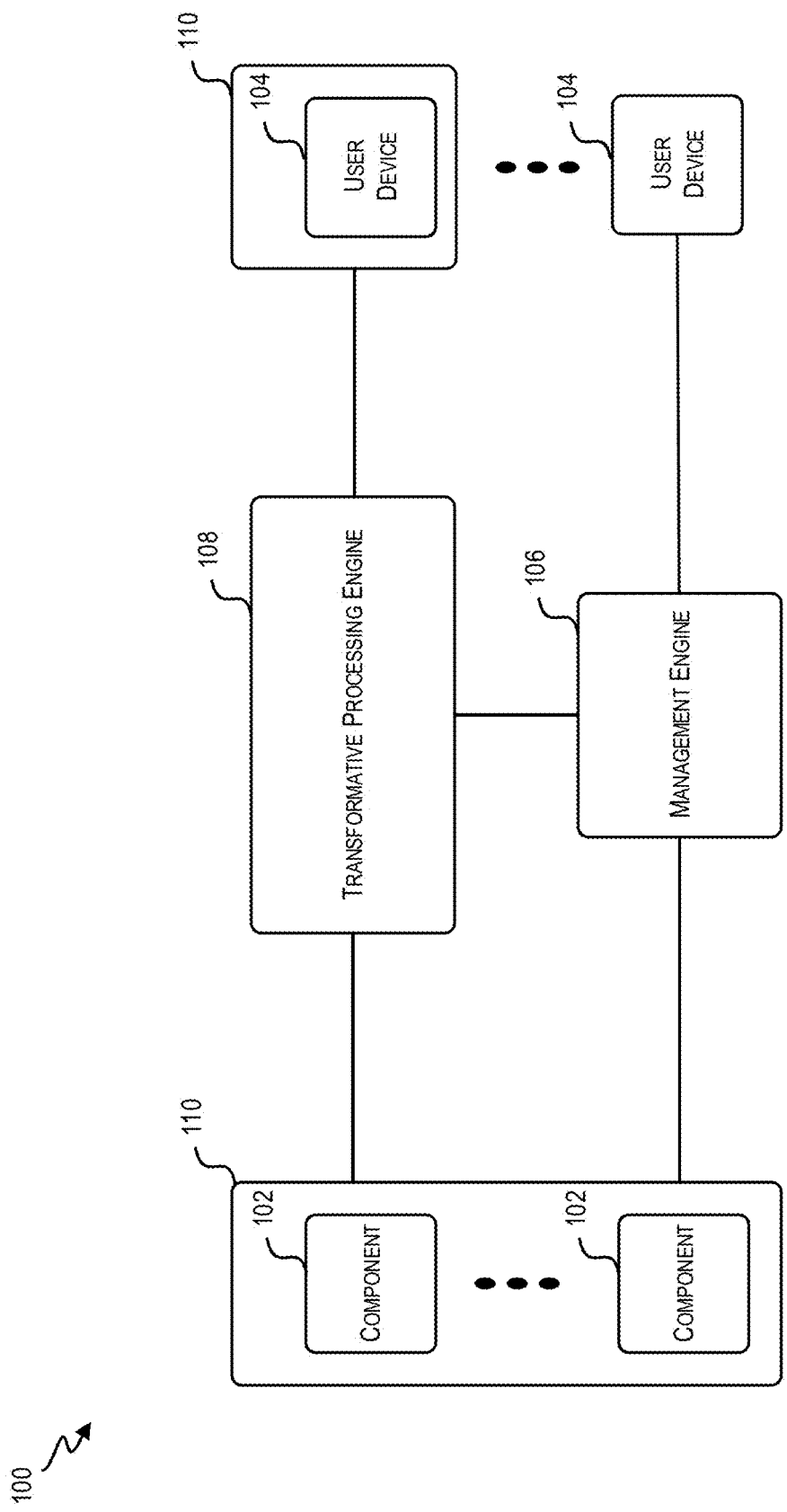
FIG. 1 is an example block diagram illustrating an computer system (e.g., a vision management system, described further herein) in which techniques relating to providing a unified data feed to a computing device may be implemented, according to at least one example.

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

Techniques are described herein for providing data feeds to different computing devices that are respectively assigned to particular locations within a service facility. Each computing device (e.g., a set-top box, smart TV device, etc.) may be communicatively connected to a display (e.g., a display monitor device) located at the respective particular location (e.g., a service room) to which the respective device is assigned. Upon a computing device receiving from a centralized computer system (e.g., a vision management system) a data feed that is associated with a particular user from a computer system, the computing device may present the data feed to the particular user for interaction via the display device.

In one example, a centralized computer system (which may be referred to herein as a "vision management system" or "VMS") may provide a data feed for presentation at a particular location (e.g., a service room) of a service facility, whereby a particular user is presently receiving service at the particular location. For clarity of illustration, the service facility may be one of a plurality of facilities of a service organization (e.g., an enterprise). The enterprise may include a plurality of divisions, and each division may include one or more service facilities. For example, the enterprise may geographically organized within the United States (U.S.), whereby there is a division per state, county, or the like. Each division may include one or more service facilities, for example, including clinics, labs, rehabilitation centers, home service agencies, and any other user service center where a user may receive service by a service provider. A service facility may contain one or more service units, and a given service unit may, itself, contain one or more service units. In one example, a service unit may correspond to a department within the service (e.g., an emergency department (ED), a surgery department, etc.). The given department may include one or more branches (e.g., a recovery room, a holding room, an operating room (OR), a waiting room, an emergency room (ER), etc.), each of which may be a service unit. Each branch may contain one or more beds, whereby a user may be assigned to a bed at a particular location for receiving service. For example, a user that has checked into the emergency department unit may be located within a private (e.g., and/or semi-isolated) room within a branch of the emergency department unit. The room that is presently assigned to the user may include a display device (e.g., a monitor), which enables the user (and/or a user service provider that provides service for the user) to interact with the display device (e.g., via a remote control device, mobile phone, etc.). The display device may be connected to a computing device (e.g., a set-top box, a smart TV device, etc.) that is physically located in and assigned to the user's room, whereby the computing device is connected over a network (e.g., the Internet) to the vision management system. In one example, the vision management system may correspond to a centralized server (e.g., part of a server cluster) in the cloud, on-premises at the service facility, or at any suitable remote or on-premises location. Upon receiving data (e.g., a unified data feed) from the vision management system, as described further herein, the computing device may present the data via the display device for interaction by the user and/or the one or more user service providers (USPs). In some cases, a USP may be an executive or administrator of the enterprise (e.g., at an enterprise level, division level, or service facility level). In some cases, the USP may be a clinician such as clinical nurse consultant (CNC), a user navigator, a user service coordinator, a floor nurse, a specialty nurse, a physician, or other type of service professional.

Continuing with the example above, and, turning to further details regarding the vision management system providing the data feed for presentation at a particular location, the vision management system may receive a request from the computing device (e.g., a set-top box) for a unified data feed. The set-top box may have been previously assigned to a particular location (e.g., a private room within the emergency room unit, suitable for servicing a single user) and communicatively connected to a display at the particular location. Although the set-top box may be assigned to the particular location of the service facility, the set-top box may not contain (e.g., store on disk or in memory) any information about a particular user that is currently (or previously) checked in for servicing (e.g., to receive service) at the particular location. Accordingly, the request from the set-top box to the vision management system may be independent of (e.g., not include) any information about the particular user presently checked in at the particular location. Upon receiving the request, the vision management system may determine that the particular user is presently being serviced at the particular location. For example, the vision management system may include and/or be connected to a server device that maintains one or more Electronic Service Record (EMR) system(s). The server device may include real-time information about a user, for example, including whether a user has been admitted, discharged, or transferred from a particular room. The EMR system may also include other suitable information regarding service of the user (e.g., past service history, user vital statistics and/or other user personal information, USPs involved in treating the user for ongoing conditions, etc.). It should be understood that a given location may be utilized for servicing multiple users throughout a period (e.g., interval) of time. For example, a user A may be admitted to a room within the ED at 8:00 AM, receive service from 8:00 until 11:00 AM, and then be discharged. Then, another user B (e.g., who was waiting in the waiting room) may subsequently be admitted to the same room (e.g., at 11:15 AM, allowing time for preparing the room for the next user) for receiving service, be subsequently discharged at 3:00 PM, and so on. Accordingly, the vision management system may receive real-time data from the EMR system (e.g., Health Level 7 (HL7) Admission Discharge Transfer (ADT) messages) that indicates that, at a given time, the particular user is assigned (e.g., checked in) to the particular location for receiving service. In some embodiments, "real-time" data may correspond to data that is available for processing (e.g., presentation) within a small period of time (e.g., milliseconds, one second, five seconds, thirty seconds, etc.) from the occurrence of a corresponding event (e.g., being checked in, discharged, the user's record being updated, etc.). The vision management system may then retrieve data from one or more data sources associated with the servicing of the particular user. For example, consider a scenario in which the set-top box (i.e., located in the room in which the user is currently admitted) is enabled to present on the display different kinds of data (e.g., information) and/or interact with the user in different ways. For example, the set-top box may enable the user to view cable television (TV) or a movie, visualize health statistics (e.g., real time blood pressure, heart rate, temperature), view the user's service schedule for the day (e.g., assuming a longer-term service plan), view one or more educational videos associated with the user's current condition, order food from the service facility, view image collections that are suited to the user's personal preferences, etc. In some cases, the data that is associated with each of these use cases may be obtained from different service providers. For example, the cable television may correspond to a TV feed that is received from a server of a third-party cable service provider, while the user health statistics may be obtained (e.g., in real-time) from another server (e.g., an internal server) affiliated with the service facility. The vision management system may determine, for the given user presently admitted to the location, which data sources to retrieve data from. As described further herein, the vision management system may also determine what type of customized data should be obtained from the one or more data sources, according to a user persona (e.g., a user profile). In one example, the vision management system retrieves first data (e.g., a cable TV channel feed, corresponding to a stream of bits) from a first data source (e.g., a cable TV provider). The vision management system also retrieves second data (e.g., a data feed including real-time vital statistics of the user) from a second data source (e.g., an internal server of the service facility). In some embodiments a "data feed" may correspond to any suitable mechanism for transmitting data over a network (e.g., one or more data packets). The vision management system may then generate a unified data feed that includes at least the first data and the second data. In some embodiments described herein, a "unified data feed" may correspond to a mechanism (e.g., a stream of bits) that enables a computing device (e.g., a set-top box) to present data (e.g., including individual data feeds and/or data packets), received from one or more data sources, in a unified manner for interaction by a user. Using the above example, the unified data feed may include a first data feed, corresponding to the cable TV stream of bits, and a second data feed, corresponding to a real-time stream of bits including the user's vital statistics. In some embodiments, the unified data feed may include structured data (and/or instructions for displaying the different data streams) in a unified presentation via the display (e.g., overlaying and/or fitting different contents on the display screen). Upon generating the unified data feed, the vision management system may provide the unified data feed to the set-top box for presentation at the display (e.g., a monitor beside the user's bed) at the particular location (e.g., the room where the user is admitted). In some embodiments, the one or more streams may be presented by the computing device via the display in real-time (e.g., available for simultaneous display). In this way, the vision management system may provide relevant (e.g., user-centric) data to a non-personalized computing device for interaction by a particular user that is presently admitted, even though the computing device may not store any user-specific information.

In another example, a vision management system may provide a customized data feed for presentation to a particular user based on a user profile (e.g., a user persona). For example, the vision management system may receive a request from a computing device (e.g., a set-top box) for a unified data feed, whereby the computing device is previously assigned to a particular location (e.g., a service room) of a service facility. Similar to as described above, the computing device may also be communicatively connected to a display at the particular location. The vision management system may determine (e.g., by querying an EMR system or other suitable data source) that the particular user is assigned to the particular location at a particular time the request was received, for example, based at least in part on a device identifier (e.g., a media access control (MAC) address, or other unique identifier) of the computing device included in the request. For example, the vision management system may query the EMR system to determine which user is currently checked into the room that is associated with the device identifier. Upon determining that the particular user is currently admitted to the particular location, the vision management system may determine a user profile for the particular user. In one example, the user profile may include various information that indicates what content should be included in the unified data feed and/or how the content should be presented on the display. For example, a user profile may indicate a persona of the user (e.g., "Child," "Technology Enthusiast," "Travel Enthusiast," etc.). This persona information may be determined based on one or more factors, including, but not limited to: a user record of the particular user (e.g., including previous service history, user preferences, personal information about the user), previous interactions by the particular user with the vision management system, etc. The previous interactions may correspond to content that the user has selected for viewing (e.g., during a previous admission or present admission), input to select a particular display preference, etc. Based on a given persona, the vision management system may update the user profile to determine one or more contents that should be displayed. This may correspond to, for example, a home screen wallpaper, a background music, a customized list of favorite TV channels, a list of recommended meals based on the user's previous selections, a list of recommended educational video content for viewing, etc. It should be understood that, although the computing device may receive input from the user that is subsequently transmitted to and used by the vision management system to determine the user persona and/or user profile, the computing device may not store any user personal information to a local storage of the computing device. In at least this way, user privacy may be preserved. Continuing with the above example, upon determining the user profile for the particular user, the vision management system may generate a unified data feed, similar to as described above. For example, the vision management system may determine which data sources to retrieve data from, based in part on the user profile. The vision management system may then provide the unified data feed to the computing device for presentation at the display at the particular location.

In some embodiments, the user profile described above may be determined based in part on predefined user personas. For example, an administrator may determine a set of user personas that represent a majority of users that receive service at the facility. In some embodiments, the personas may be associated with different departments and/or facilities within the service organization. For example, an obstetrics department within a service facility in Nebraska may generally have a different type of users than an orthopedics department within another service facility in New York, or a pediatrics department within a service in Hawaii. For example, users may be interested in viewing different types of educational content, depending in part on what they are being treated for. In some embodiments, the user profile may be determined based at least in part on a machine learning model. The machine learning model (e.g., a neural network, decision tree, etc.) may be trained based at least in part on user data of a plurality of users of a service organization and/or previous interactions with the vision management system by each of the plurality of users. For example, a neural network may receive a training sample input for a user, including one or more features (e.g., the user's age, sex, diagnosis code, admitted department, notes from previous interactions with the user, etc.). The neural network also receives a training label for the user, indicating verified (i.e., "ground truth") preferences of the user when interacting with the vision management system. The neural network may then be trained to assign different weights to features, and ultimately be trained to predict one or more types of content that should be presented to the user within a unified data feed. These predictions may be used to generate a user persona and/or user profile. In this way, embodiments, may enable users to received data feeds that are customized to individual preferences.

In another example, a vision management system may facilitate discharge of a particular user currently admitted to a particular location (e.g., a user room) within a service facility. For example, the vision management system may receive a message (e.g., from an EMR system) indicating that a particular user receiving service at a particular location of a service facility will likely be discharged within a predetermined time interval. For example, the user may have been admitted for a hand wound. The attending physician may have ordered tests, analyzed the results of the tests, and determined that the user may safely recover at home. The physician may update a service record of the user. The vision management system may receive a real-time indication of the update to the user's service record, and determine that the user is likely to be released within the next hour (e.g., due to the low severity of the condition). The vision management system may then transmit a message to a computing device assigned to the room in which the user is admitted. The message may indicate that the particular user will likely be discharged within the predetermined time interval. The vision management system may then receive a request from the computing device for a unified data feed associated with facilitating discharge of the particular user from the service facility. In some embodiments, by having the vision management system first notify the computing device of the upcoming discharge event, and then having the computing device request to receive an updated data feed, the amount of network traffic is reduced. For example, the computing device does not have to poll the vision management system continuously to determine if an update to the data feed is available. Instead, the vision management system may notify the computing device of an update, and then the computing device can request the update from the vision management system. Continuing with the example above, the vision management system may transmit discharge data included within the unified data feed to the computing device for presentation at a display at the particular location. The vision management system may subsequently receive a message from the computing device that corresponds to an interaction by the particular user with the discharge data that is presented at the display. For example, the computing device may have received input from the user that acknowledges that they have reviewed discharge information (e.g., financial information, discharge forms, etc.). In another example, the user may have authorized a payment. In yet another example, the user may have requested to schedule a follow up appointment, receive additional educational information for post-discharge viewing, pick up medicine from a local pharmacy, etc. It should be understood that the user may interact with the display (and thus, the vision management system, via the computing device) in any suitable manner (e.g., remote control input, voice commands, clicking/scrolling through pages on the screen, etc.). The data feed may be continuously updated as the user interacts with the system. The vision management system may update the user record (and/or perform other appropriate actions) based in part on receiving input from the user. For example, the vision management system may schedule a follow up appointment for the user or make available additional content for the user to view on their personal user device at home, following discharge. When the user is finally discharged from the room, the vision management system may receive a real-time indication (e.g., from the EMR system) that the user has been discharged. The vision management system may then terminate the data feed based on the indication. In this way, the vision management system may ensure that user-specific information is displayed on the device only as long as the particular user is admitted to the particular room, thus ensuring more robust user privacy. It should be understood that a user may interact with a vision management system at any suitable time, for example, pre-admission, pre-discharge, post-discharge (from a user device at home), etc. In some embodiments, a vision management system may update the user profile based on user (e.g., user) interactions with the vision management system at any time.

In another example, the vision management system may enable better management of a plurality of data feeds to respective computing devices within a service facility. For example, consider a scenario in which a service facility has a plurality of rooms, each room having a computing device connected to a display for visualization by an admitted user. Although for clarity of illustration, embodiments described herein may typically describe rooms with a single user being admitted, embodiments should not be construed to be so limiting. For example, multiple beds may be included within a single larger room, and each bed may attached to a display monitor, which in turn is connected to a respective computing device. In this scenario, the vision management system may not only provide a unified data feed (e.g., gather data from one or more sources, and then providing the unified data feed to a computing device), but also the vision management system may facilitate connections between computing devices that connect directly to a third-party service. For example, a subset of the computing devices of the service facility may request from the vision management system to receive respective data feeds from a third-party service (e.g., a provider of educational videos). The vision management system may then facilitate (e.g., direct) each computing device to the third-party service to receive the data feed. The vision management system may thus receive (e.g., monitor) and collect traffic data between each computing device and the third-party service. The vision management system may then analyze the respective traffic data from each of the subset of devices to determine a respective level of quality of network service between the devices and the third-party service. For example, the traffic data may indicate a throughput speed, latency, or other relevant network metric. The vision management system may then determine a network traffic pattern based on the analysis. In one example, the network traffic pattern may indicate that a portion of the subset of devices connecting to the third-party service are having network problems. Because each device may be assigned to a particular location (e.g., via a geographical and/or logical sub-division), the vision management system may utilize this assignment information to determine whether the portion is localized to a particular region (and/or sub-division) within the service facility. For example, the vision management system may determine that a particular floor of the facility is having a network outage. In another example, the vision management system may determine that a subset of rooms of the emergency department experience low throughput. The vision management system may then transmit a message to a user device (e.g., of a network administrator), for example, providing instructions to perform maintenance service targeting a particular region of the service facility. Accordingly, by operating as a centralized service, the vision management system may consolidate analysis and reporting of traffic associated with various computing devices in a facility. This applies not only to network traffic between computing devices and internal services of the service organization (e.g., real-time user vital statistics), but also network traffic involving third-party services (e.g., video streaming services). Also, because each computing device may be assigned to a particular known location, the vision management system may perform enhanced tracking and analysis to pinpoint the location and/or root cause of any network problems.

In another example, a vision management system may assign a computing device (e.g., a set-top box) to a particular location within a service facility and provide a token to the computing device. In some embodiments, the vision management system may receive an assignment instruction that includes a device identifier of the computing device (e.g., a serial number or MAC address) and a location identifier for the particular location within the service facility. For example, the location identifier may correspond to a particular room and/or location within a room of a service (e.g., 'Room 1234'). In some embodiments, the assignment instruction may be received by the vision management system from any suitable device (e.g., directly from the computing device or another user device (e.g., a mobile device) on behalf of the computing device). In a case where the assignment instruction is sent directly from the computing device, the computing device may have been previously authenticated by the vision management system. For example, a technician may have logged onto the computing device and initiated a request to assign the device to the particular room. In a case where the assignment instruction is sent by a user device on behalf of the computing device, the user device may have previously authenticated itself to the vision management system. The user device may also have authenticated itself to the computing device, for example, to obtain a device identifier of the computing device. In any case, upon obtaining the assignment instruction, the vision management system may store an association between the computing device and particular location (e.g., in a database of the vision management system). In some embodiments, the vision management system may then proceed to provision a token to the computing device, whereby the token may be subsequently used by the computing device to authenticate the computing device for receiving a data feed from the vision management system at the particular location. In one embodiment, a headend device of the vision management system may be physically located on a local network of the particular service facility. The headend device may receive a request from the computing device for a token. The headend device may then determine that the computing device is physically located within the service facility based at least in part on determining that the request was transmitted over the local network managed (e.g., monitored) by the headend device and associated with the service facility. The headend device may verify (e.g., authenticate) that the computing device should receive a token in part on determining that the computing device is physically present within the service facility and on the local network. The headend device of the vision management system may then generate and provide a token to the computing device for subsequent use by the computing device to receive a data feed.

In another example involving provisioning a token to a computing device, a user device may request a token from a vision management system on behalf of a computing device, and then transfer the token received from the vision management system to the computing device for subsequent use. For example, consider an earlier example, whereby a mobile phone authenticates itself to the computing device and to the vision management system. For example, the mobile phone may be physically near the computing device and use a suitable network protocol(s) to communicate and/or authenticate itself with the computing device (e.g., Multi-Peer connectivity, Wi-Fi, Bluetooth, etc.). Since data received from the mobile phone (e.g., via a trusted mobile phone application) is also trusted by the vision management system, the vision management system (and/or an identity management service affiliated with the vision management system) may generate a token based in part on the request received from the authenticated mobile device application. The vision management system may then provide the token to the mobile phone application, whereby the application transmits (e.g., via Multi-Peer connectivity) the token to the computing device. The computing device may then subsequently include the token in one or more subsequent requests to the vision management system for a data feed. It should be understood that, in either example of providing a token to a computing device (e.g., via a headend device or via an intermediary user device), the token may be independent of a particular user that is admitted to the particular location. For example, the token may authenticate the computing device to receive a data feed, but the contents of the data feed for a particular user may be determined by the vision management system based on real-time data received from one or more other sources (e.g., HL7 ADT messages received from an EMR system) and coordinated by the vision management system. In this way, computing devices may remain fungible (e.g., easily reassigned to different locations) and user privacy may be enhanced.

In another example, a vision management system may provide a data feed to a computing device at a particular location based in part on an authenticated token received from the device. In one example, consider a scenario in which a computing device (e.g., a set-top box, smart TV, etc.) has been provisioned with a token, as described above. The vision management system may then receive a request for a data feed from the computing device. The request may include a token and a device identifier of the computing device. In some embodiments, the vision management system may authenticate the token received from the computing device. For example, the token may be cryptographically generated (e.g., signed), and the vision management system (and/or an authorization server that is associated with the vision management system) may determine that the token was generated by an authentic key. Any suitable mechanism may be utilized to authenticate the token. Upon determining that the token is authentic, the vision management system may determine a particular user admitted to receive service at the particular location associated with a device identifier of the computing device (e.g., previously stored by the vision management system). Upon determining the particular user, the vision management system may retrieve data from one or more sources, as described above. The vision management system may then provide the data feed to the computing device for presentation.

In another example, a vision management system may update a data feed based on an occurrence of a trigger event. For example, the vision management system may receive an indication from a data source of an occurrence of a trigger event. The trigger event may correspond to any suitable event, including, but not limited to, an updated vital statistic of the user, a blood test result now available for viewing, the entrance of a USP into the room where the user is assigned, etc. In some embodiments, the vision management system may transmit an indication of the trigger event occurrence to a computing device at a particular location that is presently receiving the data feed from the vision management system. The computing device may subsequently transmit a request to the vision management system for an update to the data feed based in part on having received the indication of the trigger event occurrence. In some embodiments, the vision management system may directly provide the update to the computing device (e.g., if the trigger event occurs within a predetermined interval that follows a previous trigger event occurrence). It should be understood that any suitable push and/or pull mechanism (and/or combination thereof) may be utilized to provide an update to the data feed. Upon receiving the request for an update, the vision management system may retrieve the data associated with the trigger event occurrence, generate a corresponding update to the data feed, and provide the updated unified data feed to the computing device for presentation. In one example, the updated unified data feed may correspond to updating a home screen on a display to indicate that a new educational video is now available for viewing. In another example, the display may be updated, not only for the user's viewing consumption, but also for other USPs attending the user. For example, upon the vision management system determining a trigger event that the attending physician has entered the user's room, the vision management system may send an update to the computing device with information for the physician to analyze on the display (e.g., an X-Ray image, blood test results, etc.).

In another example, a vision management system may reassign a computing device to a new location of a service facility. In some examples, an intermediary user device (e.g., a mobile device) may facilitate the reassignment to a new location. For example, the vision management system may receive a request from a user device to reassign the computing device from a first location to a second location within a service organization (e.g., within the same facility). The user device may have previously authenticated itself to the vision management system and to the computing device. For example, an application executing on the user device may enable a user to enter credentials to access the computing device. Upon verifying the credentials, the computing device may present a Quick Response (QR) code on a display connected to the computing device. In some embodiments, the computing device may also (or alternatively) require credentials to be entered by another remote control at the particular location and paired with the display or the computing device. When the QR code is displayed, the user device may scan the QR code, which may embed a unique device identifier within the QR code. The user device may then also receive input (e.g., a second location identifier) that indicates the second location to which the computing device should be reassigned. The user device may then transmit both the unique device identifier (e.g., received via the QR code) and the second location identifier to the vision management system, whereby the vision management system may store a new association between the computing device and the second location. In some embodiments, the vision management system may also generate a new token for the computing device. For example, if the previous token had expired or otherwise was no longer valid, a new token may be generated. The vision management system may then provide a response to the user device indicating that the computing device was successfully reassigned to the second location. The response may also include the new token for subsequent transmission by the user device to the computing device, whereby the new token may be operable for subsequently authenticating the computing device with the vision management system to receive a data feed at the second location.

The present disclosure provides several technical advantages over existing solutions. For example, embodiments described herein enable a more efficient distribution of customized data feeds to a plurality of non-personalized devices throughout an organization. For example, a vision management system described herein may coordinate gathering data from multiple data sources and efficiently delivering customized user data to individual devices for presentation. Additionally, embodiments described herein ensure greater privacy controls by updating data in real-time. For example, a vision management system may determine when to initiate and/or terminate a data feed to a particular device based on real time updates (e.g., from an ADT message). In this way, computing devices in a facility may not store any user-specific data, while still being delivered timely data for visualization by the user that is currently admitted for service. In another advantage, embodiments enable a more efficient (and secure) mechanism for assigning and/or reassigning devices to particular locations. In a large organization with many devices, techniques described herein may improve the efficiency of deploying those devices. In yet another advantage, embodiments described herein may enable a vision management system to deliver highly customized (e.g., personalized) user data to be presented according to a user's preferences (e.g., based on a trained machine learning model), thus improving a user's overall experience at a service facility. For example, in some cases, a user of a service facility is limited in the ways they can interact with a GUI that is displayed by a computing device at a particular location where the user is being serviced. For example, in a case where a computing device at the particular location is non-personalized (e.g., not pre-assigned to a particular user), the computing device may typically display a GUI that is generally applicable to all users who may be serviced (e.g., in different time slots/appointments) at the particular location. Embodiments herein, however, provide a method for customizing the GUI per user, even though the computing device itself may not be pre-assigned to a particular user. For example, for a given time slot in which the user is being serviced at the particular location, the computing device may automatically display a different set of icons, arrange icons in a different ordering, provide a different home screen background, provide a customized data feed that is associated with known user preferences, and/or any suitable GUI customization tailored for the particular user.

Referring first to FIG. 1, a block diagram of an example of an interaction system 100 is illustrated. Generally, in interaction system 100, data can be generated at one or more system components 102 and/or user devices 104. Management engine 106 can manage the flow of communications within interaction system. Transformative processing engine 108 can receive, intercept, track, integrate, process, and/or store such data.

Data flowing in interaction system 100 can include a set of communications. Each of one, some of all communications can include (for example) an encoding type, authentication credential, indication of a content size, identifier of a source device, identifier of a destination device, identifier pertaining to content in the communication (e.g., an identifier of an entity), a processing or reporting instruction, a procedure specification, transmission time stamp, and/or sensor measurement. Data may, or may not, selectively pertain to a particular entity and/or client. Data can, depending on the implementation, include individually identifiable information and/or de-identified information as it pertains to an entity and/or client. Data may, but need not, include protected information.

For example, a system component 102 can include, for example, a sensor to detect a sensor measurement and can thereafter generate and transmit a communication that reflects the sensor measurement. The communication may be transmitted at routine times and/or upon detecting a threshold (e.g., one or more) number of measurements or a measurement satisfying a transmission condition (e.g., exceeding a threshold value). In some instances, the sensor measurement corresponds to one reflecting a property of an object or entity (e.g., person) near the sensor. The communication may then include an identifier of the object or entity. The identifier can be determined, for example, based on detection of a nearby electronic tag (e.g., RFID tag), a detected user input received at a user interface of component 102, and/or data in a corresponding communication received from a user device.

As another example, a user device 104 can be configured to detect input received at an interface of the device. The input can include, for example, an identifier of an object or entity, an instruction, a characterization of an object or entity, an identification of an assessment to be performed, a specification of an aggregation or data processing to be performed, and/or an identification of a destination for a data-analysis report. User device 104 can further be configured to detect input requesting particular data, to generate a request communication (e.g., to be sent to transformative processing engine), to receive the requested data and/or to present the received data.

The depicted engines, devices and/or components can communicate over one or more networks. A network of one or more networks can include a wired network (e.g., fiber, Ethernet, powerline ethernet, ethernet over coaxial cable, digital signal line (DSL), or the like), wireless network (e.g., Zigbee™, Bluetooth™, WiFi™, IR, UWB, WiFi-Direct, BLE, cellular, Long-Term Evolution (LTE), WiMax™, or the like), local area network, the Internet and/or a combination thereof. It will be appreciated that, while one or more components 102 and one or more user devices 104 are illustrated as communicating via transformative processing engine 108 and/or management engine 106, this specification is not so limited. For example, each of one or more components 102 may communicate with each of one or more user devices 104 directly via other or the same communication networks.

A component 102 can be configured to detect, process and/or receive data, such as environmental data, geophysical data, biometric data, chemical data (e.g., chemical composition or concentration analysis data), and/or network data. The data can be based on data detected, for example, via a sensor, received signal or user input. A user device 104 can include a device configured to receive data from a user and/or present data to a user. It will be appreciated that, in some instances, a component 102 is also a user device 104 and vice-versa. For example, a single device can be configured to detect sensor measurements, receive user input and present output.

A component 102 can be configured to generate a communication that is in one or more formats, some of which can be proprietary. For example, an imaging machine (e.g., one of one or more components 102) manufactured by company A, located within a first facility (e.g., facility 110), and belonging to a first client, may save and transfer data in a first format. An imaging machine (e.g., one of one or more components 102) manufactured by company B, located within the first facility (e.g., facility 110), and belonging to the first client, may save and transfer data in a second format. In some examples, data from certain components is transformed, translated, or otherwise adjusted to be recognizable by transformative processing engine 108. Thus, continuing with the example from above, when the imaging machines manufactured by companies A and B are located within the first facility belonging to the first client, they may nevertheless save and transfer data in different formats. In some examples, one or more components 102 communicate using a defined format.

In some examples, each of one or more components 102 are each associated with one or more clients within a same or different interaction systems. For example, certain ones of one or more components 102 may be associated with a first client, while other ones of one or more components 102 may be associated with a second client. Additionally, each of one or more components 102 may be associated with a facility 110 (e.g., client facility). Each facility 110 may correspond to a single location and/or focus. Exemplary types of facilities include server farm facilities, web-server facilities, data-storage facilities, telecommunication facilities, service facilities, and/or operational facilities. For example, a first facility may include a structure at a first location at which one or more resources (e.g., computational resources, equipment resources, laboratory resources, and/or human resources) are provided. Each of the one or more resources may be of a first type in a first set of types. A resource type can be identified based on, for example, a characteristic of the resource (e.g., sensor inclusion) and/or a capability of providing each of one or more services. Thus, for example, resources at a first facility may be better configured for handling a particular type of service requests compared to those in another facility. As another example, different facilities may include resources of similar or same types but may vary in terms of, for example, accessibility, location, etc.

Transmission of data from one or more components 102 to transformative processing engine 108 may be triggered by a variety of different events. For example, the data may be transmitted periodically, upon detection of an event (e.g., completion of an analysis or end of a procedure), upon detection of an event defined by a rule (e.g., a user-defined rule), upon receiving user input triggering the transmission, or upon receiving a data request from transformative processing engine 108. Each transmission can include, e.g., a single record pertaining to a single entity, object, procedure, or analysis or multiple records pertaining to multiple entities, objects, procedures, or analyses.

In some examples, at least some of one or more user devices 104 are associated with facility 110. In some examples, at least some of one or more user devices 104 need not be associated with facility 110 or any other facility. Similar to one or more components 102, one or more user devices 104 may be capable of receiving, generating, processing, and/or transmitting data. Examples of one or more user devices 104 include, for example, a computer, a mobile device, a smart phone, a laptop, an electronic badge, a set-top box, a thin client device, a tablet, a pager, and other similar user devices). One or more user devices 104 may be configured to run one or more applications developed for interacting with data collected by transformative processing engine 108. For example, those user devices of one or more user devices 104 that are not associated with facility 110 may be configured to run one or more third-party applications that may rely in part on the data gathered by transformative processing engine 108.

Each of one or more components 102 and one or more user devices 104 may be utilized by one or more users (not shown). Each of the one or more users may be associated with one or more clients. For example, one of the one or more users can be associated with a client as a result of being employed by the client, physically located at a location of the client, being an agent of the client, or receiving a service from the client.

In some examples, one or more components 102 and one or more user devices 104 may communicate with transformative processing engine 108 and management engine 106 via different information formats, different proprietary protocols, different encryption techniques, different languages, different machine languages, and the like. As will be discussed with reference to FIG. 2, transformative processing engine 108 is configured to receive these many different communications from one or more components 102, and in some examples from one or more user devices 104, in their native formats and transform them into any of one or more formats. The received and/or transformed communications can be transmitted to one or more other devices (e.g., management engine 106, an entity device, and/or a user device) and/or locally or remotely stored. In some examples, transformative processing engine 108 receives data in a particular format (e.g., the HL7 format) or conforming to any other suitable format and/or is configured to transform received data to conform to the particular format.

One or more components 102 of facility 110 can include and/or has access to a local or remote memory for storing generated data. In some examples, the data is stored by one or more servers local to facility 110. The record service can be granted access to the data generated and/or transmitted by one or more components 102. In some examples, the record service includes a server or a plurality of servers arranged in a cluster or the like. These server(s) of the record service can process and/or store data generated by one or more components 102. For example, one or more records can be generated for each entity (e.g., each record corresponding to a different entity or being shared across entities). Upon receiving a communication with data from a component (or facility), the record service can identify a corresponding record and update the record to include the data (or processed version thereof). In some examples, the record service provides data to transformative processing engine 108.

Irrespective of the type of facility, facility 110 may update data, maintain data, and communicate data to transformative processing engine 108. At least some of the data may be stored local to facility 110.

A user interacting with a user device 104 can include, for example, a client customer, client agent and/or a third party. A user may interact with user device 104 and/or component 102 so as to, for example, facilitate or initiate data collection (e.g., by a component 102), provide data, initiate transmission of a data request, access data and/or initiate transmission of a data-processing or data-storage instruction. In some instances, one or more user devices 104 may operate according to a private and/or proprietary network or protocols. In other examples, one or more user devices 104 may operate on public networks. In any case, however, transformative processing engine 108 can have access to the one or more components and can communicate with them via a public, private, and/or proprietary network or protocols. The use of one or more private and/or proprietary protocols can promote secure transfer of data.

Figure 2:
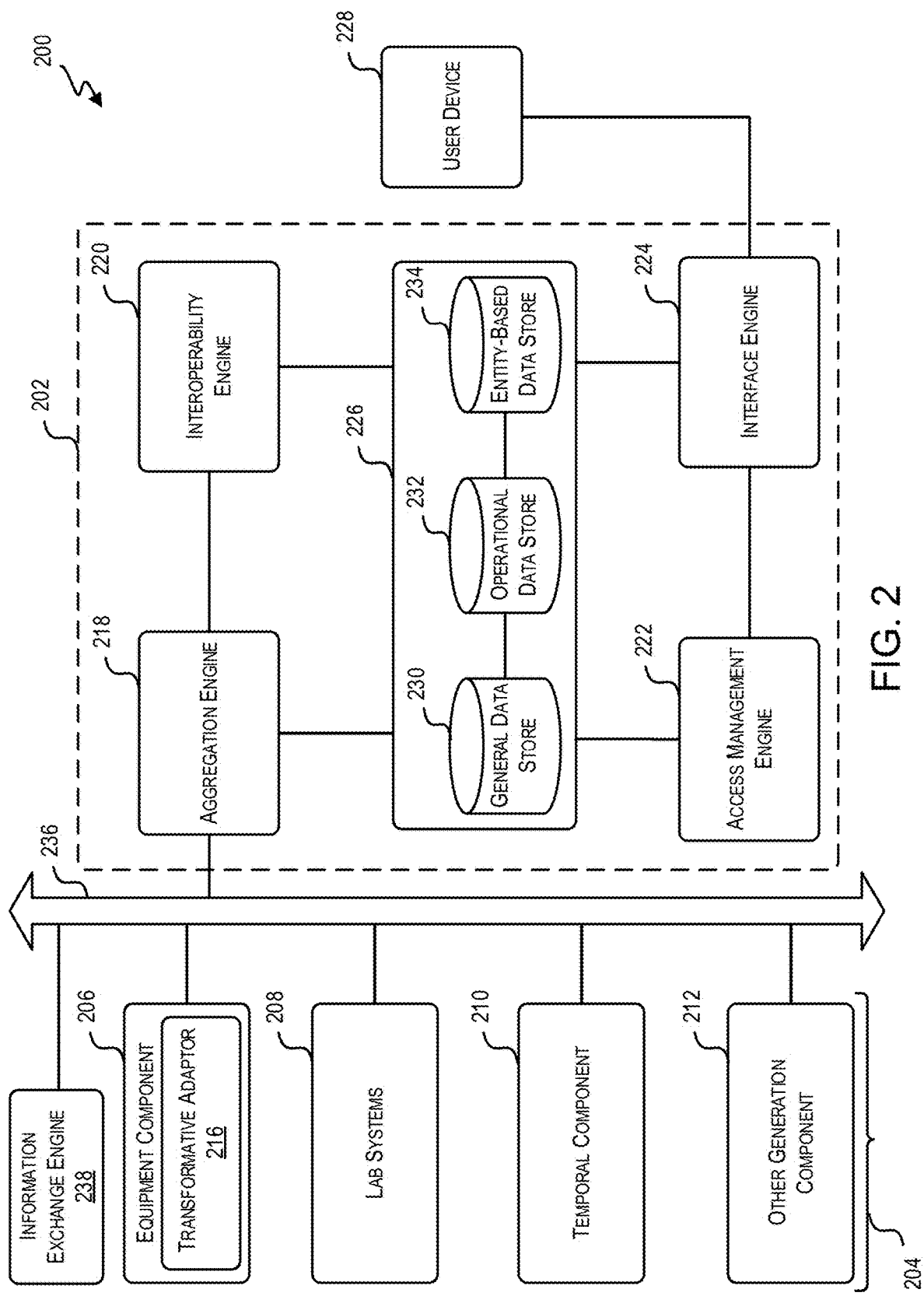
FIG. 2 is an example block diagram illustrating an interaction system in which techniques relating to providing a unified data feed to a computing device may be implemented, according to at least one example.

Referring next to FIG. 2, a block diagram of an example of an interaction system 200 is shown. Interaction system 200 includes a transformative processing engine 202. Transformative processing engine 202 is an example of transformative processing engine 108 discussed with reference to FIG. 1. Interaction system 200 also includes one or more generation components 204. In particular, one or more generation components 204 include an equipment component 206, a lab systems component 208, a temporal component 210, and other generation component 212. One or more generation components 204 are examples of one or more components 102 discussed with reference to FIG. 1. In some examples, the data may pass to the transformative processing engine 202 via an information exchange service bus 236 (e.g., an enterprise service bus). In some examples, only a portion of the is passed via the information exchange service bus 236, while other portions are passed directly to the transformative processing engine 202 without first passing over the information exchange service bus 236.

Generally, one or more generation components 204 includes any suitable device or system capable of generating data in the context of an interaction system. For example, the other generation component 212 may include a sensor on a door, and equipment component 206 may include a sophisticated computer-controlled laser device. In either case, each generation component generates some type of data. For example, the data provided by the sensor may be used to address security concerns or assessing heating, ventilating, and air conditioning (HVAC) costs for an institution. The data provided by the laser device may have been provided while engaged in a procedure and may then be used by other entities in the future to decide how to use the device.

As discussed in further detail herein, data generated by one or more generation components 204 can be of a variety of formats, some of which may be proprietary. For example, a single component can generate data in multiple formats, different components can generate data in different formats, and/or different component types can result in generation of data in different formats. In some instances, formatting of a data can depend on a service having been provided, a user initiating data generation, a destination to receive the data, a location at which a service was provided, etc. In some examples, a typical interaction system includes thousands of generation components producing data in hundreds of formats. In order to harness the power that comes from such a large amount of data to make informed decisions, it is desirable that all, or at least a large portion of the data, is shared. Use of transformative processing engine 202 in accordance with techniques described herein may achieve this design-making large amounts of data, in many different originating formats available to various types of users, via one or more interfaces. At least a portion of the data generated by the generation components 204 may be provided to the transformative processing engine 202. In some examples, each generation component 204 includes an agent that executes on the generation components 204 and determines which data to send to the transformative processing engine 202 and other engines described herein. In some examples, the generation components 204 provide data to the transformative processing engine 202 via a messaging bus (e.g., an information exchange service bus 236). The messaging bus, which may be included in the transformative processing engine 202 or separate, is able to see data that moves throughout the interaction system 200. The information exchange service bus 236 also includes a subscription registry that can be used to manage subscriptions to the information exchange service bus 236 for certain data (e.g., data having certain characteristics). The information exchange service bus 236 may send and/or direct data to certain other entities when appropriate as indicated by subscription records in the registry.

While one or more generation components 204 are illustrated adjacent to each other, it is understood that each may be located within one facility or that the components may be spread out among many facilities. In addition, in some examples, one or more generation components 204 belong to different clients.

Turning now to equipment component 206, this component includes any machine, contrivance, implant, or other similar related article, that is intended to aid in reaching a particular objective. In some instances, equipment component 206 includes one or more sensors to detect environmental or other stimuli. Equipment component 206 can include, for example, equipment to monitor a stimulus, detect stimulus changes, detect stimulus-indicative values, and so on. Exemplary equipment components 206 include an imaging device, a device that detects and characterizes electrical signals, a device that detects pressure, and/or a device that detects concentration of one or more particular elements, compounds and/or gases.

As illustrated, equipment component 206 includes transformative adaptor 216. In some examples, transformative adaptor 216 is a device that transforms, translates, converts, or otherwise adjusts output data from equipment component 206. For example, an equipment component 206 can be a scanner that outputs its results in format A, but the majority of other scanners in the interaction system output their results in format B. Transformative adaptor 216 may be implemented to convert or otherwise adjust the results in format A to conform closer to format B. For example, the conversion from format A to format B may be performed using a conversion rule, which may be user-define or learned. Transformative processing engine 202 may perform similar tasks as it relates to all data generated within interaction system 200. In this manner, transformative adaptor 216 can perform an initial step in the process of transformation, translation, conversion, or adjustment of the output of equipment component 206. In some examples, transformative adaptor 216 is implemented in hardware, software, or any suitable combination of both. In some examples, other transformative adaptors (not shown) may be implemented within others of one or more generation components 204. In some examples, equipment component 206 may not include transformative adaptor 216.

Lab systems component 208 includes any suitable laboratory equipment or system that is intended to analyze material, such as biological material. This includes, for example, laboratory equipment that analyzes biological samples; electric microscopes; ultracentrifuges; data collection devices, including Kymographs, sensors connected to a computer to collect data; monitoring devices; computers used to report results of lab tests, and other similar laboratory equipment. Each of the above-listed components generates data that is provided (directly or indirectly) to transformative processing engine 202.

Temporal component 210 may include any suitable computing devices used with respect to interaction system 200. For example, temporal component 210 can be configured to allocate a resource to a particular entity during a particular temporal window. Temporal component 210 can monitor a schedule for the resource and can identify one or more available temporal windows that may be secured by a particular entity. Upon receiving an indication, temporal component 210 may update a schedule of a resource to reflect that a particular temporal window is to be allocated for service of a particular entity.

Each of one or more generation components 204 and the user device 228 may include individual and/or shared storage systems, one or more processors, a user interface, a network connectivity device, and one or more ports. The storage system include memory that may be implemented, e.g., using magnetic storage media, flash memory, other semiconductor memory (e.g., DRAM, SRAM), or any other non-transitory storage medium, or a combination of media, and can include volatile and/or non-volatile media. The storage systems may also be configured to store computer-executable code or instructions for interacting with the user interface and/or for one or more applications programs, such as an application program for collecting data generated by the particular generation component.

The one or more processors may be configured to access the operating system and application programs stored within the storage systems, and may also be configured to execute such program code. The one or more processors can be implemented as one or more integrated circuits, e.g., one or more single-core or multi-core microprocessors or microcontrollers, examples of which are known in the art. In operation, the one or more processors can control the operation of the particular component. The one or more processors may access and execute the program code and at any given time.

The user interface can include any combination of input and output devices. In some instances, a user can operate input devices of the user interface to invoke the functionality of the particular component or user device. For example, the user interface may enable the user to view, hear, and/or otherwise experience output from component or user device via the output devices of the user interface. Examples of output devices include a display, speakers, and the like.

The network connectivity device may enable the component or user device to communicate with transformative processing engine 202 and other components or other user devices via one or more networks. The one or more networks may include any suitable combination of cable, cellular, radio, digital subscriber line, or any other suitable network, which may be wired and/or wireless. In some examples, the network connectivity device may enable the component or the user device to communicate wirelessly with various other components and/or transformative processing engine 202. For example, the components may include circuitry to enable data communication over a wireless medium, e.g., using near-field communication (NFC), Bluetooth Low Energy, Bluetooth® (a family of standards promulgated by Bluetooth SIG, Inc.), Zigbee, Wi-Fi (IEEE 802.11 family standards), or other protocols for wireless data communication.

The one or more ports may enable the component or the user device to receive data from one or more sensors. The sensors may be any suitable type of sensor to capture data. Such captured data may be shared with transformative processing engine 202 in accordance with techniques described herein. In some examples, the sensors may also be configured to detect the location and other details about the component or the user device. In some examples, the component and the user device may include global positioning chips that are configured to determine a geolocation.

Transformative processing engine 202 includes an aggregation engine 218, an interoperability engine 220, an access management engine 222, an interface engine 224, and a data store 226. Generally aggregation engine 218 is configured to collect data from multiple communications. The data may be from one or multiple generation components 204 and/or may be of same or different formats. Aggregation engine 218 may be configured to perform one or more operations on the collected data. For example, aggregation engine 218 may tag data, log data, perform protocol conversion, and may support one-to-many communications. The collection may be asynchronous. In some examples, the data has been saved locally in connection with one or more generation components 204 in many different formats having many different data structures.

Aggregation engine 218 can identify data to be aggregated based on, for example, intra-communication data, a current time, a source generation component, and/or one or more aggregation rules. For example, an aggregation rule may specify that data is to be aggregated across all communications that include content with a same entity identifier. An aggregation may be dynamic. For example, aggregated data may reflect that from within a most recent 12-hour period. Thus, an aggregation may be updated in time to exclude older data from the aggregation and to include newer data.

Aggregation engine 218 can be configured to provide data from one or more communications to interoperability engine 220. Interoperability engine 220 can be configured to perform one or more operations on the received data and store it in data store 226. For example, interoperability engine 220 may perform semantic tagging and indexing of data. This may include extracting field values from data, categorizing data (e.g., by type of data, characteristic of an entity, location of facility, characteristic of facility, and the like), anonymizing or partially-anonymizing data, and the like. Interoperability engine 220 may also include a high availability cache, an alerts engine, and a rules engine. In some examples, interoperability engine 220 operates synchronously.

From interoperability engine 220, data flows to data store 226. Data store 226 (and any other data store discussed herein) may include one or more data stores, which may be distributed throughout two or more different locations (e.g., present on different devices, which can include devices of different entities and/or a cloud server). In some examples, data store 226 includes a general data store 230, an operational data store 232, and an entity-based data store 234. Within each of the data stores 230, 232, and 234 is stored data. Depending on the structure of the particular data store, certain data stores may include rules for reading and writing. The data stores 230, 232, and 234 may include records, tables, arrays, and the like, which may be relational or non-relational. Depending on the data store, records for individual entities, business and analytics information, output data from one or more generation components 204, and the like may be retained. The data within the data stores 230, 232, and 234 include elements or tags such that a particular data (e.g., for a single entity, protocol, etc.) can be retrieved.

Access management engine 222 is configured to manage access to features of transformative processing engine 202, including access to the data retained in data store 226. For example, access management engine 222 may verify that a user device such as user device 228 is authorized to access data store 226. To verify the user device 228, access management engine 222 may require that a user of the user device 228 input a username and password, have a profile associated with the interaction system, and the like. Access management engine 222 may also verify that the user device 228 has an IP address or geographical location that corresponds to an authorized list, that the user device 228 includes a plug-in for properly accessing the data store 226, that the user device 228 is running certain applications required to access the data store 226, and the like.

Interface engine 224 is configured to retrieve the data from data store 226 and provide one or more interfaces for interacting with elements of transformative processing engine 202. For example, interface engine 224 includes an interface by which an application running on user device 228 can access portions of data within data store 226.

As described herein, an information exchange engine 238 shares a network connection with the information exchange service bus 236. The information exchange engine 238 is configured to monitor data (e.g., messages) that is passed over the information exchange service bus 236 and, from the monitored data, select certain portions to provide to one or more authorized user devices. The information exchange engine 238 is also configured to route inbound messages and route outbound messages, as described herein. The information exchange engine 238 is also configured to generate customized messages based on dependent user data.

Figure 3:
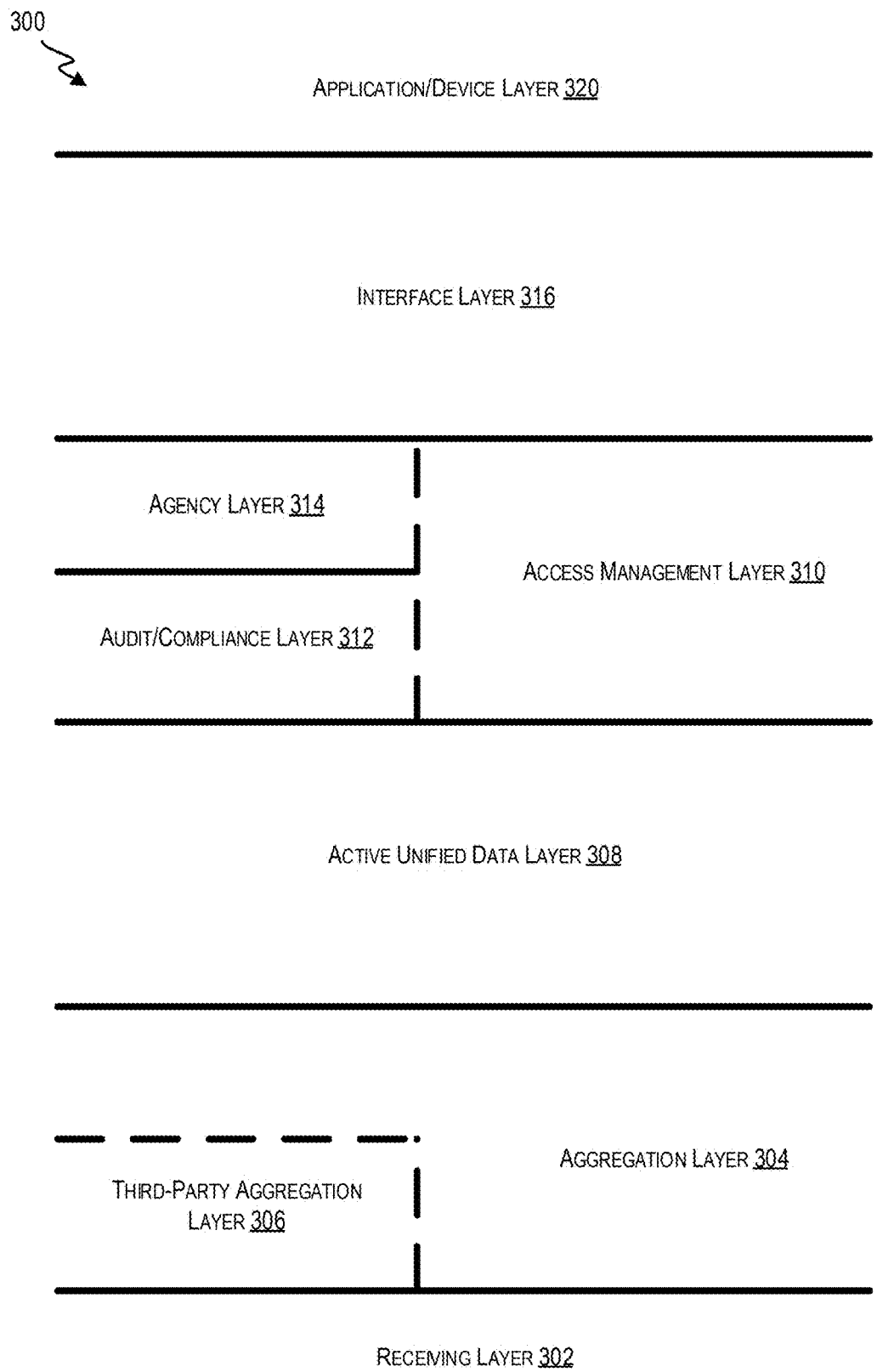
FIG. 3 is an example schematic model illustrating a network communication model in which techniques relating to providing a unified data feed to a computing device may be implemented, according to at least one example.

Turning next to FIG. 3, an architecture stack 300 is shown. In some examples, techniques relating management of data are implemented in accordance with architecture stack 300. And while architecture stack 300 is illustrated as having a particular structure, it is understood that other structures, including those with more or less layers than illustrated, is within the scope of this specification. In some examples, architecture stack 300 is implemented across an interaction system having a plurality of systems belonging to the same client or spread across different clients. Thus, architecture stack 300 can be used to integrate different systems of different organizations, entities, and the like and to provide a fluid sharing of information among elements within the interaction system and without the interaction system. In some instances, a multi-layer part of architecture stack 300 is implemented at a single system or device within an interaction system.

The different layers of architecture stack 300 will be described generally with reference to FIG. 3 and in detail with reference to subsequent figures. Architecture stack 300 includes a receiving layer 302 as the bottom-most layer. Receiving layer 302 includes receiving data from elements that share data with other elements within an aggregation layer 304. For example, as detailed herein, receiving layer 302 can include receiving data from generation components that generate data. As such, receiving layer 302 is where data that has been created is received. In some examples, the data within receiving layer 302 may be in its raw formats. The output may then be transmitted to aggregation layer 304. In some examples, components of receiving layer 302 may have complimentary layers to facilitate data transfer. For example, the components may include a data generation and/or a data transmission layer for providing data to receiving layer 302.

Elements of aggregation layer 304 aggregate the data generated by the elements of receiving layer 302. For example, the elements of aggregation layer 304 may include aggregation engines that collect data from generation components located within receiving layer 302. Such aggregation may be performed periodically, in response to a user request, according to a schedule, or in any other suitable manner. In some examples, data of aggregation layer 304 may be aggregated according to input and/or rules and may aggregate across records pertaining to, e.g., a facility, entity, time period, characteristic (e.g., demographic characteristic or condition), outcome, and any other suitable input and/or rules. The aggregation may include compiling the data, generating a distribution, generating a statistic pertaining to the data (e.g., average, median, extremum, or variance), converting the data, transforming the data to different formats, and the like.

Next, architecture stack 300 includes an active unified data layer 308. Elements of active unified data layer 308 receive data from the elements of the other layers and store such data in a unified manner. In some examples, this may include storing the data in a manner that allows for later searching and retrieval using a defined set of method calls, techniques, and or procedures. For example, the data may be stored such that a different application can access the data in a standard or unified manner. Thus, elements of active unified data layer 308 may receive information collected or generated within aggregation layer 304 and make certain adjustments to the data (e.g., translations, tagging, indexing, creation of rules for accessing the data, conversion of formatting of the data, generation of compressed versions, and the like) prior to retaining the data within one or more data stores accessible within active unified data layer 308.

Architecture stack 300 also includes an access management layer 310, which can include an audit/compliance layer 312 and/or an agency layer 314. Access management layer 310 includes elements to manage access to the data. For example, access management layer 310 may include elements to verify user login credentials, IP addresses associated with a user device, and the like prior to granting the user access to data stored within active unified data layer 308.

Audit/compliance layer 312 includes elements to audit other elements of architecture stack 300 and ensure compliance with operating procedures. For example, this may include tracking and monitoring the other elements of access management layer 310.

Agency layer 314 includes an access location (e.g., a virtual private network, a data feed, or the like) for elements of agencies that are interested in the operations of the interaction system in which architecture stack 300 is implemented. For example, agency layer 314 may allow a governmental entity access to some elements within architecture stack 300. This may be achieved by providing the governmental entity a direct conduit (perhaps by a virtual private network) to the elements of access management layer 310 and the data within active unified data layer 308. Audit/compliance layer 312 and agency layer 314 are sub-layers of access management layer 310.

Architecture stack 300 also includes interface layer 316. Interface layer 316 provides interfaces for users to interact with the other elements of architecture stack 300. For example, clients, entities, administrators, and others belonging to the interaction system may utilize one or more user devices (interacting within application/device layer 320) to access the data stored within active unified data layer 308. In some examples, the users may be unrelated to the interaction system (e.g., ordinary users, research universities, for profit and non-profit research organizations, organizations, and the like) and may use applications (not shown) to access the elements within architecture stack 300 via one or more interfaces (e.g., to access data stored within active unified data layer 308). Such applications may have been developed by the interaction system or by third-parties.

Finally, architecture stack 300 includes application/device layer 320. Application/device layer 320 includes user devices and applications for interacting with the other elements of architecture stack 300 via the elements of interface layer 316. For example, the applications may be web-based applications, entity portals, mobile applications, widgets, and the like for accessing the data. These applications may run on one or more user devices. The user devices may be any suitable user device as detailed herein.

Figure 4:
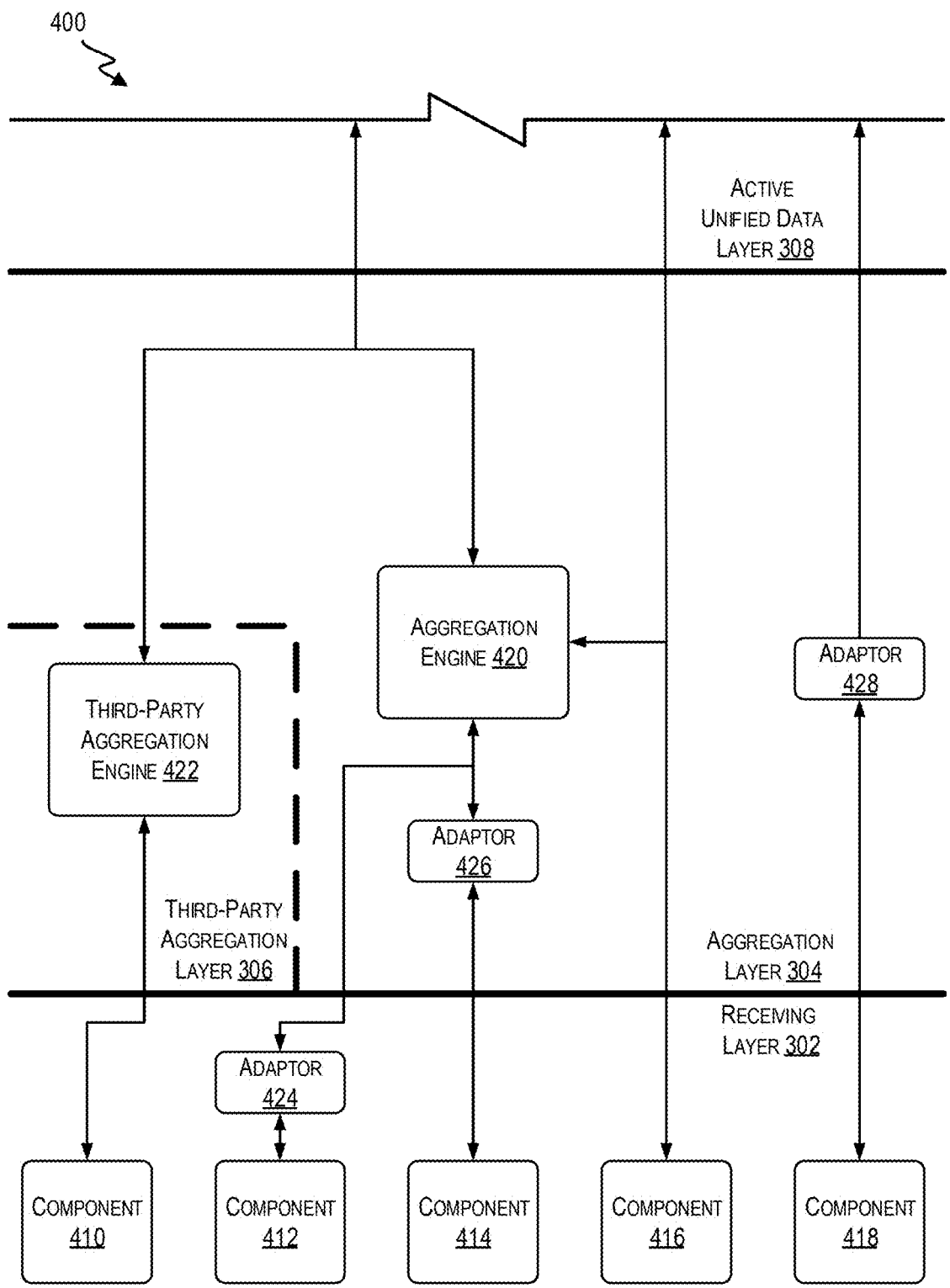
FIG. 4 is an example schematic model illustrating an aspect of the network communication model of FIG. 3 in more detail.

Turning next to FIG. 4, a diagram 400 is shown that depicts a portion of architecture stack 300 according to at least one example. In particular, the diagram 400 includes receiving layer 302, aggregation layer 304, aggregation layer 306, and a portion of active unified data layer 308. Receiving layer 302 receives data from one or more components 410-418. Components 410-418 are examples of one or more generation components 204. Components 410-418 may be spread across multiple facilities within a single or multiple clients. In some examples, components 410-418 may include complimentary layers to facilitate data transmission. For example, components 410-418 may include a transmission layer, generation layer, and/or a receiving layer to communicate data at receiving layer 302 and, in some examples, receive data from receiving layer 302.

In some instances, two or more of components 410-418 generate data according to different formats. The data can then be transformed, translated, or otherwise adjusted before an aggregation engine 420 (e.g., aggregation engine 218) or a third-party aggregation engine 422 (e.g., aggregation engine 218) collects the data. In some examples, the adjustment takes place within receiving layer 302. Thus, an adaptor 424 is associated with component 412 located in receiving layer 302. Adaptor 424 is an example of transformative adaptor 216. Adaptor 424 is implemented, as appropriate, in hardware, software, or any suitable combination of both. For example, transformative adaptor 216 may be a bolt-on adaptor that adjusts data as such data leaves component 412.

Other adaptors, such as adaptor 426 and adaptor 428, are implemented within aggregation layer 304. These adaptors can function in a similar manner as adaptor 424. In some examples, the data provided by component 414 is transmitted through adaptor 426 prior to being directed to aggregation engine 420. The data provided by component 416 is transmitted through aggregation layer 304 and/or enters aggregation engine 420 without having first traveled through an adaptor. The data provided by component 418 is transmitted through aggregation layer 304 and through adaptor 428. In some examples, component 418 provides for streaming of data. The data provided by component 410 is transmitted directly to third-party aggregation engine 422.

Aggregation engine 420 and third-party aggregation engine 422 function in a similar manner. In some examples, third-party aggregation engine 422 is operated by a different entity than the entity that operates aggregation engine 420 and may belong to different clients or a different interaction system. This may be because the data collected by third-party aggregation engine 422 differs in some way from the data collected by aggregation engine 420. In any event, aggregation engine 420 is configured to perform integration of data, including generic integration. For example, aggregation engine 420 performs one or more operations on data including tagging, logging, and protocol conversion. Aggregation engine 420 also supports one-to-many communications of data. In some examples, data flows between aggregation engine 420, the third-party aggregation engine 422, and some of components 410-418 and elements of active unified data layer 308.

The diagram 400 also includes the information exchange service bus 236 and the information exchange engine 238. As introduced herein, messages passing through the aggregation layer 304 can pass over the information exchange service bus 236. In this manner, the information exchange engine 238 can access the messages, route the messages, and/or customize the messages.

Figure 5:
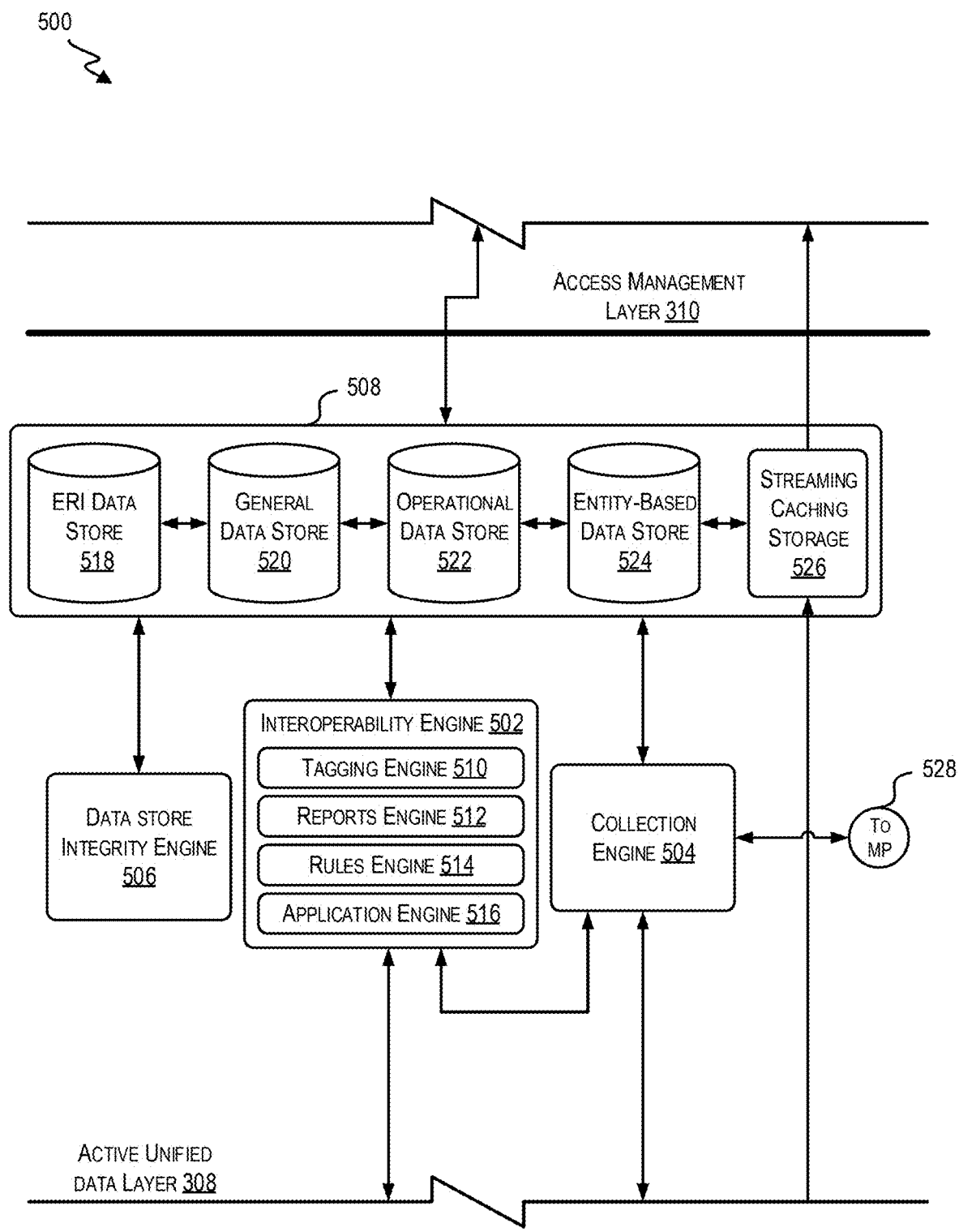
FIG. 5 is an example schematic model illustrating an aspect of the network communication model of FIG. 3 in more detail.

Referring next to FIG. 5, a diagram 500 is shown that depicts a portion of architecture stack 300 according to at least one example. In particular, diagram 500 includes active unified data layer 308 and a portion of access management layer 310. Active unified data layer 308, as illustrated in diagram 500, includes an interoperability engine 502 (e.g., interoperability engine 220), a collection engine 504, a data store integrity engine 506, and a data store 508 (e.g., data store 226). Generally, interoperability engine 502 receives data from elements within aggregation layer 304 (e.g., from aggregation engine 420) and performs one or more operations with respect to the data. Interoperability engine 502 also facilitates storage of at least a portion of the processed information in data store 508.

Collection engine 504 is configured to generate message indicators identifying flows of data by and between elements of an interaction system implemented using the techniques described herein. The flows of information include messages which include data, and the message indicators include unique message identifiers that can be used to identify the messages. The unique message identifiers include information that can be used to uniquely identify the messages. For example, a unique message identifier for a particular message can include a concatenation of the following information stored in a table: a source application, a facility, a message type, and a message control identification (ID). The unique message identifier can also be the message control ID. The unique message identifier may be created as messages including data are transmitted from aggregation layer 304.

In some examples, the table also includes information for tracking the progress of the message from an origination node to a destination node. For example, typically when a message (e.g., any communication of data) is first received by transformative processing engine 108 (e.g., interoperability engine 502), management engine 106 (e.g., collection engine 504 of management engine 106) may generate a unique identifier for the message in order to track that message as it moves throughout the interaction system. The unique identifier may be included in the header of the message such that when the next node (e.g., component, device, server, etc.) after transformative processing engine 108 receives the message, that node can report back to management engine 106 that it saw the message. In this manner, management engine 106 may track messages from end-to-end for the life of the message.

In one example, the messages are requests. The requests may be generated based om user input at one of the components. The requests may be received by transformative processing engine 108 and integrated into the system. In some examples, management engine 106 may be notified that the requests have been received and may therefore be configured to generate message IDs for each request. These message IDs may then be associated with each of the requests. As the requests continue to move throughout the interaction system (e.g., away from transformative processing engine 108), management engine 106 may track their movement using the message IDs. If one of the requests does not arrive at its destination, management engine 106 may determine why the request was stopped. In some examples, this cause may be hardware related (e.g., an unplugged Ethernet cable, a broken router, etc.), software related (e.g., a router routing to the wrong location), or any other reason for orders not arriving at their correct destination.

In some examples, management engine 106 (e.g., collection engine 504 of management engine 106) may receive the message and/or message identifier directly from one of components 410-418. For example, one of components 410-416 may be configured to generate the unique message identifier and/or communicate directly with management engine 106. The message also may travel via one or more intermediate nodes on its way to the destination node. In some examples, a node is a component such as components 410-418, which may be running an application. In some examples, the unique identifier and the routing of the message to its destination may be stored in a table that also includes: a geolocation of each node, a network from which the message originated, a type of node, the unique node identifier, and a time associated with the message leaving the origination node. In some examples, collection engine 504 provides unique message identifiers to other elements of the interaction system to monitor the messages as they move throughout the interaction system. Collection engine 504 also provides a portion of the unique message identifiers to a management platform (indicated by a circle 528) for further analysis of the message identifiers. Such analyses may include reconciliation of lost messages, latency reporting, audit management and compliance, and other such analyses.

As mentioned previously, interoperability engine 502 is configured to store data in data store 508. A plurality of sub-engines 510-516 of interoperability engine 502 are configured to perform operations relating to storing data in data store 508.

Interoperability engine 502 includes a tagging engine 510 configured to perform semantic tagging and indexing of data. Tagging engine 510 therefore is configured to receive data, read metadata associated with the data, semantically scan the content of the data, and associate one or more tags with the data. Tagging engine 510 may therefore have access to hundreds, thousands, or even more possible tags. These tags may have been input by users, learned, pre-defined, generated by outside third-party mapping sources, and/or gathered from other components and/or data stores of the interaction system. For example, if the data is a chart for an entity, the tagging engine may be configured to read any metadata associated with the chart to determine which tags may be appropriate to associate with the chart. From the metadata, tagging engine 510 may determine that the chart is for a type of entity by reading metadata indicating that an author field is populated with the name of another particular type of entity. Tagging engine 510 may have access to other data to compare the analyzed metadata against (e.g., to identify that the author's name corresponds to Dr. Brown who is an oncologist). Other examples, of metadata that may be included in one or more fields include author, document type, creation time and date, last update time and date, upload time and data, geographic location, unique ID associated with the client or facility where the data originated, and other similar fields. The tags may be stored in association with the data (e.g., the chart) and/or may be stored independent from the data but include an identifier such that when searching tags the data may be capable of population.

Continuing with the example from above, if the data is a chart for a first type of entity, tagging engine 510 may be configured to read the content of the chart to determine which tags may be appropriate to associate with the chart. For example, this may comprise analyzing the content of the chart (i.e., individual pages) semantically to look for artifacts (e.g., keywords, phrases, and the like) in the content. These artifacts may be identified by tagging engine 510 and used to decide which tags to associate with the document. In some examples, semantic scanning may involve filtering out words (e.g., articles, such as "a" and "the"), phrases, and the like. Similar to the reading of metadata, the tags may be pre-defined, user-defined, learned, and the like. In some examples, reading metadata associated with messages may provide meaning and/or give context to the particular record of data. This meaning and/or context may assist tagging engine 510 to determine one or more tags to associate with the data. The tags may be chosen, for example, based on values of particular fields in the data, detecting a frequency of one or more words in a document or metadata and/or of a set of related words (e.g., tagging a record with "cancer" upon detecting words such as tumor, metastasize, chemotherapy, radiation, oncology, malignant, stage 3, etc.). In this manner, tagging engine 510 may also index portions of the data within one or more data stores of data store 508. In some examples, such indexing may be based in part on the selected tags.

Interoperability engine 502 also includes a reports engine 512 configured to generate one or more reports or alerts based on data. For example, reports engine 512 may generate reports when certain types of data are received or when data with certain characteristics is received. Reports engine 512 may also generate alerts. The reports and/or alerts generated by reports engine 512 may be outputted in the form of one or more communications to an administrator, an authorized user, or other similar user via a user device. Such communications can include, for example, signals, sirens, electronic notifications, popups, emails, and the like. Content of such communications may include information characterizing a performance metric, efficiency and/or outcomes; identifying concerning patterns; identifying losses of data; and the like. In some examples, the content is presented in the form of one or more documents, tables, figures, charts, graphs, and the like.

Interoperability engine 502 also includes a rules engine 514 configured to create and manage condition-response rules, alert/reports rules, data-formatting rules, data-sharing rules, transmission rules, aggregation rules, user authorization rules, and other similar rules. Such rules may be user-defined, fixed, learned by elements of the interaction system, and any combination of the foregoing. Finally, interoperability engine 502 includes an application engine 516 configured to provide service-oriented architecture web services.

Data store 508 includes an electronic record information data store 518 ("ERI data store 518"), a general data store 520, an operational data store 522, an entity-based data store 524, and a streaming caching storage 526. While data store 508 is illustrated as including a fixed number of data stores and storage elements, it is understood that data store 508 can include any suitable number of data stores and storage elements, including more than illustrated or less than illustrated.

In some examples, a data query script is provided to query a first data store and/or to obtain data for populating a data store. Such script could query a data store described herein (e.g., data store 508) and/or could be used to obtain data to populate a data store described herein (e.g., data store 508). In one instance, the script is configured to be repeatedly executed, so as to repeatedly draw data from a source data store. The retrieved data can then be formatted, filtered, sorted and/or processed and then stored, presented and/or otherwise used. In this manner, the script can be used to produce streaming analytics.

In some instances, the data query script, when executed, identifies each of the data stores of interest. Identifying the data stores of interest involves identifying at least a portion of data from the data stores simultaneously and/or sequentially. For example, the script can identify corresponding data stores (e.g., or components of a single data store or multiple data stores) that pertain to one or more similar variables but that differ in one or more other variables. Once the portion of the data from the data stores is identified, a representation of the identified data can be output to one or more files (e.g., Extensible Markup Language (XML) files) and/or in one or more formats. Such outputs can then be used to access the data within one or more relational database accessible using Structured Query Language (SQL). Queries made using SQL can be made sequentially or in parallel. Results from an SQL query may be stored in a separate database or in an XML file that may be updated either in part or as a whole. The data query script may be executed periodically, in accordance with a user-defined rule, in accordance with a machine-defined or machine-learned rule, and in other suitable manner.

Within ERI record data store 518 is retained data. In some examples, the information within ERI record data store 518 is organized according to entity identifying information. Thus, ERI record data store 518, in some examples, includes individually identifiable information. But it may also include de-identified information.

Within general data store 520 is retained data. The data may be stored in a relational database format or in any other suitable format. Thus, the data within general data store 520 may be retained in a data structure that includes one or more tables capable of accessing each other. In some examples, general data store 520 includes a subset of the information that is included in operational data store 522.

Within operational data store 522 is retained data in a relational database format. Thus, the data within operational data store 522 may be retained in a data structure that includes one or more data structures (e.g., tables) capable of accessing each other. Operational data store 522 is an example of an operational data warehouse. In operational data store 522 is joined many different types of data. In some examples, the operational data store 522 includes data pertaining to decision making as discussed herein and other data typically used.

Within entity-based data store 524 is retained data in a non-relational database format. Thus, the data within entity-based data store 524 may be retained in a structure other than tables. Such structure may be appropriate for large and complex data sets. In some examples, entity-based data store 524 (or any other data store) may be a unified system, which may include: a document-centric, schema-agnostic, structure-aware, clustered, transactional, secure, database server with built-in search and a full suite of application services. An example of such a unified system may be Marklogic. Entity-based data store 524 can support data aggregation, data organization, data indexing, data tagging and mapping to semantic standards, concept matching, concept extraction, machine learning algorithms, concept discovery, concept mining, and transformation of record information. In some examples, entity-based data store 524 includes data pertaining to decision making (similar to general data store 520) as discussed that is organized and accessed in a different manner. For example, the data within entity-based data store 524 may be optimized for providing and receiving information over one or more information exchanges. In some examples, entity-based data store 524 includes a subset of the information that is included in operational data store 522.

Finally, in some examples, streaming caching storage 526 is a streaming data cache data store. As discussed previously, certain components of components 410-418 may support streaming data to other components or user devices. Streaming caching storage 526 is a location where streaming data can be cached. For example, assume that component 418 is a piece of equipment operating at Location A and that a user using a computer in Location B desires to view a live of substantially live stream of outputs of the piece of equipment. Component 418 can send a portion of data to streaming caching storage 526 which can retain the portion of the data for a certain period of time (e.g., 1 day). Thus, streaming caching storage 526 is configured to cache data that can be streamed.

Diagram 500 also includes data store integrity engine 506. In some examples, data store integrity engine 506 is configured to ensure integrity of the information within data store 508. For example, data store integrity engine 506 applies one or more rules to decide whether information within all or part of data store 508 should be scrubbed, removed, or adjusted. In this manner, confidence is increased that the information within data store 508 is accurate and current.

Figure 6:
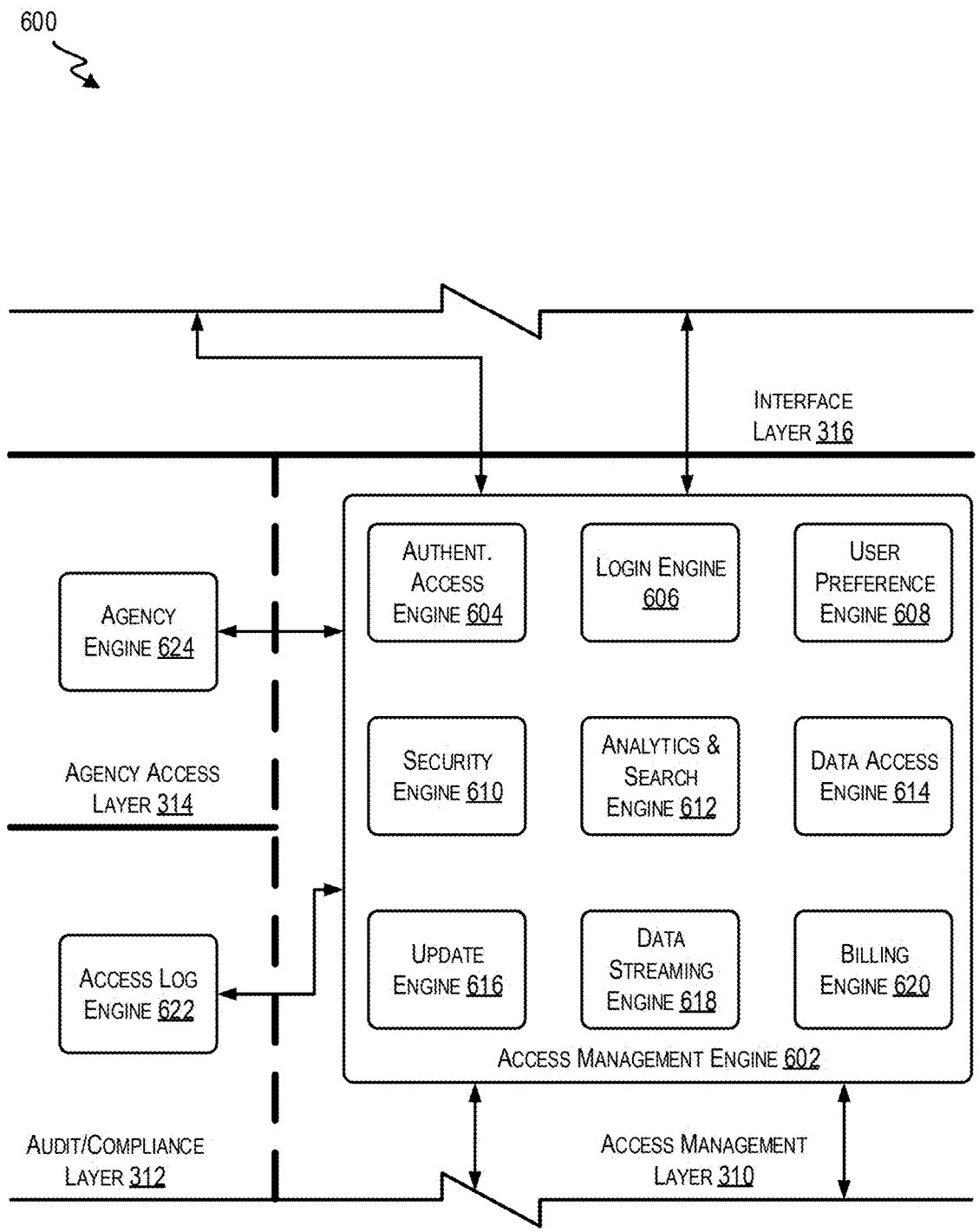
FIG. 6 is an example schematic model illustrating an aspect of the network communication model of FIG. 3 in more detail.

FIG. 6 shows a diagram 600 which depicts a portion of architecture stack 300 according to at least one example. In particular, the diagram 600 includes access management layer 310, audit/compliance layer 312, agency layer 314, and a portion of interface layer 316.

Access management layer 310, as illustrated in the diagram 600, includes an access management engine 602. Access management engine 602 is an example of access management engine 222. Generally, access management engine 602 can be configured to manage access to elements of transformative processing engine 202 by different components, applications, and user devices.

Access management engine 602 within access management layer 310 also provides functionality similar to an operating system. For example, access management engine 602 includes a plurality of engines configured to manage different aspects of interacting with elements of the interaction system. For example, a user who desires to access portions of data retained in data store 508, may do so by interacting with access management engine 602 using one or more applications (not shown). Thus, access management engine 602 includes a variety of engines to enable such interaction. The engines include, for example, an authentication access engine 604, a login engine 606, a user preference engine 608, a security engine 610, an analytics and search engine 612, a data access engine 614, an update engine 616, and a streaming data engine 618. The different engines of access management engine 602 can define routines, protocols, standards, and the like for interacting with elements of the interaction system.

Beginning first with authentication access engine 604, authentication access engine 604 evaluates the rules and conditions under which users may access elements of the interaction system; in particular, the conditions under which users may access data within data store 508. These rules and conditions may be user-defined (e.g., by an administrator or reviewer), learned over time, and/or may be dynamically updated and/or evaluated based on characteristics of the user or the user's device attempting to access the interaction system. The rules and conditions may indicate the types of users who have particular types of access within the interaction system. The type of access may also relate to the degree to which data is identified/de-identified. In some examples, a user desiring access to data provides certain identifying information and authentication access engine 604 authenticates an identity of the user.

Login engine 606 evaluates the rules and conditions under which users are able to log in to the interaction system or access applications associated with the interaction system. These rules and conditions may be user-defined (e.g., by an administrator), learned over time, and also may be dynamically updated and/or evaluated based on characteristics of the user or the user's device attempting to access the interaction system. Thus, while authentication access engine 604 evaluates the rules to determine which users may access the interaction system, login engine 606 evaluates the particular credentials, profiles, etc. of the users. For example, login engine 606 can confirm that an entered username (e.g., and password), provided biometric data or code or identifier in a scanned tag or badge matches that in an authorized user data structure.

Login engine 606 evaluates one or more user profiles associated with each authenticated user. In some examples, a user profile includes a username, password, and other information associated with the user. For example, a user profile may indicate characteristics about the user.

User preference engine 608 evaluates the rules and conditions under which user are able to store and update one or more user preferences corresponding to access of the interaction system or access to applications associated with the interaction system. These rules and conditions may be user-defined (e.g., by the user or administrator), and may include rules for default preferences. For example, using user preference engine 608, a user may indicate a format in which the user prefers to receive outputted information, display characteristics of a graphical user interface associated with the user, and other similar user preference settings. For example, the user may indicate that certain types of reports and/or alerts are to be sent to the user.

Security engine 610 evaluates the rules and conditions for ensuring the security of access to the elements of the interaction system. In some examples, these rules and conditions are determined by administrators of the interaction system. In some examples, security engine 610 provides a plurality of computer virus protection services. These services can be called up and implemented when accessing the interaction system or accessing applications associated with the interaction system. The rules and conditions may be based on roles, based on profiles, based on domains, and any other suitable security configuration. For example, because the interaction system may include sensitive data, security engine 610 may enforce a domain-based rule that protects certain sensitive information (e.g., identifying information).

Analytics and search engine 612 evaluates the rules and conditions under which users can search for data within the interaction system and access analytics relating to the interaction system. In some examples, these rules and conditions are user-defined or learned over time in accordance with search engine optimization techniques. For example, analytics and search engine 612 is used to search within data store 508 for particular data. Analytics and search engine 612 supports any conventional searching algorithms. For example, search engine 612 can be used to search within various fields and potential field values. In some examples, search engine 612 can provide analytics, such as statistics, graphs, distributions, and/or comparative analysis pertaining to particular entities and/or characteristics. Such information may be selected by a user and presented on a user interface.

Data access engine 614 evaluates the rules and conditions under which users may operation in order to access particular data within data store 508. In some examples, these rules and conditions are user-defined or learned over time. For example, data access engine 614 may indicate the routines, subroutines, or other logic needed for an application to access certain portions of data store 508. For example, while authentication access engine 604 and login engine 606 may manage which users can access parts of the interaction system, data access engine 614 may manage how authenticated users access data within data store 508. To this end, data access engine 614 may enforce and/or evaluate certain rules managing how users access different components of the interaction system. In some examples, data access engine 614 may be used to actually access data within data store 508 (e.g., extract, download, or otherwise access). In some examples, data access engine 614 may define procedures, protocols, and the like for accessing data. The protocols and procedures for accessing data access engine 614 (like the other engines of access management engine 602) may be provided to developers in the form of a software development kit (SDK). SDKs may enable developers write applications that can effectively communicate with elements (e.g., data store 508) of the interaction system. In particular, applications that can access a portion of the data stored within active unified data layer 308.

Update engine 616 evaluates the rules and conditions for providing updates to other engines within access management engine 602, plug-ins for applications that access the interaction system, and for other similar elements of the interaction system. For example, updates may be generated at runtimes, at defined time intervals, upon request by a user, upon receiving a threshold quantity of new or changed data. Once an update is performed, an interface may be refreshed, a report may be sent indicating that the update was successful or unsuccessful, or the like.

Streaming data engine 618 defines the rules and conditions for enabling streaming of data between components and user devices of the interaction system. For example, streaming data engine 618 may enable component 414 to stream data. Streamed data may include live or substantially live audio or video feeds, results of tests, output from equipment or devices, and any other suitable type of data capable of being streamed. In some examples, the data may be streamed to other components or user devices within the network or outside the network. In order to establish a streaming transmission, streaming data engine 618 may identify a streaming destination and a streaming origin. Next, streaming data engine 618 may pair the two and enable streaming. This may include allocated bandwidth within one or more network devices associated with the interaction system. Streaming data engine 618 may also adjust the quality of the streaming data based on the availability of bandwidth. In some examples, streaming data engine 618 may receive incoming streams (and continuously present the stream or monitor for particular data (e.g., exceeding a threshold, exhibiting an above-threshold change, having a particular value)).

Within audit/compliance layer 312 is located an access log engine 622. Access log engine 622 evaluates the rules and conditions for logging access to the interaction system by users, applications, devices, and the like. Logging access includes, in some examples, logging data conventionally collected by access log engines running in similar environments. Access log engine 622 can use this data to generate and transmit reports, for example, to stakeholders of the interaction system such that they can make informed decisions regarding that is accessing the interaction system and for what purposes.

Within agency layer 314 is located an agency engine 624. Agency engine 624 evaluates the rules and conditions under which agencies can access the interaction system. In some examples, agency engine 624 may be used to track one or more performance indicators identified by a government agency and/or to provide report instances of defined types of events. In some examples, a university is an agency that uses agency engine 624 to collect data pertaining to one or more studies. Agency engine 624 can collect the pertinent data, potentially format and/or analyze the data, and facilitate transmission of the data to the appropriate agency.

Figure 7:
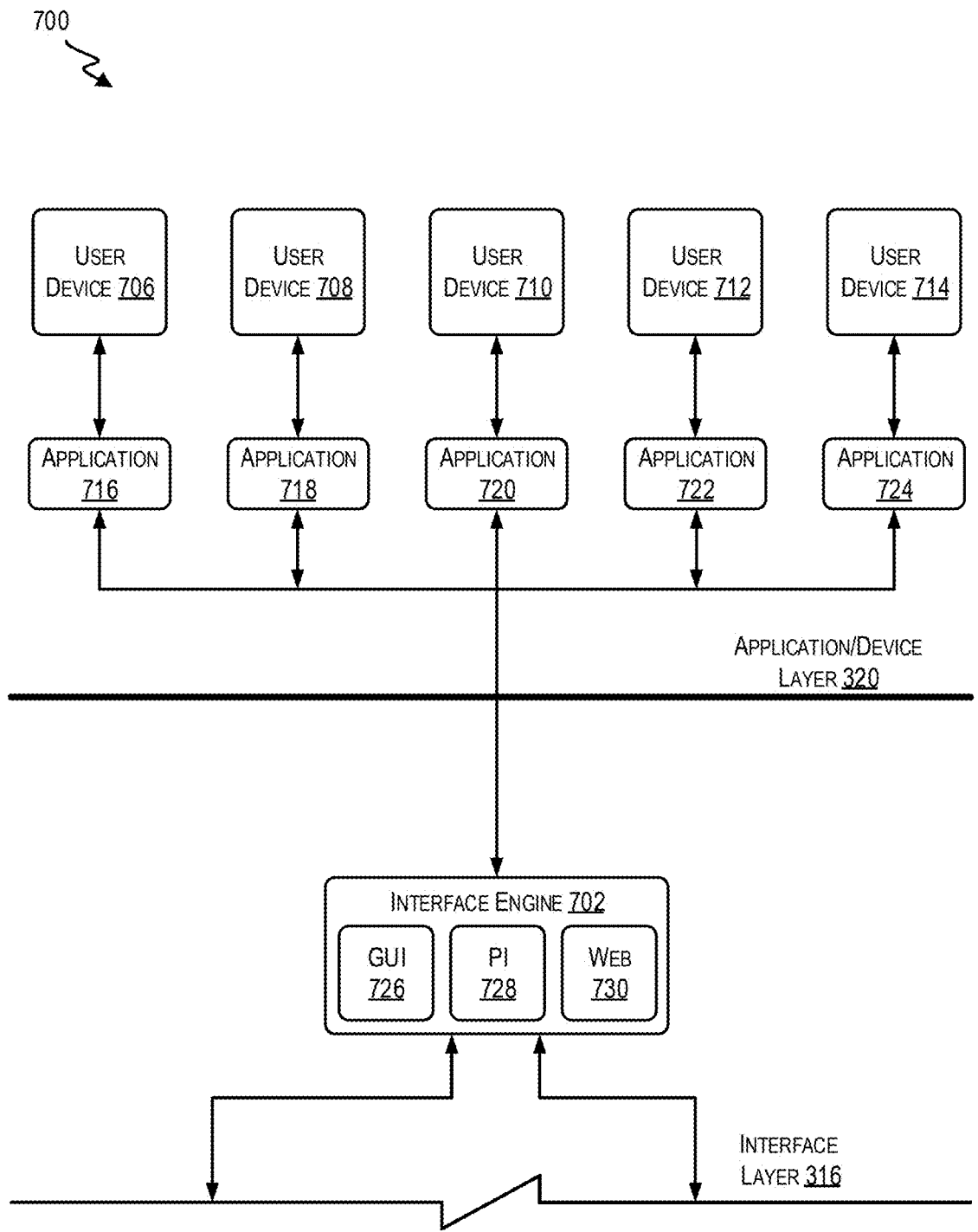
FIG. 7 is an example schematic model illustrating an aspect of the network communication model of FIG. 3 in more detail.

FIG. 7 shows a diagram 700 which depicts a portion of architecture stack 300 according to at least one example. In particular, diagram 700 includes interface layer 316, and application/device layer 320. Within interface layer 316 is located interface engine 702 (e.g., interface engine 224). Interface engine 702 is configured to generate one or more interfaces (e.g., graphical user interface 726, programmatic interface 728, and/or web interface 730) to enable data to flow to user devices 710, 712, and 714 via respective applications 720, 722, and 724. In some examples, the interfaces of interface engine 702 are embodied in hardware, software, or some combination of both. Within interface layer 316 communications and inputs directed to interacting with elements of access management layer 310 may be embodied.

Graphical user interface 726 is any suitable graphical user interface configured to interact with elements of the interaction system. Programmatic interface 728 includes an application programming interface, a programmatic user interface, and other similar interfaces for defining core functions for accessing elements of the interaction system. For example, programmatic interface 728 may specify software components in terms of their operations. Web interface 730 is any suitable web interface configured to interact with elements of the interaction system. Any of the interfaces described herein may be configured to receive user input, present dynamic presentations that depend on user input, and otherwise respond to user input. In some examples, such input may be provided via one or more input devices (e.g., a keyboard, touchscreen, joystick, mouse, microphone, devices capable of capturing inputs, and the like) operated by one or more users of user devices 706-714. Output may be provided via one or more output devices (e.g., a display or speaker).

Interface engine 702 is utilized by applications internal to the interaction system and external to the interaction system to access data. In some examples, the applications that are internal include applications that are developed for internal use by various entities associated with the interaction system. In some examples, the applications that are external to the interaction system include applications that are developed for external use by those that are not associated with the interaction system.

Generally, within application/device layer 320, applications 716-724 which communicate with other elements of architecture stack 300 using the interfaces generated by interface engine 702 are defined. This includes detailing how applications 716-724 are to interact with the interfaces generated by interface engine 702 for accessing data. For example, interacting may include accepting inputs at user devices 706-714 to access data and, in response, providing the data, prompts, or other types of interaction with one or more users of the user devices 706-714. Thus, applications 716-724 may be related to one or more of the interfaces generated by interface engine 702. For example, application 720 may be interact with a graphical user interface (whether generated by interface engine 702 or otherwise) to interact with other elements of the interaction system. Interacting may include receiving inputs at the graphical user interface via application 720, providing output data to the graphical user interface application 720, enabling interaction with other user devices, other applications, and other elements of the interaction system, and the like. For example, some of the inputs may pertain to aggregation of data. These inputs may include, for example, types of data to aggregate, aggregation parameters, filters of interested data, keywords of interested data, selections of particular data, inputs relating to presentation of the data on the graphical user interface, and the like. Providing output data may include providing the aggregated data on the graphical user interface, outputting the information to one of the other user devices 706-714 running one of the other applications 716-724.

Turning now to the details of applications 720, 722, and 724. In some examples, applications 720, 722, and 724 include a variety of different applications that can be designed for particular users and/or uses. In one example, application 720 includes dashboards, widgets, windows, icons, and the like that are customized for a particular entity. In some examples, application 720 may present different data depending on a focus of the entity and protected information associated with the entity. In this manner, application 720 adapts and automatically adjusts depending on the context in which the entity is using the application. Application 720 may be configured to receive input, adjust presentations, present unprompted alerts, adjust display of content, move more relevant content to the foreground, move less relevant content to the background, and/or populate forms for the entity.

In another example, application 722 may be specific for nurses or types of nurses. In this example, application 722 may include dashboards, widgets, windows, icons, and the like that are customized to individual nurses. Similar to the example discussed above pertaining to the user, in some examples, application 724 may present different data depending on a position of the nurse. In this manner, application 722 adapts and automatically adjusts depending on the context in which the nurse is using the application. For example, the nurse may receive data, such as test results.

In some examples, application 724 may be a multi-role application for administrators and is used to manage entities constitute the population of the entities or organizations within the interaction system. Similar to the other examples discussed, in some examples, application 724 may present different data depending on a role of the user who is using application 724. In this manner, application 724 adapts and automatically adjusts depending on characteristics of the user who is using application 724. In this manner, application 724 can provide different data depending on the role of the user. For example, whether data presented includes identifiable or de-identified information may depend on a position of the user.

Applications 716 and 718 shown in connection with interface engine 702 are applications developed by third-parties. In some examples, such applications include any suitable application that benefits from accessing data. The interaction system may include data pertaining to hundreds of thousands of entities. Having data pertaining to so many entities presents security concerns. For example, much of the data may be identifying data. Accordingly, data that may be accessed by applications 716 and 718 may be limited. In some examples, an entity of the interaction system may use one of applications 716, 718 to access his or her own data. In this example, the identity of the entity may be verified in accordance with techniques described herein.

User devices 706-714 are any suitable user devices capable of running applications 716-724. User devices 706-714 are examples of the user device 228. In some examples, the user devices include: mobile phones, tablet computers, laptop computers, wearable mobile devices, desktop computers, set-top boxes, pagers, and other similar user devices. In some examples, at least some of user devices 706-714 are the same devices as at least some of the one or more components 410-418. In some examples, user devices 706-714 may include complementary layers to application/device layer 320 and/or receiving layer 302. For example, user devices 706-714 may include a transmission layer, a generation layer, and/or a receiving layer to communicate data at application/device layer 320 and at receiving layer 302.

Figure 8:
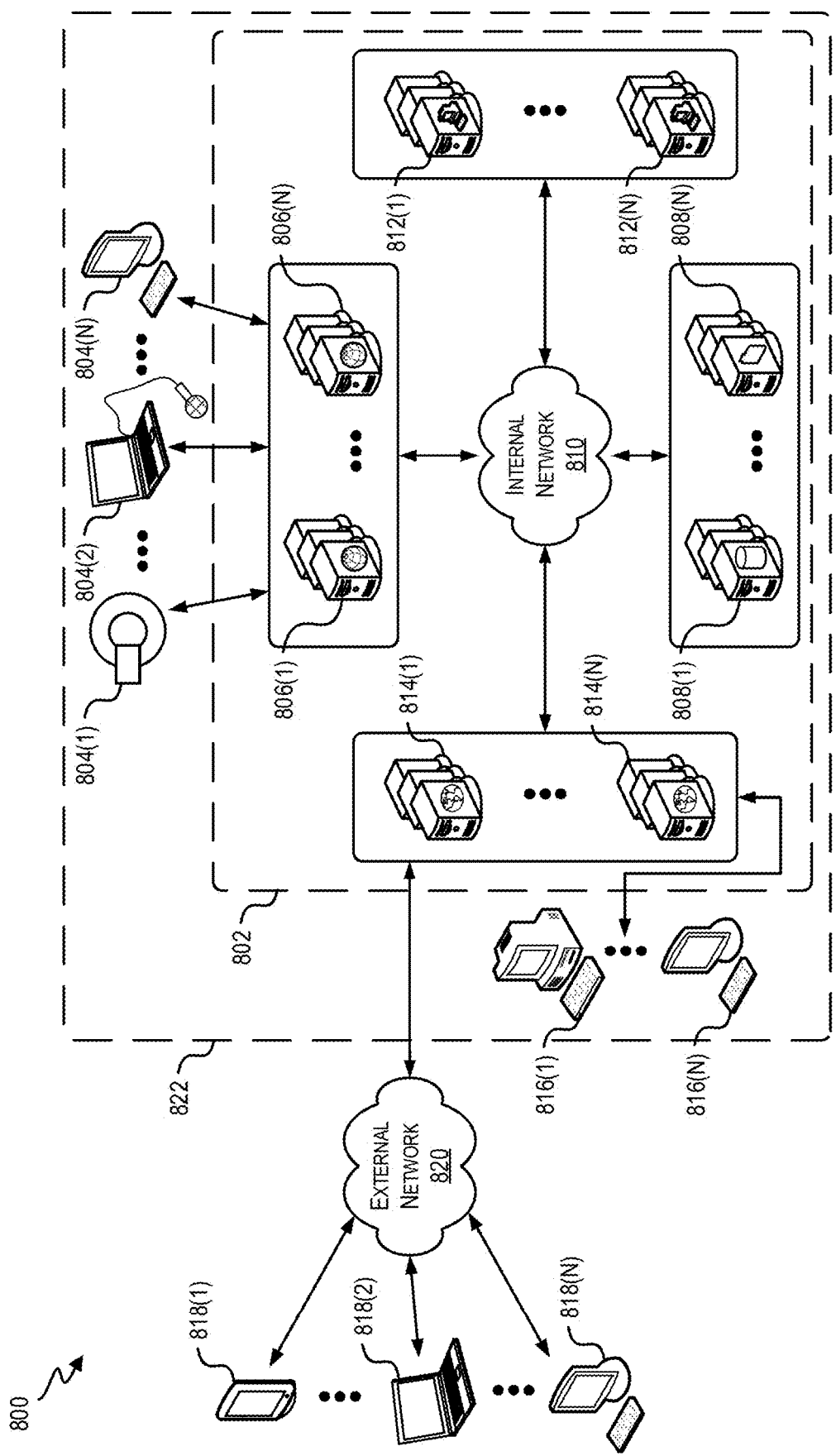
FIG. 8 is an example schematic architecture illustrating an interaction system in which techniques relating to providing a unified data feed to a computing device may be implemented, according to at least one example.

Turning now to FIG. 8, an interaction system 800 is shown according to at least one example. Interaction system 800 includes an internal organization 822 including a transformative processing engine 802. The transformative processing engine 802 is an example of transformative processing engine 202 previously discussed. Interaction system 800 is illustrated as an example configuration for implementing the techniques described herein. In particular, a configuration of elements as illustrated in FIG. 8, at least in some examples, communicates according to the layers of architecture stack 300. For example, internal organization 822 includes generation components 804(1), 804(2), and 804(N) which provide data to aggregation servers 806(1)-806(N).

Generation components 804(1), 804(2), and 804(N) operate in accordance with receiving layer 302. In some examples, generation component 804(1) is a piece of equipment, generation component 804(2) is computer with a data collection device, a type of lab system, and generation component 804(N) is a terminal. Aggregation servers 806(1)-806(N) operate in accordance with aggregation layer 304. Aggregation servers 806(1)-806(N) share data with data storage servers 808(1)-808(N) via one or more internal network(s) 810. In some examples, internal network 810 is any suitable network capable of handling transmission of data. For example, internal network 810 may be any suitable combination of wired or wireless networks. In some examples, internal network 810 may include one or more secure networks. Data storage servers 808(1)-808(N) are configured to store data in accordance with active unified data layer 308. Data storage servers 808(1)-808(N) include database servers, file storage servers, and other similar data storage servers.

Access management servers 812(1)-812(N) manage access to the data retained in the data storage servers 808(1)-808(N). Access management servers 812(1)-812(N) communicate with the other elements of interaction system 800 via internal network 810 and in accordance with access management layer 310.

Interface servers 814(1)-814(N) provide one or more interfaces applications to interact with the other elements of interaction system 800. Interface servers 814(1)-814(N) provide the one or more interfaces and communicate with the other elements of interaction system 800 via internal network 810 and in accordance with interface layer 316. The interfaces generated by the interface servers 814(1)-814(N) can be used by internal user devices 816(1)-816(N) and external user devices 818(1), 818(2), and 818(N) to interact with elements of interaction system 800.

Internal user devices 816(1)-816(N) are examples of user devices 706-714. In some examples, internal user devices 816(1)-816(N) run applications via the interfaces generated by interface servers 814(1)-814(N). As an additional example, external user devices 818(1), 818(2), and 818(N) can run applications developed by third parties that access the other elements of interaction system 800 via the interfaces generated by interface servers 814(1)-814(N).

External user devices 818(1), 818(2), and 818(N) access the interfaces via external network 820. In some examples, external network 820 is an unsecured network such as the Internet. External user devices 818(1), 818(2), and 818(N) are examples of user devices 706-714. External user device 818(1) is a mobile device. In some examples, the mobile device may be configured to run an application to access interaction system 800. Similarly, the other external user devices 818(2)-818(N) run applications that enable them to access interaction system 800. While interaction system 800 is shown as implemented using discrete servers, it is understood that it may be implemented using virtual computing resources and/or in a web-based environment.

Figure 9:
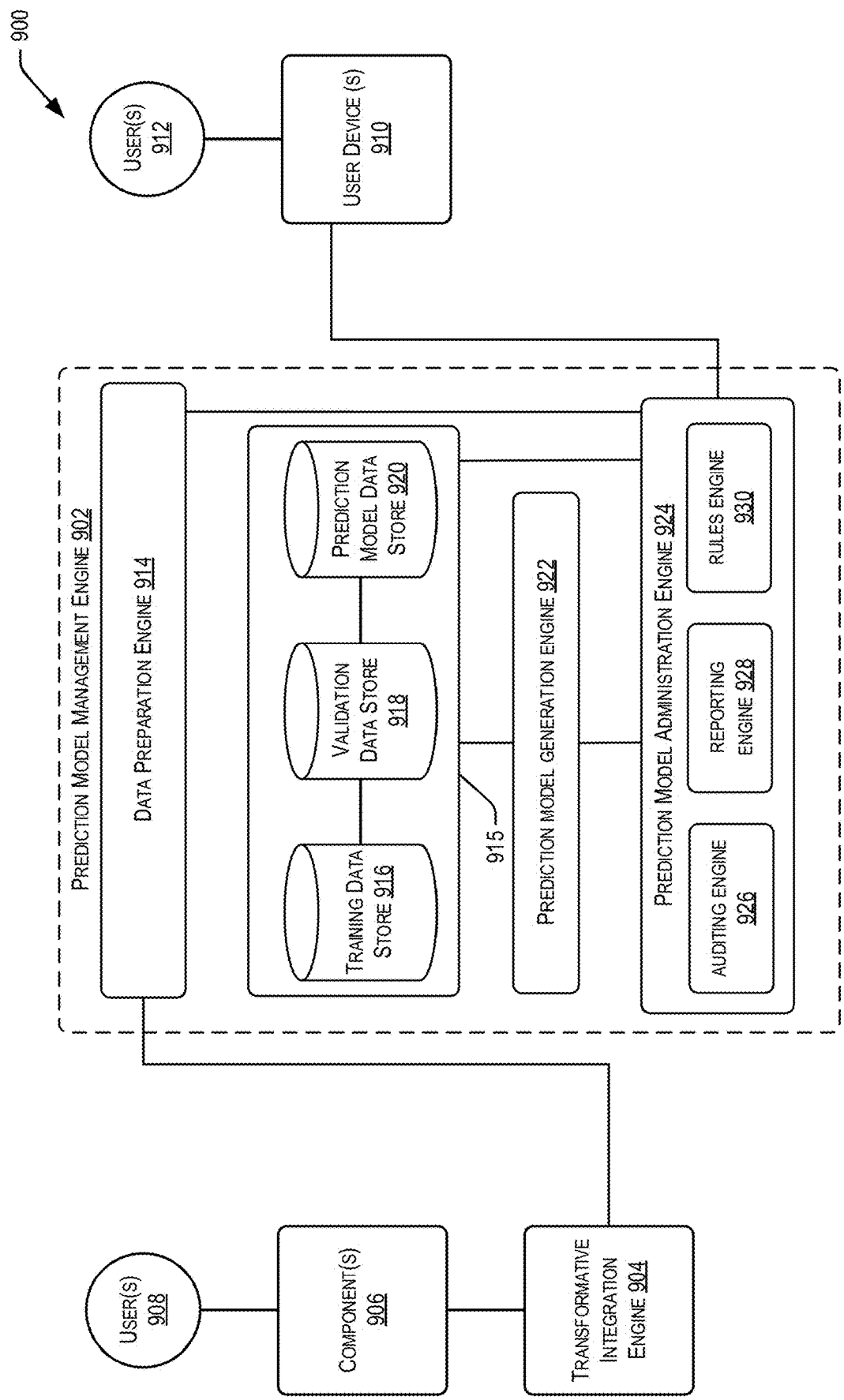
FIG. 9 is an example architecture illustrating a system in which techniques relating to providing a unified data feed to a computing device may be implemented, according to at least one example.

Turning now to FIG. 9, a block diagram of an example of a service provider prediction system 900 is shown, according to at least one example. In some examples, the service provider prediction system 900 may be a component of (or connected to) a service management system (e.g., a service provider network) that is affiliated with a service organization. The service organization may include one or more service (e.g., service) facilities, which may each transmit data to the service management system. The service management system, as described in the systems and methods depicted in later figures, may include one or more other components as described in reference to FIGS. 1-8, described herein. For example, the service provider prediction system 900 of FIG. 9 includes a prediction model management engine 902. The service provider prediction system 900 further includes a transformative integration engine 904. The transformative integration engine 904 is an example of the transformative integration engine 108 discussed with reference to FIG. 1. The service provider prediction system 900 also includes one or more generation components 906, which may be similar to the one or more generation components 204 discussed with reference to FIG. 2. In some examples, the generation components 906 may receive data input from one or more users 908 (e.g., clinicians, service technicians, etc.). The service provider prediction system 900 also includes one or more user devices 910 used by users 912 (e.g., user service providers (USPs) such as clinical nurse consultants, service administrators, physicians, etc.). The user device(s) 910 may be similar to user device 228 of FIG. 2 and/or user device 104 of FIG. 1. The transformative integration engine 904 and the user device(s) 910 may communicate with the prediction model management engine 902 using any suitable network connectivity device, as described earlier. It should be understood that one or more of the components described in reference to FIG. 9 may be implemented on the same device or different devices. For example, as described herein, a prediction model (which may also be known as a "classifier," "classification model," and/or "segmentation model) may be trained on one device and the later executed on another device.

In some examples, the transformative integration engine 904 may receive service-related data generated by the generation components 906 (e.g., a lab systems component 208, service equipment component 206, clinical component 212, etc.). The service-related data (e.g., lab results) may be collected from one or more sources. For example, the service-related data may be connected from different service facilities of a service organization (e.g., from one or more Electronic Service Record (EMR) systems respectively associated with different service facilities). In another example, the service-related data could be collected from one or more entities affiliated with the different service facilities (e.g., insurance companies, contractors, other service providers, etc.). The data can further include an identification of a user and/or other user-pertinent information (e.g., user service records, service history, genetic data, biometric data, actual or suspected diagnosis, and/or demographic information). The transformative integration engine 904 may receive the data in any suitable format and may transform the data into a format that is suitable for reception by the prediction model management engine 902. For example, the prediction model management engine 902 may access the transformed data via the interface engine 224 of the transformative integration engine 904. Data may be received by the prediction model management engine 902 using any suitable cadence, including being received in substantially real-time (e.g., once a day, once an hour, once every minute, every few seconds, etc.). The data may be received (directly or indirectly) via either push or pull technology. In some examples, newly received data may be used to update (e.g., retrain) one or more prediction models of the prediction model management engine 902.

The prediction model management engine 902 includes a data preparation engine 914, a prediction model generation engine 922, a prediction model administration engine 924, and a data store 915. Generally, the data preparation engine 914 is configured to receive and process service-related data from the transformative integration engine 904. In some examples the data preparation engine 914 may prepare (e.g., further transform and/or segment) service-related data so that the data may be used to train and validate a prediction model. For example, a data set of service-related data may be split into different subsets by the data preparation engine 914. A training data subset may be generated that is used to train a particular prediction model (e.g., by adjusting the weights between interconnected nodes of a neural network). In some examples, the same (or similar) training data subset may be used to train one or more prediction models utilizing different algorithms, and then a best model may be chosen. A cross-validation subset may also be generated and used to compare the performances of prediction algorithms that were created based on the training set. The cross-validation subset may be a separate set of data that is held back from training the model, and may be used to minimize over-fitting of data (e.g., verifying that any increase in accuracy achieved over the training data set is not due to over fitting). A test subset (e.g., separate from the training subset and cross-validation subset) may also be used to determine how a particular prediction algorithm will perform on new data. In some examples, any suitable segmenting of data received from the transformative integration engine 904 may be determined by the data preparation engine 914 for training a prediction model.

As discussed further herein, different types of algorithms (e.g., machine learning algorithms, heuristic algorithms, etc.) may be used to generate prediction models. For example, the prediction model management engine 902 may perform supervised or unsupervised learning to generate prediction models. Typically, especially in the case of supervised learning, as part of the training and validation processes, ground truth labels may be created for data samples and included in (or alongside) one or more of the subsets of data determined by the data preparation engine 914. A ground truth label may refer to information that is provided by direct observation, as opposed to information provided by inference. The ground truth label may be used to measure the accuracy of a training data set's classification. For example, a prediction model may be trained to predict whether a user has a particular condition (e.g., cancer) or status (e.g., likely to be discharged within 24 hours). This prediction may be associated with a present and/or future condition or status. A ground truth label for a particular user may be determined based on an actual observed outcome of the particular user's condition (e.g., a physician confirms that the user has cancer). The training sample for that user may include other data (e.g., blood analysis, biometric data, etc.), which may be used as input to train a prediction model. The prediction that is output by the prediction model may be compared against the ground truth label to determine the accuracy of the prediction, and the comparison results may be used to adjust (e.g., learn) weights and/or parameters of the model accordingly.

In some examples, the data preparation engine 914 may perform semantic tagging and indexing of service-related data (e.g., categorizing data). The data preparation engine 914 may also determine if gaps exist in the pool of data samples, whereby new data should be obtained to increase training coverage. For example, some users' service records may omit an attribute (e.g., Body Mass Index (BMI)) which may be determined to be an important feature for training a particular prediction model. In this case, the data preparation engine 914 may tag these records as requiring attention and transmit a notification to a user device of a system administrator for further action. The data preparation engine 914 may also perform feature engineering, which may involve further transforming and/or extracting the data into a different form that is suitable for training a particular prediction model. For example, the data preparation engine 914 may receive raw data corresponding to pixels of an image (e.g., of a portion of a user's body, a movement of a clinician within a service room). The data preparation engine 914 may then perform one or more operations to analyze the pixels of the image to generate a new feature from the raw data (e.g., a level of skin redness). This new feature may then be used as one of the inputs to a machine learning algorithm (e.g., predicting a type of condition). It should be understood that, in some cases, the data preparation engine 914 may execute a previously generated prediction model in order to engineer a feature that may in turn be used to train another prediction model.

From the data preparation engine 914, data may flow to the data store 915. The data store (and any other data store discussed herein) may include one or more data stores, which may be distributed throughout two or more different locations (e.g., present on different devices, which can include devices of different entities and/or a cloud server). In some examples, the data store 915 includes a training data store 916, a validation data store 918, and a prediction model data store 920. Within each of the data stores 916, 918, and 920 is stored prediction model-related data. In some examples, the structure of one or more of the data stores 916, 918, or 920 may be similar to data store 226. The training data store 916 may contain training data that is used to train a prediction model. The training data may include multiple samples (e.g., based on user service records), and may include ground truth data for each sample. Different sets of training data may be created from the multiple samples (e.g., generating a new training data set on a predetermined time interval). The different training data sets may also be training data subsets that are randomly generated from an overall pool of training data samples, so as to reduce the risk of overfitting. The validation data store 918 may contain training data that is used to validate a prediction model. For example, the validation data store 918 may contain cross-validation and/or test data subsets that are generated from the pool of training data samples. The training data stored in the validation data store 918 may be determined and further curated based at least in part on the composition of the training data sets in the training data store (e.g., generating disjoint sets of data for increased accuracy during validation and testing). The prediction model data store 920 may contain one or more prediction models, which may be either trained or untrained prediction models. The trained prediction models may be generated from the prediction model generation engine 922, discussed further below. The prediction model data store 920 may further include parameters that may be used to train (or update) a prediction model. As a non-limiting example, this may include a type of loss function, a learning rate (e.g., how much to adjust data weights after each training iteration), a subsample size (e.g., indicating how many training samples should be used to train a new model), a number of nodes (e.g., in the case of a neural network), a number of leaves/levels (e.g., in the case of a decision tree), a number of trees (e.g., in the case of a boosted decision tree model), etc.

The prediction model generation engine 922 is configured to generate one or more trained prediction models based at least in part on data from the data store 915. A trained prediction model may be trained to identify which set of one or more categories a new observation (e.g., data from user's service record) belongs. In the case of supervised learning, this may be based on the training set of data containing observations whose category membership is known (e.g., a user who is known to have a particular cancer, which observation may be recorded as a ground truth label). In the case of unsupervised learning, this may be based on grouping data into categories based on some measure of inherent similarity or distance (e.g., clustering). In either type of learning, a trained prediction model may classify an observation as a binary classification (e.g., user has or does not have a particular condition or service status) or a multiclass classification (e.g., user has probability of having a particular type of condition of several possible types of conditions). In some examples, a trained prediction model may use observation data to output one or more classifications (e.g., assessments) about one or more respective aspects regarding a user's condition (e.g., a likelihood of illness, a type of injury, a severity of injury, etc.) and/or service status (e.g., likely to require admission to an intensive service unit (ICU), likely to be discharged within 24 hours, likely to require readmission within 7 days, etc.). Each of these one or more classifications may be either binary or multiclass classifications. The classifications may include one or more values (e.g., a binary value, or a real number (between 0-1)) that indicate a likelihood of a particular classification being an accurate assessment.

The prediction model generation engine 922 may utilize one or more artificial intelligence techniques to generate a prediction model. As used herein, the term "artificial intelligence" (AI) refers to any suitable computer-implemented artificial intelligence technique including, but not limited to, machine learning (ML) (supervised or unsupervised), natural language processing, machine perception, computer vision, affective computing, statistical learning and classification, Bayesian network models and Kalman filters, reinforcement learning including neural networks (e.g., convolutional neural networks (CNNs), recurrent neural networks (RNNs) such as Long short-term memory (LSTM), etc.), search algorithms and optimization algorithms (including evolutionary computing), heuristic-based algorithms, and automated reasoning. Non-limiting examples of classification algorithms include use of hidden Markov models, decision trees (e.g., boosting decision trees, random forests), support vector machines, etc.

The prediction model administration engine 924 may be utilized to configure the prediction model management engine 902. In some examples, the prediction model administration engine 924 may include an auditing engine 926, a reporting engine 928, and a rules engine 930. The auditing engine 926 may include elements for tracking and monitoring the performance of a prediction model. For example, the auditing engine 926 may be configured (e.g., by a user device 910) to monitor precision and recall values, F1 scores, specificity values (and/or relative statistical data associated with a confusion matrix) for a prediction model over time, as new data is received and input into the prediction model. The reporting engine 928 may include elements for generating one or more reports that are consumable by a user 912 via a user device 910. For example, the reporting engine 928 may execute one or more trained prediction models to generate a report for a one or more users. The report may indicate, for each user, a predicted classification of the user based on current user data (e.g., whether the user has a particular condition or not). The report may include other information (e.g., user demographics, user admission data, etc.), which may assist a user service coordinator in determining a course of service for the user. The reports engine 928 may also output reports on a periodic basis that indicate the performance of one or more prediction models, which may be used to determine whether a model should be retrained with updated data. The rules engine 930 may determine one or more rules for managing aspects of the prediction model management engine. For example, the rules engine 930 may receive input from a user device 910 that is used to configure the data preparation engine (e.g., add a new feature to the list of predictive features being tagged). The rules engine 930 may also be used to configure aspects of the data store 915 (e.g., controls for determining which data should be grouped into a training subset versus a test and/or cross-validation subset, how large a training sample subset should be, etc.). The rules engine 930 may also be used to configure aspects of the prediction model generation engine 922. For example, the rules engine 930 may receive input indicating when a new prediction model should be generated (e.g., on a predetermined cadence, using one or more ML algorithms with particular parameters, etc.). The rules engine 903 may also be used to determine one or more heuristics that may be used as input to the prediction model generation engine 922. For example, one heuristic may indicate that if a user has previously missed more than one scheduled appointment, then they may be more likely to miss future appointments (e.g., and thus may be a good candidate for receiving a reminder call from a USP about future appointments). The heuristics may be determined by a human (e.g., a USP) and input into the rules engine 930, or may be determined automatically (e.g., by the prediction model generation engine 922). For example, the prediction model generation engine 922 may be trained to recognize patterns and make inferences based on those patterns (e.g., if a person misses more than three appointments, they are highly likely to miss future appointments). These inferences may be formulated into rules used to generate a prediction model.

Figure 10:
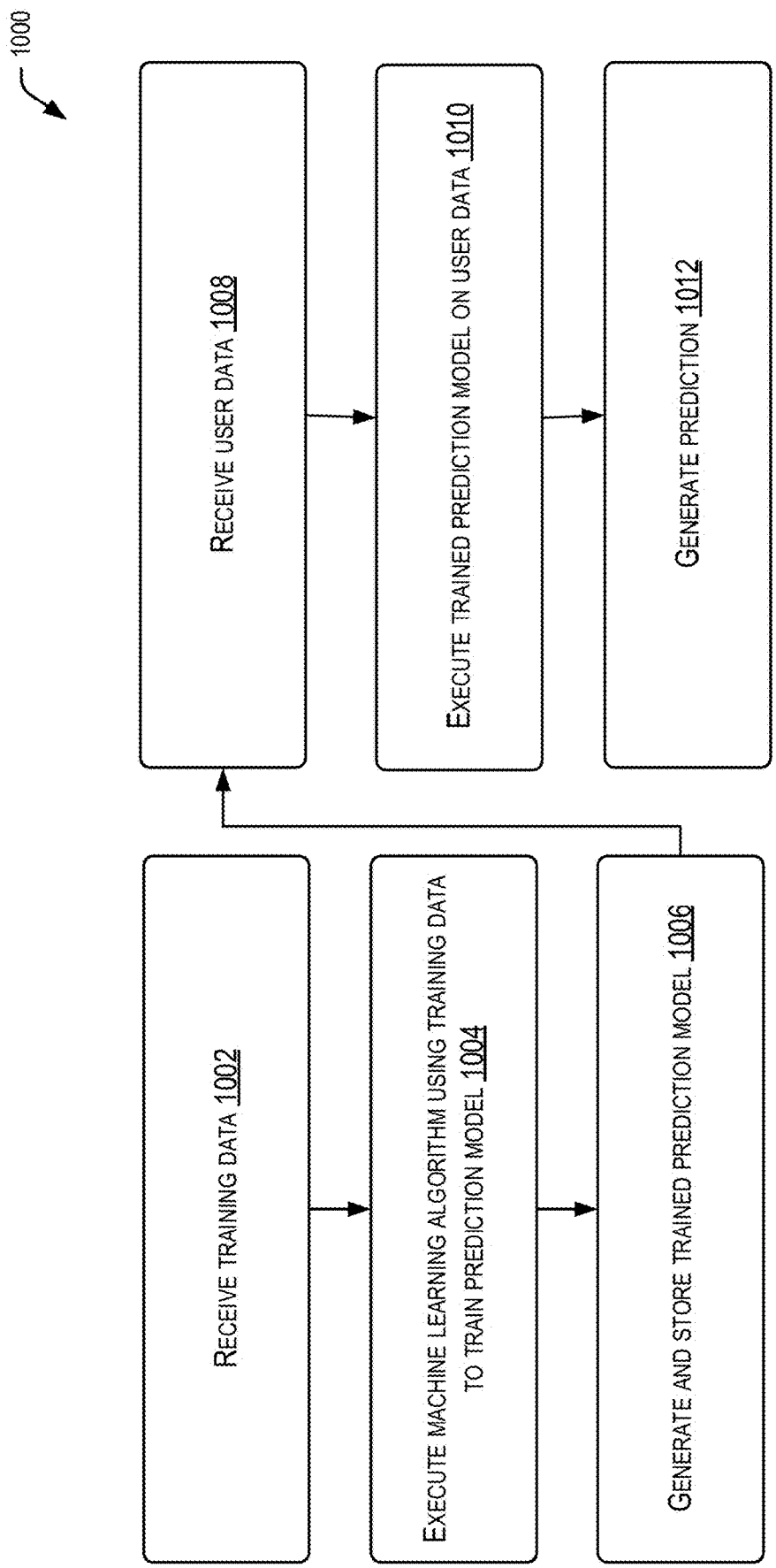
FIG. 10 is an example flowchart illustrating a process for classifying users and/or resources, according to at least one example.

Turning to FIG. 10, an example flow 1000 is depicted for a computer system training a prediction model and executing the trained prediction model. The flow diagram may proceed in two phases: a training phase (blocks 1002-1006) and an execution phase that follows the training phase (blocks 1008-1012). In some embodiments, the computer system that performs the flow 1000 may correspond to the service provider prediction system 900 of FIG. 9.

Some or all of the flow 1000 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

Additionally, these processes are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement the processes.

The example flow 1000 may start at block 1002, whereby the system may receive training data. In some examples, the training data may be generated from one or more generation components 204 (e.g., lab systems, clinical components, service provider systems, etc.). In some examples, the one or more generation components 204 may belong to different service providers (e.g., different service facilities, groups of facilities, subsets of groups, and/or any suitable combination thereof) within a service organization. In some examples, the training data may be received from other sources outside the service organization (e.g., third party entities, government organizations). The training data may be associated with and/or derived from user data of users, for example, derived from user electronic service records. In some examples, a training data sample of the training data may include a plurality of data points that identify characteristics of a user, diagnoses made by service providers, associated service plans for the user made by the providers, associated outcomes of the user based on those service plans, health indicators for the user, laboratory test results (e.g., from blood, urine, and/or other tests), a service status of the user (e.g., recently discharged, completed round three of chemotherapy service, recently was administered a particular medication, etc.), and other suitable information. In some examples, the training data may indicate not only historical service data, corresponding to previous admissions of the user, but may also include present admission data, corresponding to a present admission of the user for a condition. The user data may be received in any suitable form, including structured and/or unstructured user data. Structured data may be data that is organized and formatted in a way that is directly searchable (e.g., in a relational database). Examples of structured user data may include user service records, test results, chart information, etc. Unstructured data may have no (or limited) pre-defined format or organization. Examples of unstructured data may include a clinician's notes, service images, user feedback/correspondence, etc. In general, both structured and unstructured data may be formatted in any suitable way, including, but not limited to, text, audio, video, digital images, and numerical values. The training data may be processed and/or transformed into a suitable form for training a prediction model, for example, by data preparation engine 914. In some examples, this may involve semantically tagging the data, segmenting the data into different subsets (e.g., training sets, cross-validation subsets, testing subsets, etc.), performing feature engineering to generate one or more features for training the prediction model, etc. The training data may be stored in a data store (e.g., data store 915) for future use in training a prediction model.

At block 1004, the system may execute a machine learning algorithm using the training data to train a prediction model. Any suitable machine learning algorithm may be used to train the prediction model, including supervised learning algorithms (e.g., logistic regressions, neural networks), unsupervised learning algorithms (e.g., K-means, Apriori algorithm), and/or reinforcement learning algorithms (e.g., Markov decision processes).

In a first non-limiting example of a supervised learning algorithm, a neural network machine learning algorithm may be used to generate a prediction model using a set of inputs (e.g., training data) that includes one or more features, which in some cases may be measurable properties derived from user data (e.g., blood cell count, blood pressure, age, etc.). Any suitable number of features may be used as input to generate the prediction model. Using this technique, the set of inputs may be used as an input layer and the set of outputs may be used as an output layer. In this technique, the input layer may be connected to the output layer via one or more hidden layers. Each layer may include a set of one or more nodes, whereby each node may represent a piece of information. The generated prediction model may include a number of interconnections between the hidden layers and the input layer and/or output layer (e.g., between nodes of the different layers), each of which may be assigned a numeric weight generated based on a pattern identified between the set of input values and the set of output values. The weight may be tuned (e.g., based on a training dataset), rendering the artificial neural network adaptive to inputs and capable of learning. Generally, the hidden layer(s) allows knowledge about the input nodes of the input layer to be shared among the output nodes of the output layer. To do so, a transformation/is applied to the input nodes through the hidden layer. The artificial neural network may also use a cost function to find an optimal solution (e.g., an optimal transformation function). The optimal solution represents the situation where no solution has a cost less than the cost of the optimal solution. In an example, the cost function includes a mean-squared error function that minimizes the average squared error between an output f (x) (e.g., a prediction, given training data input x) and a target value y (e.g., a ground truth value) over the example pairs (x, y). In some embodiments, a backpropagation algorithm that uses gradient descent to minimize the cost function may be used to train the artificial neural network. In this example, one or more parameters (e.g., which also may be known as "hyper-parameters") may be used to administer the training process. For example, these parameters may include determining how many hidden layers of nodes to use between the input layer and the output layer, and how many nodes each layer should use. In this example, the collection of nodes and determined weights (e.g., based on training data) between interconnections of nodes between the different layers may form the trained model. Once the artificial neural network (i.e., prediction model) has been generated, it may be used to predict one or more events (e.g., regarding a user's present and/or future condition and/or service status) upon receiving input (e.g. user data).

In a second non-limiting example, a boosted decision tree technique may be used to generate a prediction model using a set of inputs (e.g., training data) that includes one or more features. Each feature may directly correspond a data point (e.g., BMI, blood pressure, etc.), or be derived from one or more data points, similar to as described earlier. This technique is also a supervised learning method and may utilize a labeled dataset with ground truth data. A pre-trained decision tree may receive a set of input features as input and then split the input data based on those features. For example, a given node in a decision tree may split (e.g., determine an outcome) based on the respective values of one or more input features input to the given node. The selection at each node of what is the next best feature to split on may be performed based at least in part on determining which features maximize information gain and/or to minimize entropy, and may be chosen as part of a (e.g., recursive) learning/training process used to generate the decision tree. The process may be repeated until a stop condition is met (e.g., the process reaches the depth of the tree, no more information gain, etc.). Terminal nodes of the decision tree may represent a class (e.g., segment) label (e.g., the user has a particular condition) or probability (e.g., probability that user has a particular condition), which may correspond to a prediction outcome. In some examples, the outcome may be a continuous variable.

Using a boosted decision tree technique, multiple weak learners (e.g., an ensemble of decision trees) may be combined into a strong classifier. In some examples, each new decision tree may be created iteratively with respect to a distribution (e.g., associated with ground truth data from a training data set), and new trees may be generated based at least in part on previous trees. On each iteration, the new tree's prediction from a data sample may be given a weight relative to its accuracy. In some examples, the ensemble output (from the multiple trees) may be a weighted sum that may be compared against the ground truth. Additionally, after each iteration, each data sample (e.g., including one or more features from the data sample) may also be given a weight based the decision tree's misclassification. In this way, the more often a data sample is misclassified, the more important the data sample (and/or individual features of the data sample) becomes. The process of training the ensemble of decision trees that collectively predict an outcome (i.e., "boosting") may also include minimizing a cost function, which, similar to above, may include a function that measures the distance between the ground truth (y) and an output f (x) (e.g., to minimize the mean-squared error).

Based at least in part on the relative weight of the output of each decision tree in an ensemble and/or the relative weights of data samples, the system may be able to determine a relative importance of features among the set of features that are represented in the ensemble of decision trees (e.g., represented by the positioning of each node within a respective decision tree and the splitting behavior assigned to the node). In some examples, the relative importance among features may represent which feature is likely to result in the most information gain among other features. The system may also be able to determine, based at least in part on the splits determined for each node in the ensemble of trees, classifier decision boundaries. A classifier decision boundary is a decision boundary that partitions an underlying vector space into two sets (e.g., user has the condition, or the user does not have the condition). In some examples, a classifier decision boundary may be determined by an ensemble of classifiers (e.g., a boosted decision tree model) based at least in part on respective values (e.g., a range of values) for one or more features of the plurality of features that are input into the model. In a simplified example, one feature may be age, and another feature may be BMI of a user. For a particular condition, the model may determine that for an age range of 60 years old or more, and a BMI range 15-17, a user would be classified as having a particular condition. In some examples, multiple classifier decision boundaries may be determined from a boosted decision tree model, which may be collectively used as input to determine a final prediction. For example, one classifier decision boundary may determine, from one set of features, that the user is likely to have a condition with a first probability. Another classifier decision boundary may determine, from another set of features, that the user is likely to have (or not have) the condition with a second probability. The first and second probabilities may be combined together to determine a final probability (e.g., prediction). In some examples, this combining process may be represented within the trained boosted decision tree model using ensemble modeling. Similar to the neural network example, one or more parameters may be used to administer the training process. For example, these parameters may include determining a maximum depth of a tree, a maximum number of leaves, a maximum number of features (e.g., from the full set of features) that may be used to build a given tree, a minimum number of samples required to make a new leaf, etc.). Once the (boosted) decision tree prediction model has been generated, it may be used to predict one or more events (e.g., regarding a user's present and/or future condition).

While two possible examples of prediction models were mentioned above, it should be understood that any suitable prediction model may be utilized. Typically, the system will receive training data (e.g., service-related data received from the service organization) that is used to train the prediction model by learning characteristics (e.g., patterns and/or relationships, for example via heuristic algorithms) from the training data and thereby determining properties (e.g., weights) of the model. The system may also determine one or more parameters that may be used in training the model, whereby the parameters may be determined based on the type (e.g., structure) of model chosen (e.g., neural network, decision tree, linear regression, naive Bayes, etc.). In some examples, one or more prediction models may be executed together (e.g., using an ensemble modeling) to obtain better predictive performance. Additionally, in some examples, the output of one prediction model may be used as an input (e.g., as a feature) to another predictive model for generating a prediction. For example, a first prediction model may be a neural network (e.g., a natural language processing (NLP) model) that may be trained to receive as input clinician notes of a report (e.g., a pathology report that includes text-based unstructured data input). In some examples, the NLP model may utilize a word2vec model (e.g., a continuous bag-of-word (CBOW) model or a skip-gram (SG) model). The word2vec model may be used to learn word embeddings in order to determine semantic meanings of words within the clinician notes. The NLP model may be trained similar to as described herein (e.g., based on a corpus of clinicians notes compiled from clinicians throughout the enterprise). The NLP model may be trained to recognize words from the report and predict a likelihood of a particular condition (e.g., breast cancer). The output of the first prediction model may be used as a feature input to a second prediction model (e.g., a boosted decision tree model) that may predict a particular stage of the user condition (e.g., stage 1 breast cancer) with a certain probability score. In yet another example, the trained classification model may be used to generate more than one score for a given set of user data (e.g., utilizing one or more sub-models). Each score may correspond to a level of confidence in a respective classification. It should be understood that different models may be trained using different training data, and may accordingly assign different weights to interconnections between nodes for the respective model. Also, each model may be associated with one or more classification thresholds, as discussed below, which may differ (or be similar) between models.

At block 1006, the system may generate and store the trained prediction model. The generated prediction model may include any suitable data structures utilized from block 1004 to train the prediction model, as well as learned information during the training process (e.g., a meaning assigned to a node, a position of the node within the model, a weight value for a node, etc.). In some examples, the parameters used to train the given prediction model may also be stored, for example, to be later used in updating the model. For example, the prediction model administration engine 924 may perform an audit of the prediction model, and, based on the results of the audit, determine that one or more parameters used to train the model should be adjusted (e.g., increasing the maximum number of leaves). The trained prediction model may be stored in the prediction model store 920.

At block 1008, at a later time following the generation/storage of the prediction model at block 1006, the system may receive user data (e.g., including structured or unstructured user data) for use in generating a prediction about a user (e.g., for classifying (or "segmenting") the user). In some examples, the user data may correspond to current information about a particular user (e.g., service records for a present admission to a service facility). Similar to the training data, the user data may also include a plurality of data points that identify characteristics of the particular user. In this case, however, instead of the data being used to train a prediction model, it will be used as input into the already-trained prediction model for use in generating a prediction about the condition of the user (e.g., for the present admission). In some examples, one or more of the plurality of data points of the user data may correspond to (and/or be used to derive) features by which the prediction model was trained to make predictions.

At block 1010, the system may execute the trained prediction model on the received user data. As described earlier, the system may use the user data for the particular user to extract features that are used as input to the prediction model (e.g., to an input layer of a neural network, root node of a decision tree, etc.).

At block 1012, the system may execute the trained prediction model to generate a prediction about the user (e.g., classifying the user as having a particular condition, service status, personal preference/persona, etc.). In some examples, the prediction may correspond to an assessment about a present condition or potential future condition (or service status) of the user. In some examples, the assessment may include data associated with a plurality of conditions of the user (e.g., multiple injuries on the body). In the case where the prediction corresponds to an assessment about a present condition, the prediction may indicate a likelihood that the user has a particular present condition. In the case where the prediction corresponds to an assessment about a potential future condition, the prediction may indicate a likelihood that the user will develop the potential future condition. As a non-limiting example, a potential future condition may correspond to the existence an illness affecting the user, a severity and/or stage of the illness, a likelihood that another related illness or condition may develop, etc. In some examples, the prediction may correspond to a probability score (e.g., between 0-1). In some examples, and as described herein, the prediction may correspond to a classification of a likely group to which the user belongs (e.g., Stage 1, Stage 2, Stage 3, etc.). For example, the prediction may include a plurality of probabilities that respectively correspond to a likelihood of the user's illness being at a particular stage (e.g., Stage 1=0.23, Stage 2=.64, Stage 3=0.13). As referenced herein, depending on the context, a "prediction" may be used interchangeably with a "probability score." In some examples, the prediction may be classified based on whether or not a probability score included within the prediction matches (e.g., equals or exceeds) a predefined threshold value (or "classification threshold"). For example, a user with a probability score of at least 80% may be deemed to be "High Risk." In another example, a user with a probability score of at least 80% may be determined to be classified with a particular condition with high confidence. This classification based at least in part on the predefined threshold value may be built into the trained prediction model (e.g., part of the training process), or may be a separate computation that follows the prediction model outputting one or more scores. In some examples, the trained prediction model may output different probability scores respectively for varying degrees of specificity for a particular condition. For example, the trained prediction model may output a score of 85% that corresponds to a confidence level that the user has "cancer." The model may further output a score of 70% that the corresponds to a confidence level that the user has "breast cancer." The model may further output a score of 55% that corresponds to a confidence level that the user has "stage 3 breast cancer." As updated user data is received by the trained prediction model, the respective scores may be updated accordingly.

The systems, processes, and models described with reference to FIGS. 1-10 may be used to implement the techniques described herein with reference to later figures. For example, data communication may be performed within the aggregation layer 304 or the active unified data layer 308. In some examples, messages originate at one of the components 410-418 (e.g., generation components 204) and are streamed to the data store 508. These messages may be intercepted by the collection engine 504 or any other suitable interceptor device and shared with the vision management system described herein.

Figure 11:
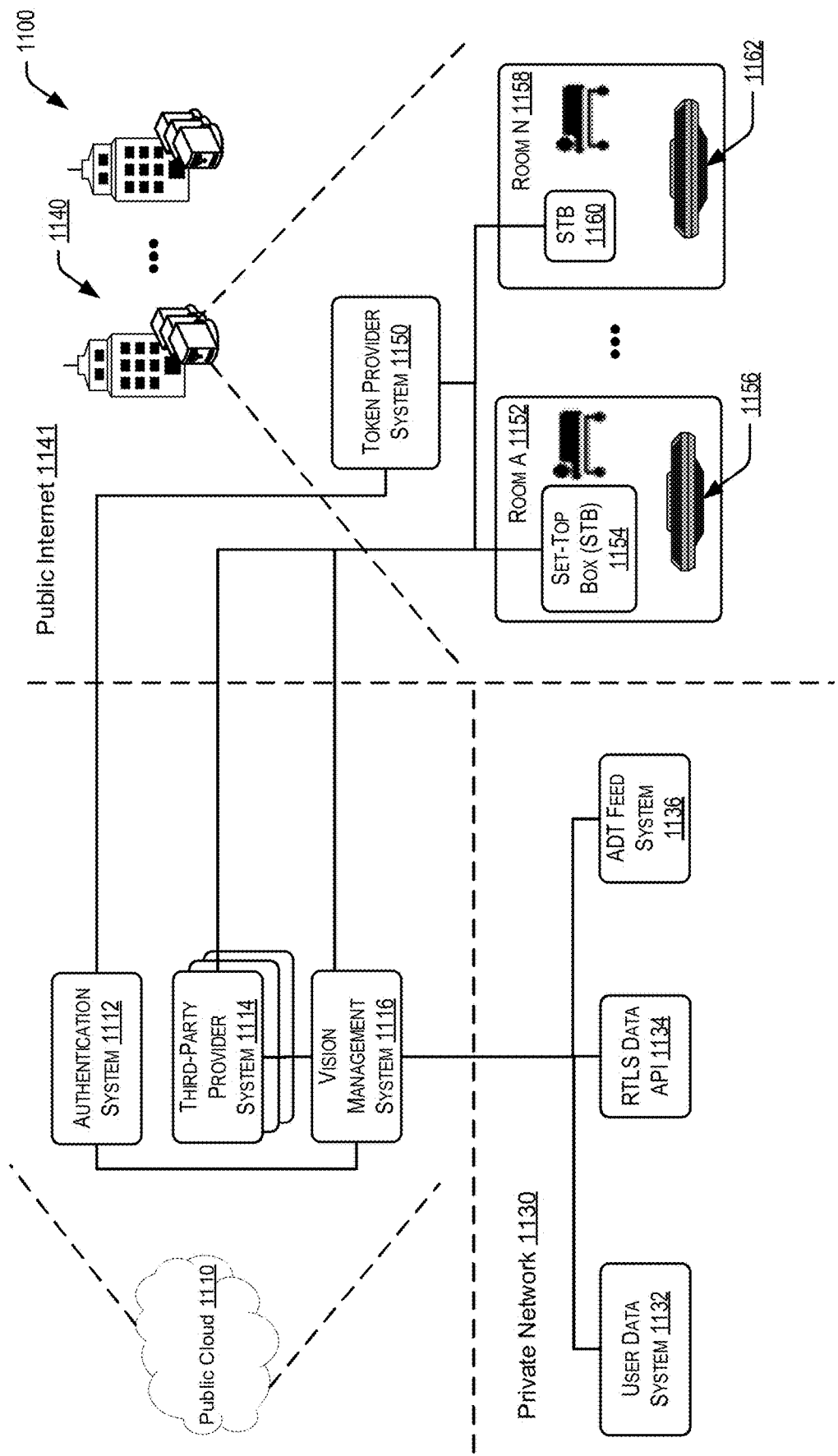
FIG. 11 is an example architecture illustrating a computer system and environment in which techniques relating to providing a unified data feed to a computing device may be implemented, according to at least one example.

Turning now to diagram 1100 of FIG. 11, a vision management system (VMS) 1116 is shown, in accordance with at least one example. The vision management system 1116 may be implemented using elements of the systems, networks, and models of FIGS. 1-10. For example, the vision management system 1116 may include similar elements as service provider prediction system 900 of FIG. 9. For example, the vision management system 1116 may include a management engine (e.g., prediction model management engine 902) and a database (e.g., included within data store 915). The vision management system 1116 may further include a transformative integration engine (e.g., similar to transformative integration engine 202 of FIG. 2). The transformative integration engine of the vision management system 1116 may be configured to receive and process data from one or more generation components (e.g., similar to generation components 204 of FIG. 2). Examples of data generation components are described further herein. The transformative integration engine of the vision management system 1116 may also be responsible for generating a data feed (e.g., a unified data feed) for transmission to one or more computing devices that are described further herein. In some embodiments, the vision management system 1116 may be managed (e.g., implemented and/or operated) by a service organization. As described further herein, the service organization may operate one or more service facilities 1140, each service facility having one or more computing resources (e.g., a token provider system 1150, a set-top box (STB) 1154, a set-top box 1160, etc.) that may be communication with the vision management system 1116 and/or other systems. In some embodiments, the service organization may also operate a private network (e.g., a private network 1130) in which one or more services operate and communicate with the vision management system 1116, described in further detail below.

Turning to FIG. 11 in further detail, and, as introduced above, the vision management system 1116 may communicate with one or more devices utilizing one or more networks, to perform embodiments described herein. For example, three different network environments are depicted in FIG. 11, in which different computing resources may operate within each environment: the public cloud 1110, the private network 1130, and the public internet 1141. The public cloud 1110 may correspond to a cloud environment (e.g., a server computer and/or server cluster executing in the cloud), whereby entities may interact with services provided by computing resources of the public cloud 1110 over a public Internet connection. The private network 1130 may correspond to a private network environment, whereby entities may interact with services provided by computing resources of the private network over a private connection (e.g., a virtual private network (VPN)). The public internet 1141 environment may correspond to devices that operate over the Internet. These devices (e.g., of a health service facility) may communicate with other devices directly over the public Internet 1141, one or more computing resources of the public cloud 1110, and/or one or more computing resources of the private network 1130. As described further herein, it should be understood that devices and/or services that operate in any one of these network environments may interact with other devices or services of another network environment utilizing any suitable network protocol (e.g., tunneling, etc.). It should also be understood that the distribution of computing resources across different types of networks, as depicted in FIG. 11, is one type of embodiment. In some embodiments, any suitable distribution of resources across one or more networks for communication may be utilized. For example, in one embodiment, the vision management system may operate within the private network 1130. In another example, the authentication system 1112 may operate within the public internet 1141.

As depicted by FIG. 11, one or more operations performed by the vision management system 1116 may be executed within the public cloud 1110. As described above, the vision management system 1116 may exchange data with one or more data sources. For example, an authentication system 1112 may also reside in the public cloud 1110 and/or transmit/receive messages via the public Internet. In some embodiments, the authentication system 1112 may be responsible for performing operations to authenticate a computing device for receiving a unified data feed from the vision management system 1116. For example, the authentication system 1112 may provide an Application Programming Interface (API) that performs authentication of tokens. In one example, described in further detail herein, the vision management system 1116 may receive a token from a computing device (e.g., a set-top box, a smart TV device) at a service facility, whereby the token is associated with a request for a unified data feed from the vision management system 1116. The vision management system 1116 may then call into the API of the authentication system 1112 to validate the token. In some embodiments, the authentication system 1112 may generate and/or maintain one or more cryptographic keys for validation of a token (e.g., decrypting the token and/or validating the contents of the token). Upon the validation of the token, the authentication system 1112 may transmit a response message to the vision management system 1116 indicating that the token is authenticated (or not authenticated). Assuming that the token is authenticated, the vision management system 1116 may then proceed to provide a unified data feed to the computing device that transmitted the token.

In some embodiments, the vision management system 1116 may request data from one or more third-party data provider systems 1114. In some embodiments, these third-party data providers may also reside in the public cloud 1110 and/or utilize the public Internet 1141 for data communications. In some embodiments, one or more of the third-party data provider systems 1114 may be examples of data generation components 204. A third-party data provider 1114 may provide any suitable type of data (e.g., data feeds) to the vision management system 1116, including, but not limited to, cable TV programming, entertainment video streaming, user educational video streaming, video-on-demand systems, etc. In some embodiments, the vision management system 1116 may direct (e.g., re-direct) a computing device to stream content directly from a third-party data provider 1114, with the vision management system 1116 serving as a conduit to regulate and/or monitor the flow of traffic between the computing device and the third-party data provider 1114. As described further herein, by operating as a centralized system for providing data feeds to computing devices of one or more service facilities, the vision management system 1116 may more efficiently analyze and troubleshoot any network traffic problems which may be experienced by one or more devices (e.g., a subset of devices on a particular floor in a service). In some embodiments, the vision management system 1116 may retrieve data contents directly from a third-party data provider system 1114 (e.g., via a third-party integration API), and/or store the content in a data store of the vision management system 1116. Then, upon receiving a later request from a computing device, the vision management system 1116 may directly provide that content to the computing device. In some embodiments, the vision management system 1116 may execute an API call to a third-party integration API in real-time, whereby the third-party integration API calls into a third party data provider system 1114, retrieves and provides data to the vision management system 1116, and whereby the vision management system 1116 may subsequently provide the data to a requesting party in real-time.

Turning to data sources operating within the private network 1130 in further detail, these data sources may include, among other data sources, a user data system 1132 (e.g., which may store clinical data associated with the user), a real time location system (RTLS) data API 1134, and an Admission Discharge and Transfer (ADT) feed system 1136. One or more (e.g., all) of these data sources may service facilities across the entire service organization (e.g., multiple service facilities). In some embodiments, one or more of these data sources may correspond to data generation components 204. The user data system 1132 may be responsible for storing clinical data associated with a user. This may include historical service data of a user and/or present service data of the user. For example, this may include blood test results, the user's vital statistics, a list of user service professionals (USPs) that have treated (or are currently treating) the user, USP notes regarding user services, prescriptions for the user, or any suitable data related to user service. In some embodiments, the user data system 1132 may utilize an EMR system to manage user record data. It should be understood that at least a portion of the data managed by the user data system 1132 may be updated in real-time and provided to the vision management system 1116. In some embodiments, the user data system 1132 may implement an API that is exposed to the vision management system 1116, and provide data to the vision management system 1116 upon invocation of a particular API call. In this way, the vision management system 1116 may be able to retrieve a richer and/or more targeted selection/collection of user data. For example, the vision management system 1116 may be able to request specific data objects/elements associated with the user (e.g., instead of an entire user record), which may subsequently integrated into the unified data feed. In some embodiments, this mechanism may also reduce network traffic.

In some embodiments, the RTLS data API 1134 may be implemented by a service that provides immediate or real-time tracking and management of service equipment, staff, and/or users within a service environment. The RTLS data API 1134 may receive data from location sensors that are attached and/or otherwise connected to various assets and/or associated people of a service facility (e.g., a user, a staff member, a piece of equipment). The RTLS data API 1134 may utilize the sensors to provide real-time information about the asset's positioning (or person's positioning) within the facility. Accordingly, the RTLS data API 1134 may enable the vision management system 1116 to invoke an API call and receive data that tracks the locations of various assets and/or persons within a service facility, and/or among service facilities of a service organization.

In some embodiments, a user processing system that executes a user processing service may also receive and/or transmit data over the private network 1130 to/from the vision management system 1116. A user processing service may receive and process real-time data associated with the status of a service of a user (e.g., a clinical process) within a service facility. In one example, the ADT feed system 1136 may be an example of a user processing system that executes a user processing service. The ADT feed system 1136 may receive, for example, information from one or more devices indicating a status of a user (e.g., admission to a particular service facility, transfer within and/or to another facility, discharge from a service facility), updates to the user's service record, updates to personal (e.g., demographic) information about the user, etc. The ADT feed system 1136 may generate an ADT feed, which may correspond to a series of messages (e.g., utilizing an HL7 data format). In some embodiments, a user processing service (e.g., the ADT feed system 1136) may transmit a data feed to the vision management system 1116, including a series of messages, which enables the vision management system 1116 to track a user's service progress as they are treated by USP's within a service facility. For example, the ADT feed system 1136 may receive an indication from a user device (e.g., of a USP) that a particular user's test results have arrived, and that the user is likely to be discharged within an hour. The ADT feed system 1135 may then transmit a message to the vision management system 1116 that alerts the vision management system 1116 that the user is likely to be discharged soon. The vision management system 1116 may determine whether to take subsequent action, for example, to transmit a message to a computing device (e.g., a set-top box) of one of the service facilities, as described further herein. In some embodiments, a user processing service may utilize any suitable data format (e.g., HL7 format) and/or message type (e.g., ADT messages, order messages (ORU), results messages (ORM), etc.).

In some embodiments, one or more computing systems within the private network 1130 may implement third-party integration API's. For example, a third-party data provider system 1114 may be associated with a third-party provider API service that executes within the private network 1130.

Accordingly, the vision management system 1116 may execute calls to a third-party provider API over the private network 1130, instead of performing an Internet call.

Turning to devices that operate within the public Internet environment 1141, as described herein, the service organization (e.g., associated with the private network 1130) may operate one or more service facilities 1140. In one example, a service facility may correspond to a physical structure (e.g., a building) that includes one or more rooms for treating users. In the example of FIG. 11, a particular service facility may include rooms A through N, as illustrated by room A 1152 and room N 1158. Within room A 1152 (and/or other rooms, including room N 1158) may include, among other things, a computing device (e.g., the set-top box (STB) 1154), a bed, and a display unit (e.g., a television 1156, computer monitor, tablet display, etc.). Similarly, room N 1158 may include a set-top box 1160. Turning to the setup of devices in representative room A 1152 in further detail, the set-top box 1154 may be communicatively connect to the display unit, for example, via a cable connection or wirelessly (e.g., via Wi-Fi connection). In some embodiments, the set-top box 1154 and the display unit may be housed within the same physical unit. Although the computing devices located within rooms of a service facility are primarily depicted herein as being set-top boxes, embodiments should not be construed to be so limiting. For example, any suitable computing device may be utilized to perform embodiments herein, including, but not limited to a personal computer (PC), a laptop, a digital media player device, etc. Typically, a display may be positioned (e.g., mounted) in a room so that the user may view the display and interact with the display (e.g., via the bed or a chair, etc.).

In some embodiments, as primarily depicted in embodiments herein, a single user may be assigned to a room, whereby the user may interact with a computing device and display in that room. In some embodiments, more than one user may be assigned to a particular location within a service facility. For example, a larger room may allow for multiple users to assigned to the room. In this case, there may be suitable dividers between users. In any case, for a given particular location in a service (e.g., a private room, a sub-division within a larger room, etc.) in which a user may be assigned and receiving service, a computing device (and connected display) may be assigned to that particular location, whereby the user may interact with the computing device via the display.

In some embodiments, a particular location (e.g., user room A 1152) may be associated with a location identifier. For example, the location identifier may be a suitable sequence of numeric digits or alphanumeric characters. The location identifier may unique so as to enable identification of the particular location within a service facility and/or service organization. In some embodiments, a computing device (e.g., set-top box 1154) that is positioned within a particular location may also be associated with a unique device identifier. In one example, the unique device identifier may be a serial number that is embedded in a hardware of the device (e.g., a MAC address, a factory-assigned identifier). In some embodiments, the unique device identifier may reside (e.g., be stored or otherwise embedded) on the computing device in plain text or encrypted format.

In some embodiments, as described further herein, the vision management system 1116 may be receive input to assign a particular location (e.g., room A 1152) to a particular computing device (e.g., set-top box 1154). To perform this assignment, the vision management system 1116 may store an association between a location identifier of the particular location and the device identifier of the particular computing device in a database (or other suitable data store). This assignment may be subsequently used by the vision management system 1116 for providing a unified data feed to the computing device, as described further herein.

In some embodiments, a computing device may not store (and/or maintain in memory) user-specific information on the computing device. For example, although a particular user may be admitted to room A 1152 for service, the set-top box 1154 may not store information about the user that is currently admitted. The set-top box 1154 may also not store information about users previously admitted to that room, or scheduled for future admission. Instead, as described further herein, in some embodiments, the computing device may transmit a request for a data feed to the vision management system 1116 that is independent of (e.g., does not include) user-identifying information. The request may contain any suitable information, for example, including the device identifier for the device. The vision management system 1116 may then determine the user currently admitted to room A 1152 based in part on the device identifier, and then provide the unified data feed to the device. In this way, embodiments may enable a greater privacy protection for users, while still enabling relevant real-time data to be presented for admitted users.

In some embodiments, a service facility may also contain a token provider system 1150. In one example, the token provider system 1150 may correspond to a headend system (e.g., device). In some embodiments, the headend device may operate as a gateway device that coordinates between network traffic that is local to the particular service facility and network traffic that external to the service facility. In some embodiments, the headend device may perform tasks associated with receiving network traffic and distributing (e.g., broadcasting) signals to devices within the service facility (e.g., cable TV channel broadcasting, etc.). In some embodiments, because the headend device is positioned as a gateway device for the particular service facility, the headend device may be able to perform management and/or authorization tasks for devices that operate over the local network of the particular service facility. For example, as described further herein, the token provider system 1150 may receive a request from a computing device (e.g., set-top box 1154) for a token. The token may be subsequently included by the set-top box 1154 in a request message that is transmitted to the vision management system 1116, whereby the vision management system 1116 authenticates that the token is authentic, and then provides a data feed to the requesting set-top box 1154 in response to the request. To provision a token to a requesting computing device, in one embodiment, the token provider system 1150 may first receive a request from the computing device (e.g., set-top box 1154). The token provider system 1150 may then determine that the device is operating on the same network as the token provider system 1150, and thus, the device is physically present at the particular service facility (e.g., and thus, should receive a token). Note that, if the device were at a different location that is not recognized by the authorized token provider system 1150 (e.g., a person's home), the token provider system 1150 may recognize that the token request came from a different network (i.e., a different physical location from the service facility), and thus, is not authorized to receive a token. In some embodiments, the token provider system 1150 may determine any suitable location data based on network traffic. For example, the token provider system 1150 may provide a token based on recognizing that a particular device is at a particular location (e.g., room A 1152) within the service facility. Thus, in one embodiment, if a token request were coming from a computing device that is not within an expected particular location within the service facility, the token provider system 1150 may deny the request for a token (e.g., unless and/or until the computing device is properly reassigned to a new location).

In some embodiments, the token provider system 1150 may be associated with the authentication system 1112. For example, a token authentication service provider may operate the authentication system 1112, which may generate and/or store one or more cryptographic keys that are later used to authenticate a token. The authentication system 1112 may provide one or more cryptographic keys to the token provider system 1150, for use in generating the token. When receiving a request from a computing device to generate a token, the token provider system 1150 may encrypt data utilizing the one or more cryptographic keys received from the authentication system 1112. It should be understood that any suitable data encryption algorithm may be utilized, including, but not limited to Data Encryption Standard (DES), tripe DES, Advanced Encryption Standard (AES), etc. Embodiments described herein may utilize symmetric or asymmetric encryption techniques to encrypt and/or verify data. As described further herein, when a computing device (e.g., set-top box 1154) subsequently sends a request for a data feed that includes the encrypted token to the vision management system 1116, the vision management system 1116 may hand off the authentication of the token to the authentication system 1112. The authentication system 1112, which may store the appropriate cryptographic keys, may then decrypt and verify the token, and then return results to the vision management system 1116. In some embodiments, the vision management system 1116 may perform the authentication locally on the vision management system 1116 itself, without calling into the authentication system 1112. For example, a token may have a predetermined expiration date/time. If a request is received with a previously validated token that has not expired, the vision management system 1116 may thus authenticate the token.

It should be understood that embodiments described herein for authenticating a token may utilize any suitable combination of devices. For example, in one embodiment, the vision management system 1116 may perform one or more functions described in reference to the authentication system 1112. In some embodiments, instead of the token provider system 1150 being physically positioned at a service facility and providing tokens to devices on the local network of the facility, computing devices of the service facility may directly request a token from the authentication system 1112 and/or the vision management system 1116. In some embodiments, and, as described further herein, the token provider system 1150 or the authentication system 1112 may correspond to a federated identity management system that manages device credentials.

In some embodiments, any one or more of the systems described herein may implement an API that defines interactions with other devices. For example, the vision management system 1116 may invoke an API of the authentication system 1112 to perform authentication of tokens. In another example, the vision management system 1116 may invoke an API of a third-party data provider system 1114 and/or other systems operating in the private network 1130. In this way, the vision management system 1116 may efficiently query for targeted data, which the vision management system 1116 may then collate to generate a unified data feed for transmission to (and presentation by) a computing device (e.g., set-top box 1154).

Figure 12:
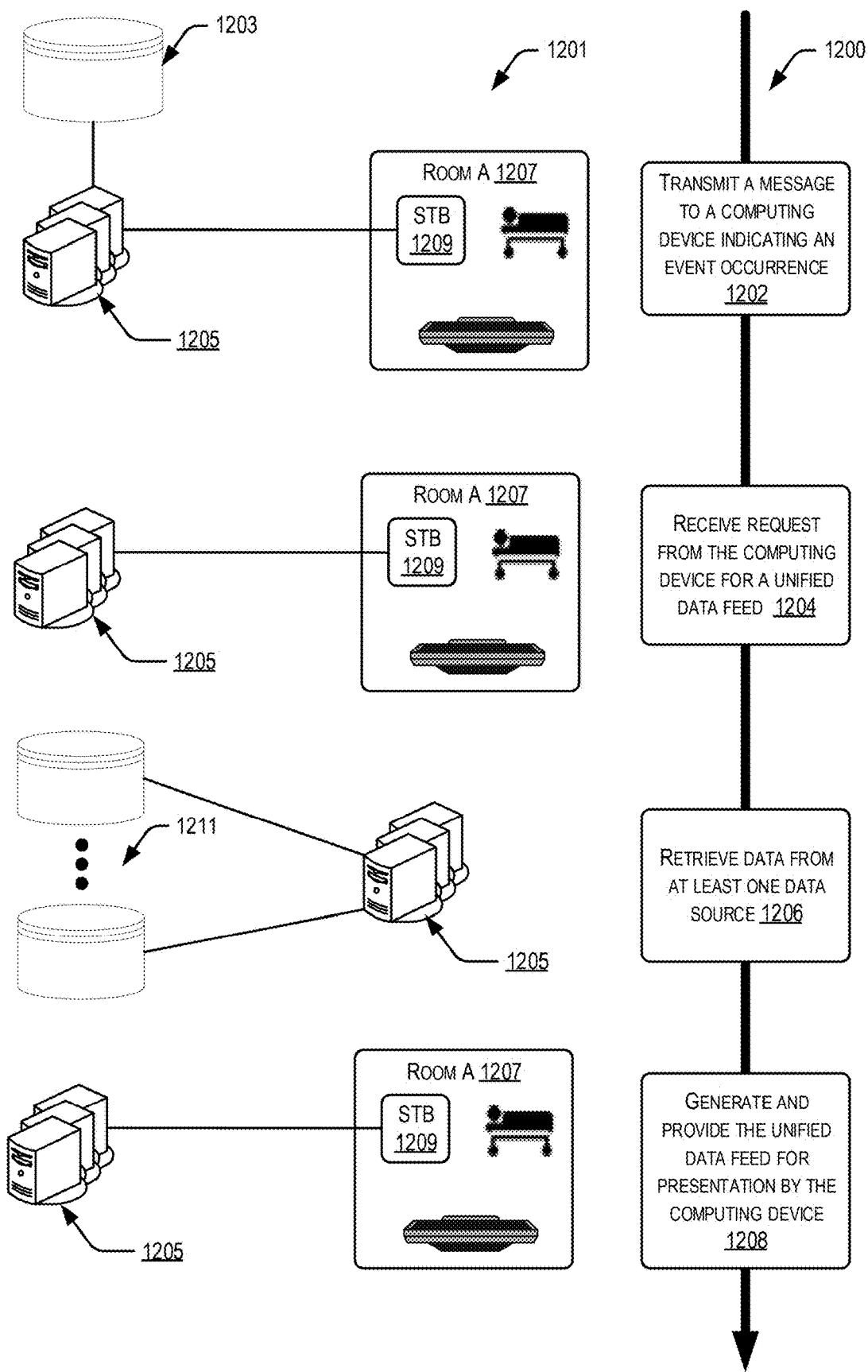
FIG. 12 is an example flowchart illustrating a process for providing a unified data feed to a computing device, according to at least one example.

FIG. 12 illustrates a simplified block diagram 1201 depicting an example process 1200, in accordance with at least one example. The process 1200 is an example process for providing a data feed associated with a particular user located at a particular location of a service facility. The diagram 1201 depicts example states that correspond to the blocks of the process 1200. The diagram 12001 includes a user processing system 1203 that operates a user processing service (e.g., which may be similar to the ADT feed system 1136 of FIG. 11), a vision management system 1205 (e.g., which may be similar to vision management system 1116), a set-top box 1209 (e.g., similar to one of the set-top boxes of FIG. 11), and one or more data sources 1211. The one or more data sources may be associated with any suitable data sources described herein, including, for example, a third party provider system (e.g., similar to the one or more third party data provider system(s) 1114 of FIG. 11), a user data system 1132, and/or a RTLS data API 1134. Although computing devices illustrated herein may typically correspond to set-top boxes, embodiments should not be construed to be so limiting. For example, a computing device may correspond to a smart TV device, a tablet device, a personal computer (PC), a laptop, etc.

In some embodiments, prior to the operations of block 1202 of process 1200, the vision management system 1205 may maintain an association between a device identifier of a computing device and a location identifier of a particular location of a service facility. For example, the set-top box 1209 may be assigned to room A 1207 of the service facility. The set-top box 1209 may be communicatively connected to a display device in room A 1207, as depicted in FIG. 12. The vision management system 1205 may register (e.g., store) that the set-top box 1209 is assigned to room A 1207 by storing (e.g., in a database of the vision management system 1205) the association between the device identifier of the set-top box 1209 and the location identifier of room A 1207. In some embodiments, the location identifier may include any suitable information, for example, a bed identifier, a room identifier, a department unit identifier, etc. In some embodiments, as described further herein, the vision management system 1205 may register the assignment of the set-top box 1209 to room A 1207 based on receiving a request corresponding to an assignment instruction from a device. For example, another authorized user device (e.g., a mobile device) may have previously received administrator input to instruct the vision management system 1205 to assign the set-top box 1209 to room A 1207. In another example, the set-top box 1209 may have directly received input (e.g., from an administrator) and transmitted an authorized instruction to register the device as being assigned to room 1207.

Turning to process 1200 in further detail, at block 1202, the vision management system 1205 may transmit a message to a computing device (e.g., set-top box 1209) indicating an event occurrence. For example, the vision management system 1205 may receive an ADT feed message (e.g., an HL7 message) from the user processing service 1203. In one example, the ADT feed message may indicate that a particular user (e.g., identified by a unique user identifier) has been admitted to room A 1207 (e.g., identified by a particular location identifier) and is currently checked-in for service. In some embodiments, the user processing service 1203 may regularly transmit ADT feed messages to the vision management system 1205 to update the vision management system 1205 with real-time user status updates. The vision management system 1205 may, in turn, determine that set-top box 1209 is assigned to room 1207, where the current user is now admitted (e.g., determining based on the previously stored association between the location identifier and the device identifier, as described above). The vision management system 1205 may determine, for example, that since a new user is admitted, the vision management system 1205 needs to alert the set-top box 1209 to retrieve a new data feed from the vision management system 1205 and display the data feed for the new user. In some embodiments, by first alerting the set-top box 1209 of the event occurrence, which subsequently prompts the set-top box 1209 to pull data from the vision management system 1205, embodiments may reduce the amount of overhead network traffic. For example, the set-top box 1209 does not have to regularly poll the vision management system 1205 (or user processing service 1203) to determine if updates are available. Instead, updates can be coordinated by backend systems and services, and then the set-top box 1209 may be made aware that new data is available for presentation. In some embodiments, the set-top box 1209 may employ a pull model (e.g., regularly polling the vision management system 1205) to receive a unified data feed.

At block 1204, the vision management system 1205 may receive a request from the computing device (e.g., set-top box 1209) for a unified data feed. In some embodiments, the request may be independent of the particular user presently being serviced at the particular location. In some embodiments, the request may include a device identifier of the computing device. For example, consider a scenario in which the set-top box 1209 is associated with a unique serial number that is embedded (and/or otherwise stored) on the physical device. The device identifier (e.g., the serial number) may be included in the request that is transmitted to the vision management system 1205. In some embodiments, as described further herein, a token may also be included in the request, which may be used to authenticate the request. It should be understood that embodiments herein may enable enhanced privacy controls at least in part because user personal information is not stored or otherwise maintained on the set-top box 1209.

At block 1206, the vision management system 1205 may retrieve data from at least one data source. In some embodiments, to enable the vision management system 1205 to retrieve data for the particular user admitted to the room A 1207, the vision management system 1205 may first determine the device identifier within the request for a unified data feed that was received from the computing device at block 1204. Then, the vision management system 1205 may determine the location identifier of the particular location (room A 1207) to which the computing device is assigned (e.g., based on the previously stored association between the location identifier and the device identifier). The vision management system 1205 may then retrieve (e.g., from the user processing service 1203 and/or a clinical data system) a user identifier for a user currently admitted to the room associated with the location identifier for room A 1207. At this point, the vision management system 1205 may obtain a real-time indication of the particular user receiving service at room A 1207.

In some embodiments, the vision management system 1205 may then, based on the user identifier, identify particular data that should be included in a unified data feed that is presented to the particular user associated with the user identifier. For example, the vision management system 1205 may retrieve a user profile for the particular user associated with the user identifier, discussed in further detail herein (e.g., in reference to FIG. 14). In some embodiments, the user profile may indicate a graphical user interface (GUI) customization according to a user type of the particular user. In some embodiments, the user profile may indicate one or more particular data contents (e.g., from one or more data sources) that are relevant for the particular user. For example, consider a scenario in which the user profile indicates that the particular user prefers to watch a certain type of entertainment (e.g., comedy shows) when being treated at one of the service facilities of the service organization. The user profile may also indicate a present (and/or ongoing) condition for which the user is currently being treated. In this example, suppose that a first data source may correspond to one of the third-party data provider systems 1114, which may correspond to a streaming service that streams entertainment content (e.g., including comedy content suited to the user's interests). Also, a second data source may correspond to another third-party data provider system 1114, which may correspond to another streaming service that streams user education content (e.g., including content relevant to the user's current condition). A third data source may correspond to the user data system 1132, which may store real-time data regarding the user's service plan, schedule of activities for the day (or week, month, etc.), a list of USPs currently treating the user, etc. The user profile may also indicate a particular persona for the user (e.g., technology enthusiast, obstetrics gynecology user, orthopedics user who is a basketball enthusiast, etc.). A fourth data source may be a digital asset service that provides various types of digital content (e.g., digital wallpaper selections, music streaming selections, etc.). In some embodiments, the digital content may be of a variety that is customizable according to a particular user persona. For example, one class of digital wallpaper selections may correspond to a montage of pictures from previous basketball championships highlights, which may be associated with a "basketball enthusiast" persona. It should be understood that any suitable persona may generated and associated with a particular user, as described in further detail in reference to FIG. 14. It should also be understood that any suitable number and/or types of data sources may exist and be available for delivering content to the vision management system 1205. For example, a plurality of data sources may include a dietary data service, a real-time location system service (e.g., making available the RTLS data API 1134 of FIG. 11), a clinical data service, a user education content service, and/or an entertainment content service. In some embodiments, a dietary service may enable users to be shown food selections that match their personal dietary preferences. The dietary service may also provide nutrition and/or other dietary education information. There may be more than one service that provides a similar class of content. Also, the various services have computing resources that operate in any suitable computing environment (e.g., the public cloud 1110, a private network, the public Internet, etc.).

Returning the block 1206 of process 1200, the vision management system 1205 may retrieve data from one or more sources according to the user profile for the particular user. For example, the vision management system 1205 may retrieve first data from the first data source described above (e.g., an entertainment streaming content) and second data from the second data source described above (e.g., a user education multimedia content service). In this example, the first data may correspond to one or more comedy video titles (e.g., MP4 files), and/or links to relevant comedy titles. The second data may similarly correspond to user education video titles and/or links (e.g., Uniform Resource Locators (URL) and/or thumbnails) to relevant user education content. It should be understood that other data may be downloaded from other data sources 1211 based at least in part on the user profile.

At block 1208, the vision management system 1205 may then generate and provide a unified data feed for presentation by the computing device at the display at the particular location (e.g., the TV monitor at room A 1207). In some embodiments, the unified data feed may include data from multiple sources, as described above. The unified data feed may also include a presentation schema (e.g., utilizing Extensible Markup Language (XML) or other markup language) that specifies a format for how the data from the multiple sources should be presented via the display connected to the computing device assigned to the particular location. This format may be determined based on any suitable factor(s), including the specification for the display device in the particular location, the quality of the network speed between the vision management system 1205 and the particular computing device (e.g., set-top box 1209), the user persona indicated by the user profile, etc. In some embodiments, the user persona of the user profile may indicate, for example, a layout for data (e.g., within a given page displayed and/or across multiple pages displayed), a theme for presenting data and/or multimedia content, one or more selectable elements that are associated with enabling user interaction with the display (e.g., displaying additional content upon receiving a click of a link), a mechanism for receiving user data input to indicate approval and/or authorization of a document, etc.

Figure 13:
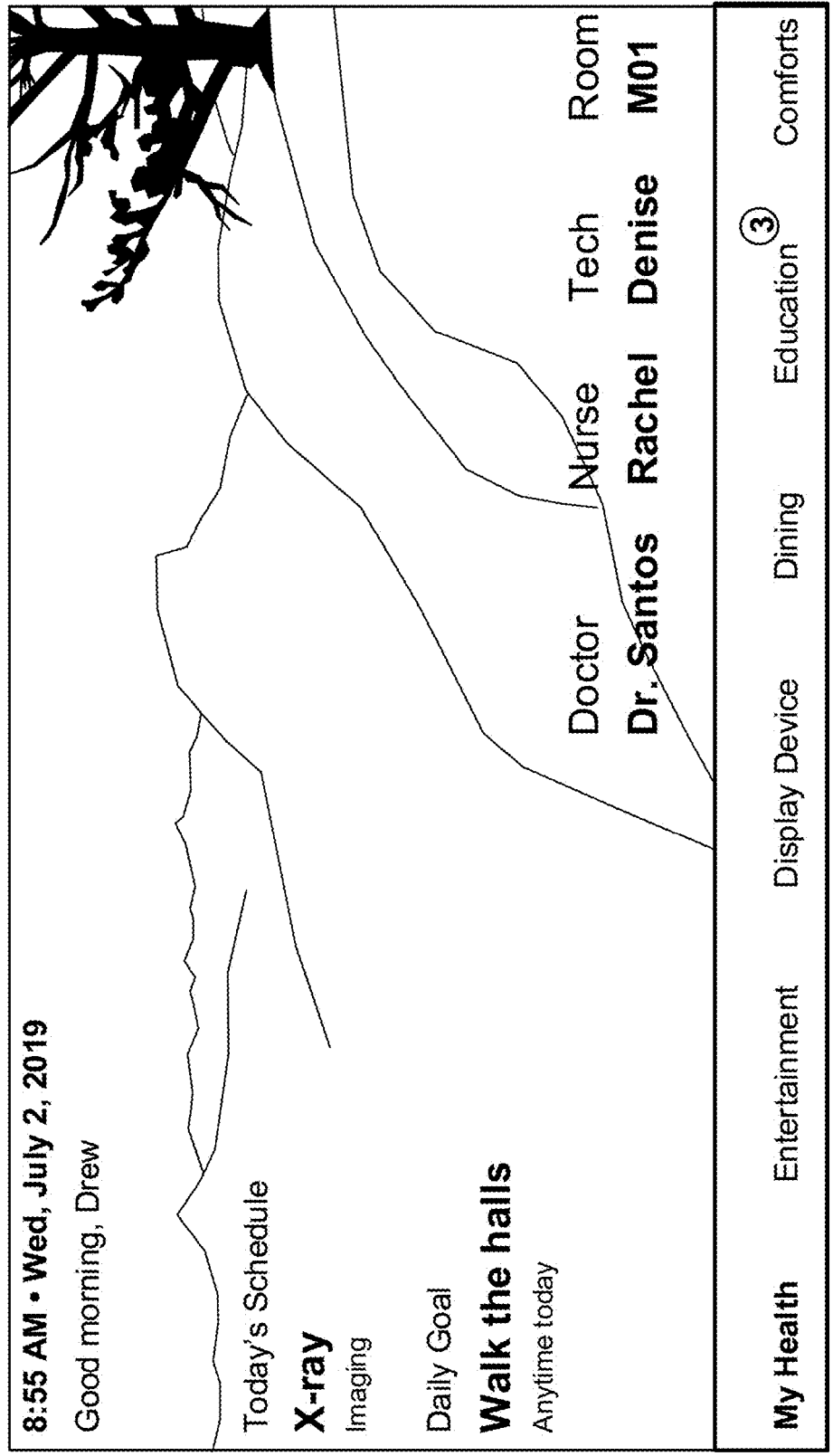
FIG. 13 illustrates an example graphical user interface (GUI) for providing a unified data feed to a computing device, according to at least one example.

To further illustrate how the vision management system 1205 may generate and provide the unified data feed, consider the GUI display 1300 of FIG. 13. In FIG. 13, the GUI display 1300 illustrates an example home screen that may be presented by the set-top box 1209 for display in the user's room. The example home screen depicted shows a background wallpaper for the home screen. This background wallpaper may have been previous retrieved from one of the data sources according to the user's persona indicated by the user profile (e.g., "outdoors enthusiast"). The schema for the unified data feed may also indicate, for example, that data elements should be displayed in a vertical column on the left side of the screen, and on the bottom of the display, with empty space to see an unobstructed wall paper in the remainder of the screen. Another layout type (e.g., for a technology enthusiast persona) may include more data elements being presented on the home screen, enabling the user to select from and/or configure different options. Continuing with the example of FIG. 13, the data elements displayed are customized according to the particular user that is admitted to that location. For example, the user's name (e.g., "Drew") is shown, along with the user's schedule (e.g., "X-ray"), daily customized goal (e.g., "Walk the halls"), the one or more USPs assigned to the user (e.g., "Dr. Santos," Nurse "Rachel," Technologist "Denise"), and a room identifier where the user is admitted (e.g., in this case, "M01"). Note that these elements may be retrieved from one or more of the data sources described earlier (e.g., the user data system 1132), and may be presented according to the schema for the unified data feed. For example, the schema may specify that the user's name should be truncated such that only the first name is presented on the screen (e.g., not the last name), to prevent personal information being displayed on the display. In another example, only a portion of the user's first and/or last name may be displayed, to ensure user privacy. Additionally, as described above, one or more selectable elements (e.g., links, thumbnails, etc.) may be displayed in the home screen. Upon the computing device receiving a selection of a link (e.g., "Entertainment," "Display Device" (e.g., enabling configuration of the display), "Dining," "Education," and/or "Comforts"), the computing device may display a new page with new data content for a particular sub-topic that corresponds to the link title. The new data content and/or the schema for presenting the new data content in a new page may also be included within the unified data feed. It should be understood that the unified data feed may be a stream of data that is transmitted from the vision management system 1205 to the set-top box 1209, and may be updated in real-time, at least in part based on receiving interaction data based on user input (e.g., via a remote-control or other input device, to interact with the display). Using the example from earlier, upon receiving a selection of the "Entertainment" link, a new page may display comedy video selections that were retrieved from the first data source and included in the unified data feed. Similarly, upon receiving a selection of the "Education" link, user education multimedia content that was retrieved from the second data source may be displayed (see FIG. 17, discussed further below). In some embodiments, the "Dining" link may correspond to a page that displays meal selections according to known user preferences. The page may also display nutrition information according to the user's persona (e.g., known diet goals). The "Comforts" link (see FIG. 18, discussed further below) may correspond to a page that enables a user to select from a range of digital art (e.g., images, videos, etc.), according to the user's personal preference. As described herein, the data contents that are respectively associated with each of these selectable elements-links, which cause new screens and/or data (e.g., video feeds, vital statistics, digital art, etc.) to be displayed upon being selected—may be associated with one or more data sources, whereby the respective data (e.g., data feeds) are configured (e.g., according to a presentation configuration schema) for presentation in a unified data feed.

Returning to the process 1200 of FIG. 12, upon the computing device (e.g., set-top box 1209) receiving the unified data feed from the vision management system 1205, the computing device may present the unified data feed at the display (e.g., television) at the particular location, as depicted in FIG. 12. The presentation may be performed according to the schema (e.g., a presentation configuration file) that is associated with the unified data feed, for example as illustrated with respect to FIG. 13.

Figure 14:
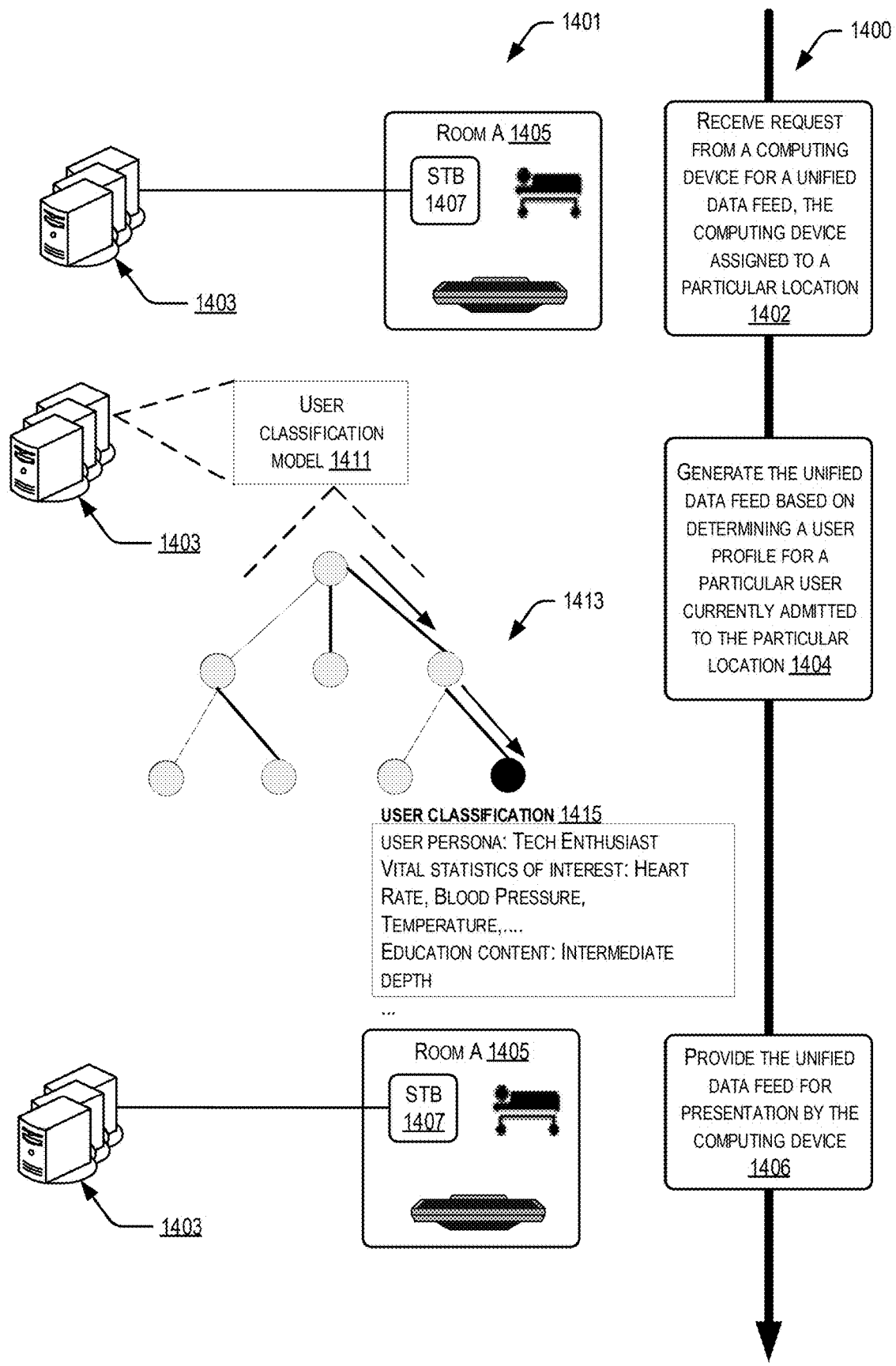
FIG. 14 is another example flowchart illustrating another process for providing a unified data feed to a computing device, according to at least one example.

FIG. 14 illustrates a simplified block diagram 1401 depicting an example process 1400, in accordance with at least one example. The process 1400 is an example process for providing, based on a user profile model, a unified data feed associated with a particular user located at a particular location of a service facility. The diagram 1401 depicts example states that correspond to the blocks of the process 1400. The diagram 1401 includes a vision management system 1403 (e.g., which may be similar any of the vision management systems described herein) and a computing device (e.g., set-top box 1407, which may be similar to one or more of the computing devices described herein). The set-top box 1407 may be located at a particular location within a service facility (e.g., room A 1405) of a service organization. As described further herein, the vision management system 1403 may include a user classification model 1411, which may be used by the vision management system 1403 to generate the unified data feed. It should be understood that, for any of the diagrams described herein, a vision management system (e.g., vision management system 1403) may interact with one or more other systems (e.g., API's, devices) in a similar (or different) environment as described in reference to FIG. 11 (e.g., vision management system 1116).

In some embodiments, prior to the operations of block 1402 of process 1400, the vision management system 1403 may maintain (e.g., in a database) an association between a device identifier of the set-top box 1407 and a location identifier of room A 1405, similar to as described in reference to FIG. 12. Additionally, the vision management system 1403 may have received a message from a user processing service (e.g., ADT feed system 1136) indicating that an event has occurred, associated with room A 1405. For example, a new user may have been admitted to room A 1405. The vision management system 1403 may have transmitted a message to the set-top box 1407 indicating the event occurrence, thus prompting the set-top box 1407 to request a unified data feed from the vision management system 1403.

Turning to process 1400 in further detail, at block 1402, the vision management system 1403 may receive a request from a computing device (e.g., set-top box 1407) for a unified data feed, whereby the set-top box 1407 is assigned to a particular location (e.g., room A 1405). In some embodiments, the operations of block 1402 may be similar to block 1204 of FIG. 12.

At block 1404, the vision management system 1403 may generate a unified data feed based on determining a user profile for a particular user currently admitted to the particular location. For example, as described herein, the vision management system 1403 may use a device identifier included in the request received at block 1402 to determine a user identifier for the particular user currently admitted to the particular location (e.g., determining an association between the user identifier and the location identifier).

Upon determining the user identifier for the currently admitted user, the vision management system 1403 may input the user identifier into the user classification model 1411, whereby the user classification model 1411 may return a user classification 1415 (e.g., a user profile) for the particular user. In some embodiments, the user classification model 1411 may be responsible for classifying the particular user into a particular persona, as described herein. For example, in some embodiments, the vision management system 1403 may maintain a plurality of predefined personas. The plurality of predefined personas may be determined to be representative over a sample set of users of a service organization. A persona may be defined according to one or more user characteristics. These user characteristics may be determined based on a user record of the particular user (e.g., historical and/or present service data) and/or interactions the user has had with the vision management system 1403 (and, by extension, other services/data sources associated with the vision management system 1403). These characteristics may include, but are not limited to, a condition of the user, a department in which the user is being treated (e.g., orthopedics), an age of the user, a gender of the user, known preferences of the user (e.g., based on input received from the user), etc. Accordingly, in one example, the plurality of predefined personas may include a personas for "Orthopedics users," "Obstetrics" users, "Pediatrics" users, etc. Another type (e.g., and/or sub-type) of a persona may be "Technology Enthusiast," "Sports Enthusiast," "Animals Enthusiast," etc. A user persona may be used to indicate what data may be of most interest and/or relevance to the particular user, and thus, should be included and presented via a unified data feed. For example, the user classification 1415 of FIG. 14 indicates that the particular user is associated with a "Technology Enthusiast" persona. In this case, the "Technology Enthusiast" persona may indicate that the user should be shown more statistical information related to their health and/or be able to configure the details displayed at a more granular level. For example, the user classification 1415 indicates that multiple vital statistics should be displayed, including heart rate, blood pressure, and temperature (see FIG. 15, described in further detail below). The user classification 1415 also indicates that the user should be presented with user educational video content at an intermediate depth level. It should be understood that any suitable information may be included within the user classification 1415 and/or associated with a user persona, which may subsequently be used to generate the unified data feed.

In some embodiments, instead (or in addition to) associating a particular user with a predefined persona of a plurality of possible personas, the user classification model 1411 may determine a user profile by utilizing a machine learning model. For example, the user classification model 1411 may include a trained classification model that is trained according to one or more machine learning algorithms (e.g., a boosted decision tree 1413), as described in reference to FIG. 10 (e.g., blocks 1002-1006). The trained classification model may be trained to determine a classification corresponding to a user persona (and/or user profile) of the user, whereby the persona may be used to determine instructions for generating a unified data feed. It should be understood that any suitable classification model may be used to perform embodiments described herein, utilizing a machine learning model, including, for example, a neural network.

Utilizing the boosted decision tree model 1413 as an example illustration of a machine learning model, the model may be trained according to one or more features. For example, the features may include data points of a user's service record (e.g., historical service data, current service data) as well interaction data corresponding to interactions the user has had with the vision management system 1403. For example, interaction data may include a listing of which screens the user viewed most often (e.g., during previous visits), which educational video type was watched most frequently, the TV channels that were most frequently watched, etc. The data may also include other demographic data of the user, including, for example, the user's age, gender, occupation, residence location, family information, etc. In some embodiments, these features may be represented by a vector of data values that is input to train the boosted decision tree, as described in reference to FIG. 10. In some embodiments, for each training sample vector, known ground truth data (e.g., another vector of data values) may be obtained (e.g., receiving input from the user), by which the machine learning model may be trained to minimize a cost function. The cost function may measure a distance between the ground truth and the predicted classification (e.g., a predicted persona) output by the model. It should be understood that the training samples that are used to train the user profile model may be gather from a large number of users (e.g., across multiple service facilities in a service organization). In this way, embodiments may enable the vision management system 1403 to improve the classification accuracy for a larger number of users.

In some embodiments, the trained machine learning model may not only output a single predicted user classification as a particular persona, but also the model may predict multiple classifications (e.g., utilizing one or more sub-models). For example, the model may be trained to predict what type of entertainment content, education content, or other digital media content the user would like to consume. The model may also predict specific display configuration settings, for example, associated with determining how and where to display data elements, wallpaper background, daily scheduling reminders, etc. In this way, embodiments may enable the user classification model 1411 of vision management system 1403 to generate user profiles that are not only associated with a class of users, but also customized to a particular user.

Upon the user classification model 1411 determining one or more classifications (e.g., predictions) associated with the user's persona, which may be used to determine the user profile, the vision management system 1403 may then generate the unified data feed based on the determined user profile. In some ways, the unified data feed may be generated similarly to as described in reference to FIG. 12. For example, the vision management system 1403 may retrieve data, respectively, from one or more data sources, based in part on the user profile (e.g., indicating what type of content the user is likely to prefer). The vision management system 1403 may then generate a schema (e.g., a configuration file) that provides instructions for displaying the content on the display.

At block 1406, the vision management system 1403 may then provide the unified data feed for presentation by the computing device to the connected display at the particular location (e.g., room A 1405). In some embodiments, operations of block 1406 may be similar to one or more operations of block 1208. In some embodiments, as described above, the unified data feed may present customized versions of one or more screens for display based in part on the customized user profile determined at block 1404.

Figure 15:
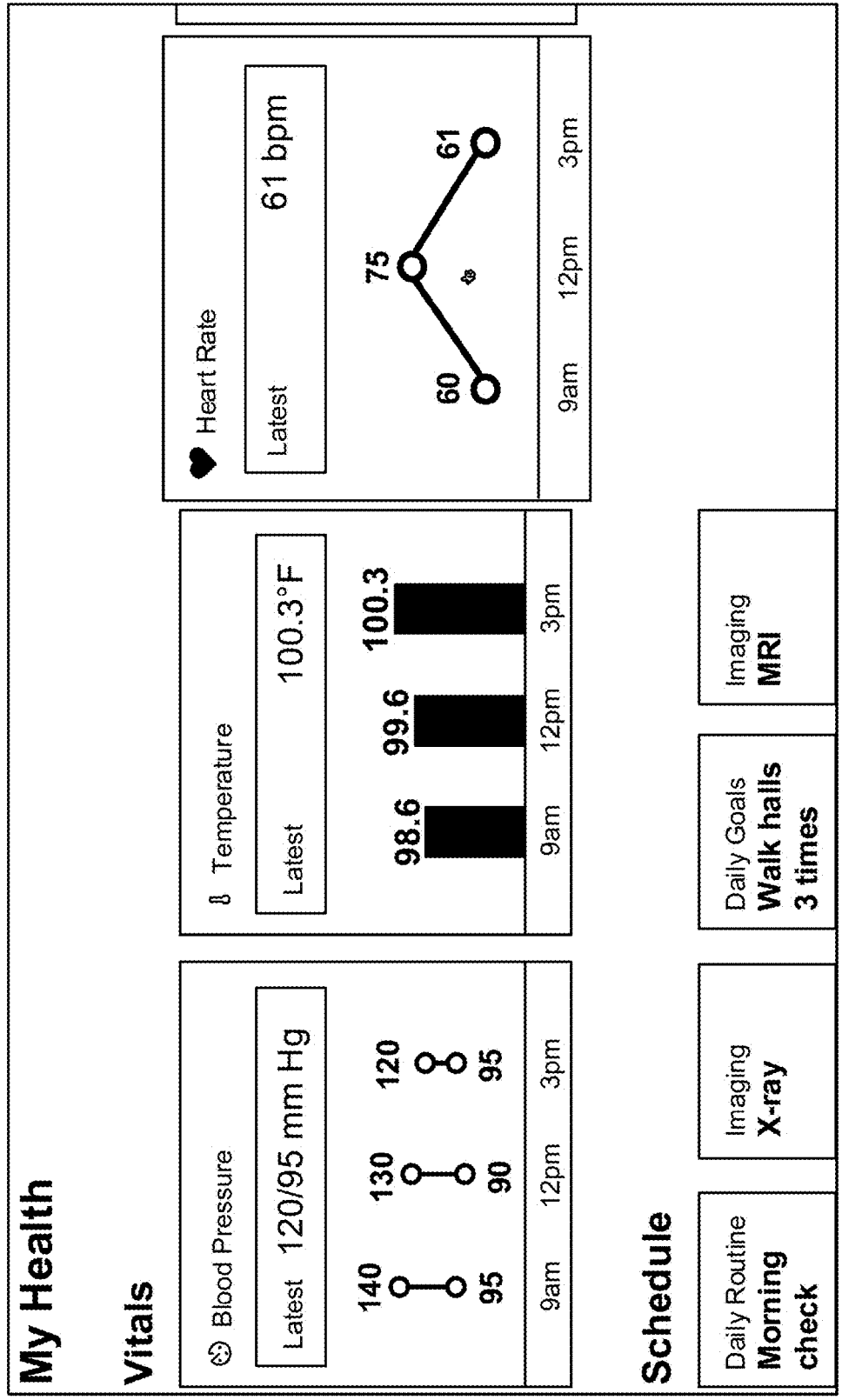
FIG. 15 illustrates another example graphical user interface for providing a unified data feed to a computing device, according to at least one example.
Figure 17:
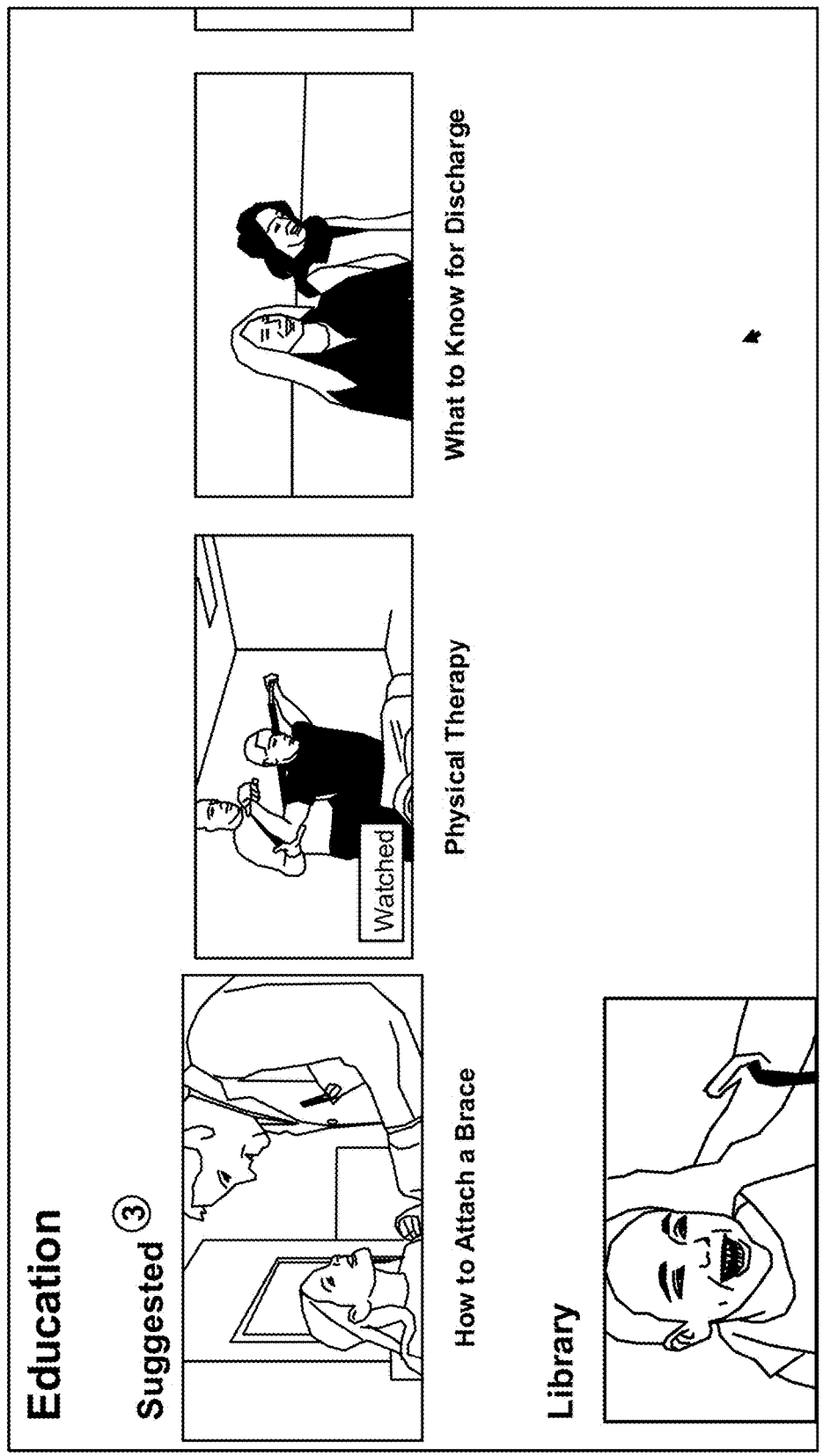
FIG. 17 illustrates another example graphical user interface for providing a unified data feed to a computing device, according to at least one example.

FIGS. 15, 16, and 17, respectively, further illustrate representative examples of these customized screen presentations described above.

FIG. 15 illustrates a GUI display 1500 of a potential screen that may be displayed, which may show health information (e.g., vital statistics) of the particular user. In some embodiments, display 1500 may be displayed upon the set-top box 1407 receiving input (e.g., from a remote control unit) to select the "My Health" selectable element (e.g., link) in the home screen display 1300 of FIG. 13. Accordingly, the display 1500 may enable the user to drill down to visualize detailed information regarding their vital statistics. As described above, in some embodiments, the type of content displayed and/or the placement of the content on the screen may be determined based in part on the customized user profile, which may in turn be used to determine the underlying data contents retrieved for inclusion in the unified data feed and/or the schema used to determine how to display the contents. In this example, the display 1500 shows vital statistics at the top of the screen, including blood pressure, temperature, and heart rate (over time). It should be understood that these statistics may be updated and displayed in real-time, as the vision management system 1403 sends real-time updates to the unified data feed to the set-top box 1407. Accordingly, one advantage to embodiments described herein is the ability for a centralized system (e.g., vision management system 1403) to generate and/or update a unified data feed in real-time, whereby the unified data feed includes data from multiple data content sources that are integrated together for presentation. In this example, the display 1500 also shows selectable elements (e.g., "Daily Routine: Morning check," "Imaging: X-ray," "Daily goals: Walk halls 3 times," and "Imaging: MRI") associated with the user's schedule for the day, which may be used to further drill down. For example, the "Imaging: X-ray" tile may allow the user to determine details about the X-ray process, display the X-ray image (if already processed), determine the USP that will be performing the X-ray, or other relevant information.

In another example, a GUI display 1600 of FIG. 16 may illustrate a screen that is displayed upon the "Heart Rate" tile of display 1500 being selected. The contents of this screen may include more details about the user's heart rate, and/or educate the user to understand general concepts about heart rate. The specific content displayed may be dependent in part on the user's persona. For example, an adult user may be presented heart rate education content in a different format from a child user. Accordingly, in general, the specific content that is available for display and/or the format for displaying the content (e.g., placement of content, style of background themes, etc.) may vary, depending on the user type of the particular user (e.g., reflected by the user profile).

Figure 18:
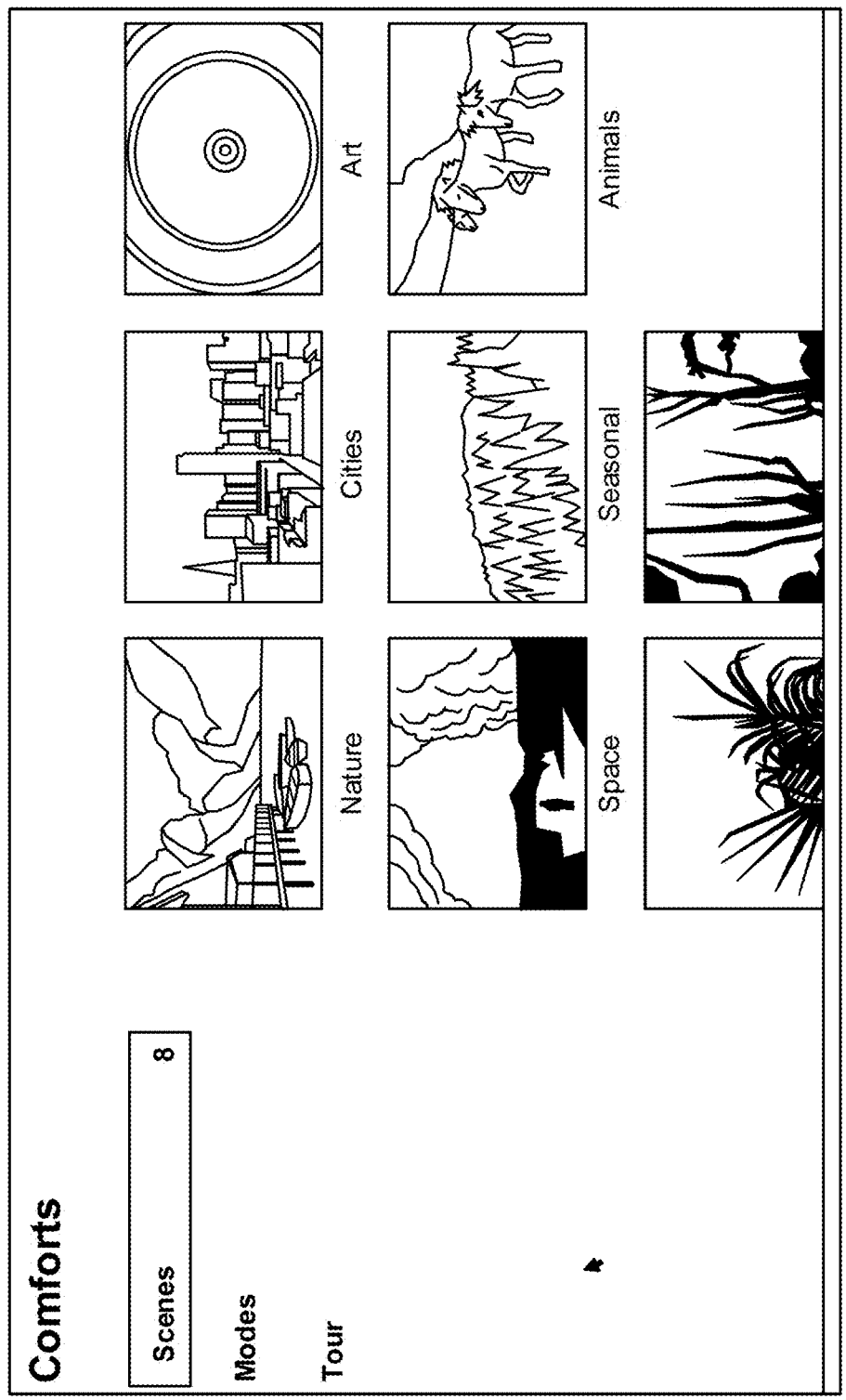
FIG. 18 illustrates another example graphical user interface for providing a unified data feed to a computing device, according to at least one example.

FIGS. 17 and 18 also respectively illustrate GUI displays of potential screens that may presented by the set-top box 1407 based on a unified data feed generated by the vision management system 1403. In FIG. 17, display 1700 may correspond to a screen that shows suggested user education video (or audio) content, upon the set-top box 1407 receiving input corresponding to a selection of the "Education" link in FIG. 13. In some embodiments, these contents may be originally retrieved by the vision management system 1403 from a third-party data provider system 1114, and included within the unified data feed, as described herein. For example, the vision management system 1403 may retrieve thumbnails for user education videos that are relevant for the user's current condition, based in part on the customized user profile. These thumbnails may be displayed in display 1500, including for example video contents regarding "How to Attach a Brace," "Physical Therapy," "What to Know for Discharge," etc. These may be relevant, for example, in a case where the user has a sprained ankle, a torn tendon, etc. Upon receiving an input from a remote control to select a specific thumbnail, the set-top box 1407 may send a request back to the vision management system 1403, whereby the vision management system 1403 streams the selected video content. In another embodiment, described further herein, the vision management system 1403 may redirect the set-top box 1407 to stream the video content directly from the third-party data provider system 1114.

In FIG. 18, display 1800 may correspond to a screen that shows digital media content that may be of interest to the particular user. This may include, for example, wallpaper themes, a collection of images (e.g., scenes) having a particular theme, configuration settings for the display that have different modes, etc. In some embodiments, the display 1800 may be displayed upon the set-top box 1407 receiving input to select the "Comforts" selectable element in the home screen display 1300 of FIG. 13. Similar to display 1700, the display 1800 may enable the user to interact with the display and select one or more tiles, which may in turn cause a request to be sent to the vision management system 1403 for further content (e.g., displaying a slideshow of images matching the user's interest). In some embodiments, the particular scenes, themes, or other digital contents originally displayed for selection in display 1800 may be determined based in part on the user profile (e.g., including the user persona) of the user.

Returning to block 1406 of FIG. 14, and, as illustrated by FIGS. 15-18, upon providing the unified data feed to the computing device for presentation, the vision management system 1403 may receive further requests (e.g., selection of an item) from the set-top box 1407 based on user input received, whereby the vision management system 1403 may update and/or refresh the unified data feed. In some embodiments, updates may be provided automatically by the vision management system 1403, for example, if an update is available within a predetermined time interval (e.g., 10 milliseconds, 100 milliseconds, 1 second, 10 seconds, 1 minute, etc.). This may also depend on the type of content being updated (e.g., a heart rate, a video stream, an indication of the USP that is servicing the user for the day, a new screen for being displayed, etc.). In some embodiments, updates may be provided by the vision management system 1403 upon receiving a request from the computing device. In any case, it should be understood that one or more (e.g., all) data components of the unified data stream may correspond to real-time data that is regularly refreshed.

Figure 19:
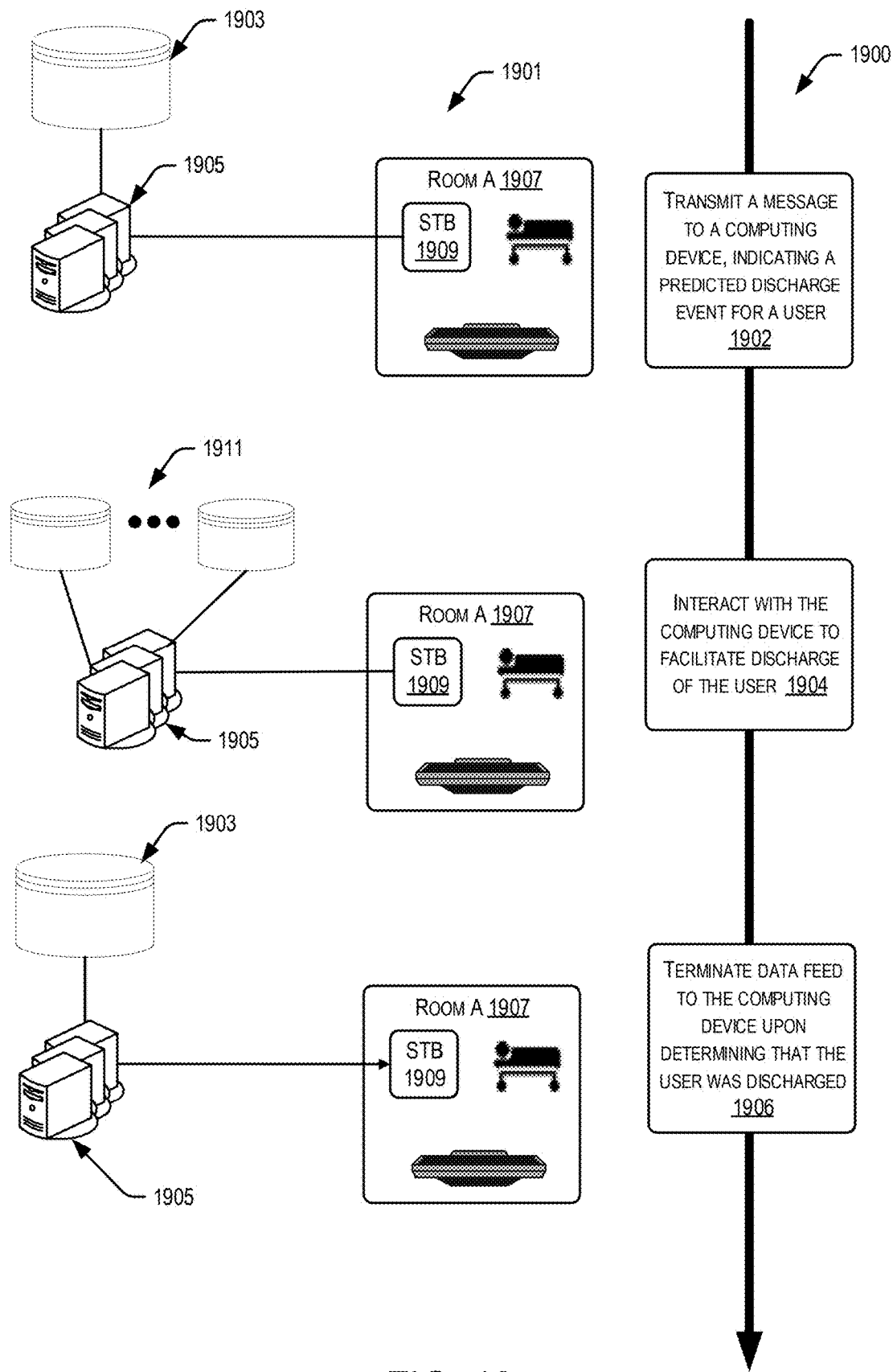
FIG. 19 is an example flowchart illustrating a process for terminating a unified data feed to a computing device, according to at least one example.

FIG. 19 illustrates a simplified block diagram 1901 depicting an example process 1900, in accordance with at least one example. The process 1900 is an example process for facilitating discharge of a particular user admitted to a particular location of a service facility. The diagram 1901 depicts example states that correspond to the blocks of the process 1900. The diagram 1901 includes a user processing system 1903 that operates a user processing service (e.g., which may be similar to ADT feed system 1136 of FIG. 11), a vision management system 1905 (e.g., which may be similar any of the vision management systems described herein), and a computing device (e.g., set-top box 1407, which may be similar to one any of the set-top boxes described herein). The set-top box 1909 may be located at a particular location within a service facility (e.g., room A 1907) of a service organization.

In some embodiments, prior to the operations of block 1902 of process 1900, the particular user may have been admitted to the particular room A 1907 of the service facility, and receiving service at that location. Additionally, as described herein in reference to FIGS. 12 and 14, the set-top box 1909 may have been receiving a unified data feed from the vision management system 1905 that is associated with the particular user, whereby the user may interact with the set-top box 1909 via the display (e.g., television) in the room A 1907. In some embodiments, the set-top box 1909 may not have been presenting a unified data feed from the vision management system 1905.

Turning to process 1900 in further detail, at block 1902, the vision management system 1905 may transmit a message to a computing device (e.g., set-top box 1909), whereby the message indicates a predicted discharge event for a user. In one example, prior to transmitting the message, the vision management system 1905 may receive from the user processing system 1903 a message (e.g., an ADT message with HL7 format) that indicates that the user currently admitted to room A 1907 is likely to be discharged within a predetermined time interval (e.g., thirty minutes, one hour, two hours, etc.). Based on receiving this message from the user processing system 1903, the vision management system 1905 may transmit the message to the set-top box 1909, thus prompting the set-top box 1909 to request a unified data feed from the vision management system 1905, as described herein. The vision management system 1905 may subsequently receive a request from the set-top box 1909 for the unified data feed. In one example, the request may indicate that the vision management system 1905 should provide discharge data within the unified data feed that is associated with facilitating discharge of the particular user from the service facility. In one example, discharge data may include electronic forms for the user to acknowledge that they have reviewed the forms (e.g., including service information, financial information, etc.), and/or otherwise authorized information presented to the user. In one example, the discharge data requested may include video or other multimedia to present to the user. In another example, the discharge data may enable the user to provide input, for example, a request to schedule follow-up service with their USP or pick up medicine from their pharmacist.

At block 1904, the vision management system 1905 may interact with the computing device to facilitate discharge of the user from the service facility. As described herein, an interaction between the vision management system 1905 and the computing device (e.g., set-top box 1909) may correspond to a one-way and/or two-way transfer of data between the two devices. For example, the vision management system 1905 may retrieve data from one or more data sources 1911 based in part on receiving the request for the unified data feed from set-top box 1909. In one example, the data may correspond to electronic financial forms that are retrieved from a third-party provider or from another system within the private network 1130. The vision management system 1905 may then transmit a unified data feed including the forms to the set-top box 1909 for presentation to the user. The set-top box 1909 may subsequently receive input from the user (e.g., via remote control) that indicates the user has authorized a payment according to the information on the received financial form. The set-top box 1909 may then transmit data including the authorization back to the vision management system 1905. The vision management system 1905 may then retrieve and/or transmit other data for the user to review, etc. For example, the discharge process may include a series of forms to review and/or complete, one or more videos to watch, etc.

It should be understood that embodiments described herein enable a more efficient discharge process than may exist today. For example, in some cases, a user may wait in the user room for a substantial amount of time, waiting to be discharged. During this time, the user may be waiting for test results to come in, or a USP to become available after treating another user. Finally, after the test results come in and the user has a final consultation with the USP, the user may proceed with a discharge process. Embodiments described herein instead enable the discharge process to begin earlier than conventional methods, whereby the user may interact with the vision management system 1905 to proceed with the discharge process in parallel, even while waiting for final tests results to become available, etc. By having the vision management system 1905 receive real-time status updates (e.g., from the user processing service 1903, the user data system 1132, and/or the RTLS data API 1134), the vision management system 1905 may feed data to the set-top box 1909 at an appropriate (e.g., earlier) time for the user to review. Additionally, the vision management system 1905 may not only facilitate a more efficient discharge process, but also provide a better customer experience for future follow-up service. For example, the vision management system 1905 may interact with the user to schedule follow-up service for the user, provide the user with information for the user to review even after being discharged (e.g., from a mobile phone or other user device of the user), etc. In at least this way, embodiments may provide a more holistic and streamlined process for delivering user service. For example, following the user's discharge, the user may retrieve on their mobile device additional content (e.g., educational material, instructions for medication, etc.) that they had requested for later viewing during the discharge process.

At block 1906, the vision management system 1905 may terminate the data feed to the computing device upon determining that the user was discharged. Continuing with the above illustration, the discharge process may be completed after the operations of block 1904, whereby the user is then physically discharged from the service facility and vacates the room A 1907. The user processing service 1903 may receive a real-time indication that the user has been discharged. For example, the user's USP may input a discharge notification into the USP's user device, which is transmitted to the user processing service 1903. The user processing service 1903 may then transmit a message (e.g., an ADT message) to the vision management system 1905, indicating that the user has been discharged. The vision management system 1905 may then determine to terminate the unified data feed to the set-top box 1909, so that user information is no longer displayed via the display. In this way, embodiments may further enable user privacy to be protected, even though the set-top box 1909 may not maintain (e.g., store) information about the user (and/or the user's status).

Figure 20:
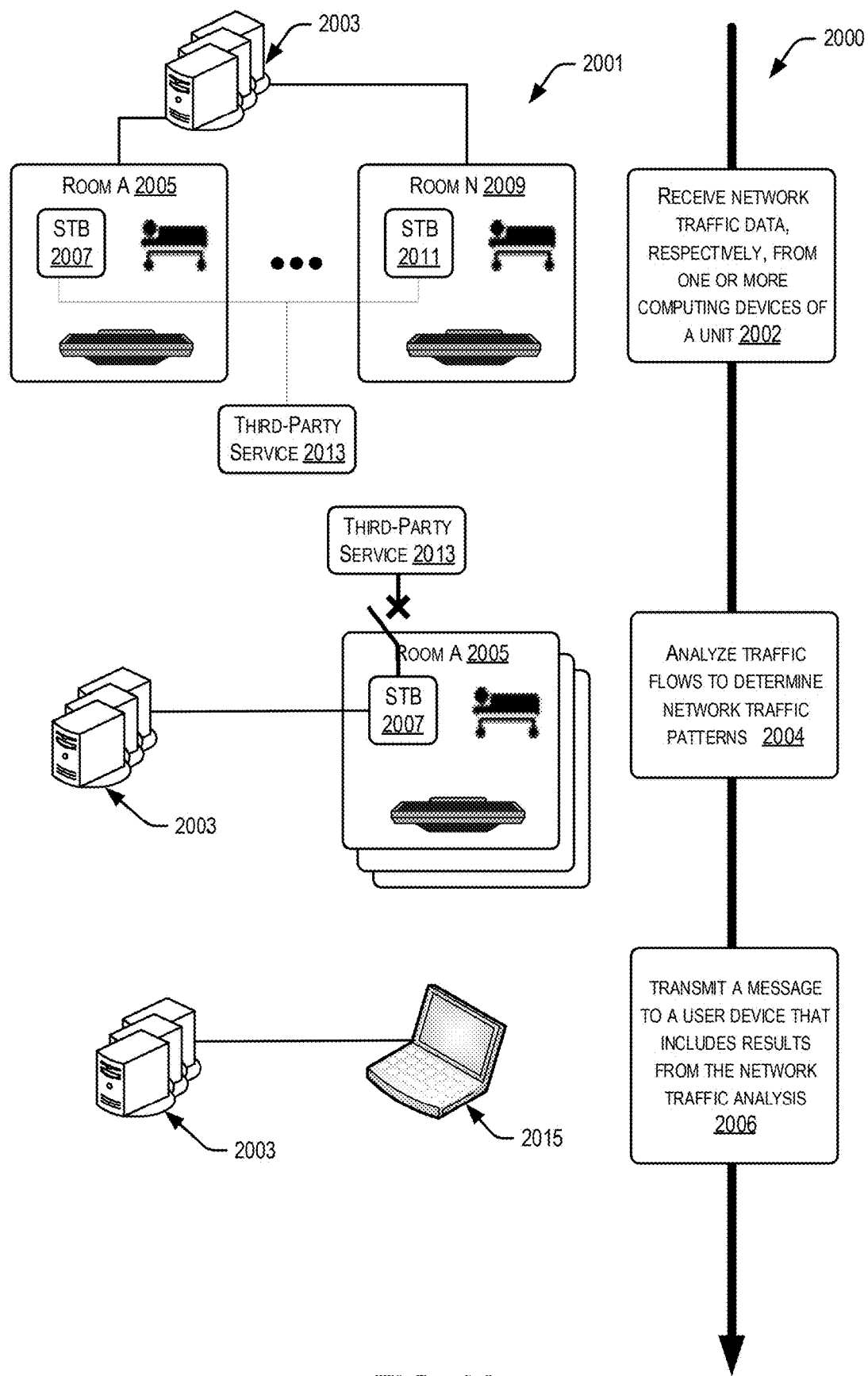
FIG. 20 is an example flowchart illustrating a process for managing a unified data feed to a computing device based on network traffic patterns, according to at least one example.

FIG. 20 illustrates a simplified block diagram 2001 depicting an example process 2000, in accordance with at least one example. The process 2000 is an example process for managing a plurality of data feeds to respective computing devices within a service facility. The diagram 2001 depicts example states that correspond to the blocks of the process 2000. The diagram 2001 includes a vision management system 2003 (e.g., which may be similar any of the vision management systems described herein), and a plurality of rooms (e.g., user rooms) in the service facility. The diagram also includes a third party service 2013, which may be similar to the third-party data provider system 1114 of FIG. 11. The diagram also includes a user device 2015, which may be used by a network administrator or other suitable facility manager. The plurality of rooms is represented in diagram 2001 by room A 2005 and room N 2009. Room A 2005 may include a computing device (i.e., set-top box 2007) and room N 2009 may include another computing device (i.e., set-top box 2011). Each computing device may be communicatively connected to a display in the respective room.

As described herein, any suitable placement of computing devices within the service facility may be used to perform embodiments. In one example, there may be multiple floors on a facility, with multiple rooms on each floor. Typically, there may be one computing device assigned to a particular location, whereby the particular location may be temporarily used to treat a user while the user is admitted to the room in the facility. Within the service facility there may be sub-groupings of devices and/or locations. For example, a subset of computing devices on a particular floor may receive data from and/or transmit data to a particular network device (e.g., a router), whereby the particular network device transmits and/or receives messages to/from the vision management system 2003. Embodiments described herein may provide a more efficient and accurate way of managing, analyzing, and troubleshooting network traffic data from the various computing devices. In this way, for example, a vision management system 2003 may more efficiently troubleshoot if a subset of devices in a service facility is experiencing networking issues when streaming content (e.g., either streaming directly from the vision management system 2003 or from a third-party service.

Turning to process 2000 in further detail, at block 2002, the vision management system 2003 may receive network traffic data, respectively from one or more computing devices of a service unit (e.g., a service facility). Using diagram 2001 for illustration, consider a scenario in which set-top box 2007 in room A 2005 receives a unified data feed from the vision management system 2003, whereby the unified data feed includes a link to an education video content that is available for direct streaming by a third-party service provider 2013. Upon the set-top box 2007 receiving input indicating a selection by the user to stream a particular content, the set-top box 2007 may transmit the request for streaming to the third party service 2013. As part of (e.g., and/or alongside) the transmitted streaming request, the set-top box 2007 may also sent network traffic data to the vision management system 2003. The network traffic data may indicate characteristics of the network traffic being received (or, as the case may be, not being received) from the third-party service 2013. For example, characteristics may include an indication of whether a connection with the third-party data provider was successfully established. If so, the characteristics may indicate a throughput of the stream, a network latency, a variability in bandwidth detected, etc. The set-top box 2011 may perform a similar process and transmit a request for streaming to the third party service 2013. For example, another user being service at room N 2009 may request for streaming another educational content from the same third party service 2013. As part of (e.g., and/or alongside) the transmitted streaming request, the set-top box 2007 may also sent network traffic data to the vision management system 2003. The network traffic data may indicate characteristics of the network traffic being received (or, as the case may be, not being received) from the third-party service 2013. The network traffic data may be sent to the vision management system 2003 on any suitable cadence, for example, every few milliseconds or seconds, to update the vision management system 2003 as to the status of the traffic data being received and/or transmitted from that device to the third-party service 2013. In this way, although in some embodiments, the vision management system 2003 may not directly provide data to a computing device, the vision management system 2003 may still monitor traffic between computing devices (e.g., set-top box 2007 and set-top box 2011) and the third-party service 2013. It should be understood that, in some embodiments, the vision management system 2003 may directly provide data to computing devices (e.g., first retrieving the data from another system to the vision management system 2003). In this case, the vision management system 2003 may also monitor traffic data flows between computing devices and the vision management system 2003. It should be understood that set-top box 2007 and set-top box 2011 are representative examples of a plurality of possible computing devices that may transmit similar data to the vision management system 2003. Accordingly, the vision management system 2003 may provide a centralized mechanism for monitoring the status of network traffic to computing devices throughout the service facility.

At block 2004, the vision management system 2003 may analyze traffic flows to determine network traffic flows corresponding to traffic data from each of the one or more computing devices to determine network traffic patterns. For example, the vision management system 2003 may determine a level of quality of network service between each computing device and the third-party service 2013. In some embodiments, the network traffic patterns may indicate common (or different) characteristics between traffic flows.

For example, as depicted by diagram 2001, consider a scenario in which set-top box 2007 in room A 2005 experiences a broken connection with the third-party service 2013, or otherwise the throughput for video streaming drops to an undesirable level. Meanwhile, the throughput for set-top box 2011 in room N 2009 experiences a normal connection (e.g., normal expected throughput) with the third-party service 2013.

As described herein, set-top box 2007 (i.e., located in room A 2005) may be connected to the vision management system 2003 via a different network sub-division from set-top box 2011 (i.e., located in room N 2009). For example, room A 2005 may be located on a different floor from room N 2009. In this example, the different floors of the service facility may, respectively, be assigned Wi-Fi routers that cover an entire floor. Accordingly, set-top box 2007 may be connected to the vision management system 2003 via one Wi-Fi router, while set-top box 2011 may be connected to the vision management system 2003 via another Wi-Fi router. In another example, set-top box 2007 may be connected via a wired connection to vision management system 2003 via a particular network port/outlet, but the set-top box 2011 may be connect to the vision management system 2003 via a different port/outlet. It should be understood that embodiments may be performed using any suitable networking configuration, medium and/or protocol, including, but not limited to, a Wide Area Network (WAN), a Local Area Network (LAN), Wi-Fi, ZigBee, Bluetooth, Thread, Transport Control Protocol (TCP)/Internet Protocol (IP), etc.

Continuing with the illustration above, the vision management system 2003 may determine, based on traffic data received from the respective devices, a network traffic pattern that indicates that a portion of one or more devices of the plurality of devices in the service facility has a lower quality of network service compared to other devices of the one or more devices that interact with the third-party service 2013. For example, using diagram 2001 for illustration, the vision management system 2003 may determine that the portion of devices in which set-top box 2007 belongs (e.g., those devices connected to a particular Wi-Fi router on the same floor of the service facility) experience degraded video quality for video streams connected to the third-party service 2013, when compared to other devices in the facility that are also connected to (e.g., streaming content from) the third-party service 2013. Accordingly, the vision management system 2003 may determine that the network traffic pattern is localized to a particular region (e.g., the particular floor (or sub-division of the floor)) within the service facility. The vision management system 2003 may perform this determination based at least in part on the particular unique location for each device, which may be maintained by the vision management system 2003 (e.g., associating location identifiers with device identifiers), as described herein. In some embodiments, the vision management system 2003 may also maintain topology information (e.g., network and/or geographic topology) or other building layout information which may be correlated against the known locations of each device within the facility. In some embodiments, based on determining the network traffic pattern, the vision management system 2003 may identify troubleshooting steps that should be taken to resolve a network issue. For example, the vision management system 2003 may determine that a particular Wi-Fi router needs to be fixed. In some examples, the vision management system 2003 may determine that the problem is only localized to a particular device, and so that device should be troubleshooted. In yet other examples, the vision management system 2003 may determine that the issue stems from a problem at the third-party service 2013. For example, the vision management system 2003 may detect that every device in the facility that is connected to the third-party service 2013 is having network problems, but connections to other third-party services by the same devices do not experience the same problems. It should be understood that any suitable troubleshooting techniques may be employed by the vision management system 2003.

In some embodiments, and, as described above, the vision management system 2003 may determine network traffic patterns associated with any suitable network configurations and/or combinations thereof. For example, the vision management system 2003 may identify if there are network issues between one or more devices of a health service facility and a third-party data provider service 1114 in the public cloud 1110 (e.g., of FIG. 11), and/or whether there are network issues between one or more devices of the service facility and an internal service of the private network 1130.

At block 2006, the vision management system 2003 may transmit a message to a user device for presentation by the user device, whereby the message provides information regarding the results of the analysis that determined one or more network traffic patterns. For example, the information may include instructions for performing maintenance service targeting a portion of a particular region of the service facility that is experience network problems. For example, the instructions may determine one or more networking devices (e.g., Wi-Fi routers, hubs, outlets, etc.) which may need to be serviced. In another example the information may include instructions for contacting the third-party service 2013 to troubleshoot the issue on their end (e.g., outside a local network of the service facility).

Figure 21:
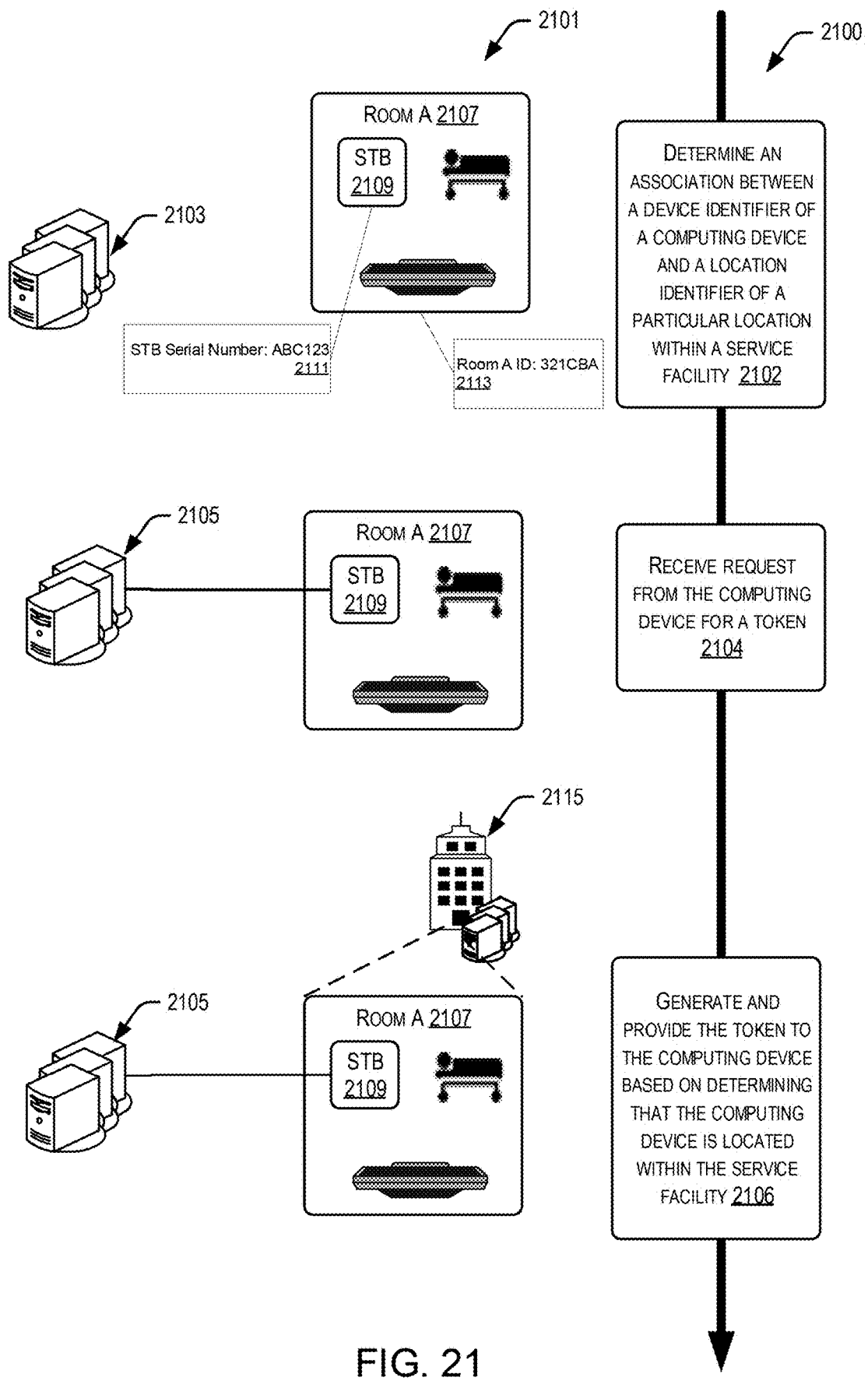
FIG. 21 is an example flowchart illustrating a process for provisioning a token to a computing device, whereby the token is operable subsequent verification (e.g., authentication) that the computing device may receive a unified data feed, according to at least one example.

FIG. 21 illustrates a simplified block diagram 2101 depicting an example process 2100, in accordance with at least one example. The process 2100 is an example process for assigning a computing device to a particular location within a service facility and providing a token to the computing device. In some embodiments, the process for assigning the computing device to the particular location and providing the token may be completed prior to the computing device receiving a data feed from a vision management system. The diagram 2101 depicts example states that correspond to the blocks of the process 2100. The diagram 2101 includes a vision management system 2103 (e.g., which may be similar any of the vision management systems described herein), a headend device 2105 that is associated with the vision management system 2103, a user room A 2107 of a particular service facility 2115 (e.g., among a plurality of service facilities of a service organization), and a computing device (e.g., set-top box 2109). The headend device 2105 may be similar to the token provider system 1150 of FIG. 11. For example, in some embodiments, the headend device 2105 may operate as a gateway (e.g., distribution) device for other devices on the local network of the service facility. Because the headend device 2105 may detect whether data traffic originated from a computing device on the local network of the service facility, the headend device 2105 may also be able to detect a physical location of the computing device (e.g., within the service facility), as described further below.

Turning to process 2100 in further detail, at block 2102, the vision management system 2103 may determine an association between an a device identifier and a location identifier. Using diagram 2101 for illustration, consider a scenario in which the computing device (e.g., set-top box 2109) is procured by the service facility and physically positioned within room A 2107. For example, a technician/administrator may position the set-top box 2109 within room A 2107, and ensure that the set-top box 2109 is communicatively connected to a display (e.g., a TV) within the room. A user device of the administrator may receive input (e.g., from the administrator) to add a new entry that associates a device identifier of the set-top box 2109 (e.g., set-top box serial number "ABC123" 2111) with a location identifier of the room A 2107 (e.g., room A identifier "321CBA" 2113). Accordingly, upon the user device authenticating itself with the vision management system 2103, the user device may transmit an assignment instruction that includes (I) the device identifier for the computing device (e.g., set-top box 2019) and (II) the location identifier for a particular location (e.g., the room A 2017) within a service facility. In some embodiments, the device identifier may be obtained using any suitable means, for example, via a QR code displayed by the display, as described further herein. The assignment instruction may instruct the vision management system 2103 to associate the computing device with the particular location. The vision management system 2103 may then store this association, for example, in a data store or database of the vision management system 2103. It should be understood that, although in the example above, the vision management system 2103 received the assignment instruction from the user device of the administrator, embodiments should not be construed to be so limiting. For example, upon being properly authenticated (e.g., with administrator credentials), the set-top box 2109 may connect to the vision management system 2103 and transmit the assignment instruction to the vision management system 2103 to register itself in the database.

At block 2104, the headend device 2105 that is associated with the vision management system 2103 may receive a request for a token. The token may be operable for subsequently authenticating the computing device to receive a data feed at the particular location. For example, as described herein, and, continuing with the illustration above, the set-top box 2109 may determine to request a token from the headend device 2105. In some embodiments, the set-top box 2109 may generate the request at any suitable time. In one example, the request may be generated upon the set-top box 2109 being booted and being able to send/receive data on a local network of the service facility. In another example, the request may be generated upon the set-top box 2109 determining to request a unified data feed from the vision management system 2103. In another example, the request may be generated upon the set-top box 2109 determining and/or being notified that an existing token has expired. In some embodiments, although the headend device 2105 may physically be located at the service facility, the headend device 2105 may be a component of a system that includes the vision management system 2103 and/or other system components. In some embodiments, the headend device 2105 may be physically located at any suitable location such that it may detect (e.g., determine and/or distinguish) traffic from computing devices that originate on the local network of the service facility. In some embodiments, the headend device 2105 may be a separate component from the vision management system 2103. In any case, the headend device 2105 may be associated with the vision management system 2103, whereby the headend device 2105 provides a token that is later utilized to provide a unified data feed by the vision management system 2103.

At block 2106, the headend device 2105 may generate and provide the token to the computing device based on determining that the computing device is located within the service facility. For example, as described above, the headend device 2105 may be located within a network topology of the service facility so that the headend device 2105 may determine whether network traffic originated from within the service facility (e.g., via a local network of the service facility) or from outside the service facility. In some embodiments, the headend device 2105 may generate and provide the token to the computing device based on determining that the request that was transmitted by the computing device was transmitted from within the service facility (e.g., over a local network of the service facility). In some embodiments, the headend device 2105 may further determine, based on data included in the request (e.g., IP address, MAC address information, other packet header information, etc.), that the request was transmitted from the particular location (e.g., room A 2107) of the service facility. In this way, embodiments may provide a higher level of security and privacy, for example, by ensuring that tokens are only granted upon determining that the requesting device is located in an authorized location. For example, if an unauthorized user attempted to transfer the computing device to another (unauthorized) location, boot the device, and then request token from the headend device 2105, the request for the token may be denied by the headend device 2105 based on detecting that the request was not transmitted from an authorized location.

In some embodiments, as described herein, the token may be a string of numbers, letters, or any other suitable characters. For example, a token may include an identifier that is operable for authorizing a transaction. In some embodiments, the token may be encrypted using any suitable cryptographic technique. For example, the headend device 2105 may receive one or more cryptographic keys from an associated authentication system 1112. Upon receiving a request for a token from the set-top box 2109, the headend device 2105 may generate and/or encrypt a token using the one or more cryptographic keys (e.g., a symmetric key). The token may be stored by the set-top box 2109, and later included in a subsequent request message for a unified data feed, as described herein. In some embodiments, the token may not store personal identifying information about a particular user. In some embodiments, the token may be associated with an expiration date and/or time. In some embodiments, if a previously provided token is still valid (e.g., has not expired), the set-top box 2109 may reuse the same token for a series of one or more interactions with the vision management system 2103, described herein.

Figure 22:
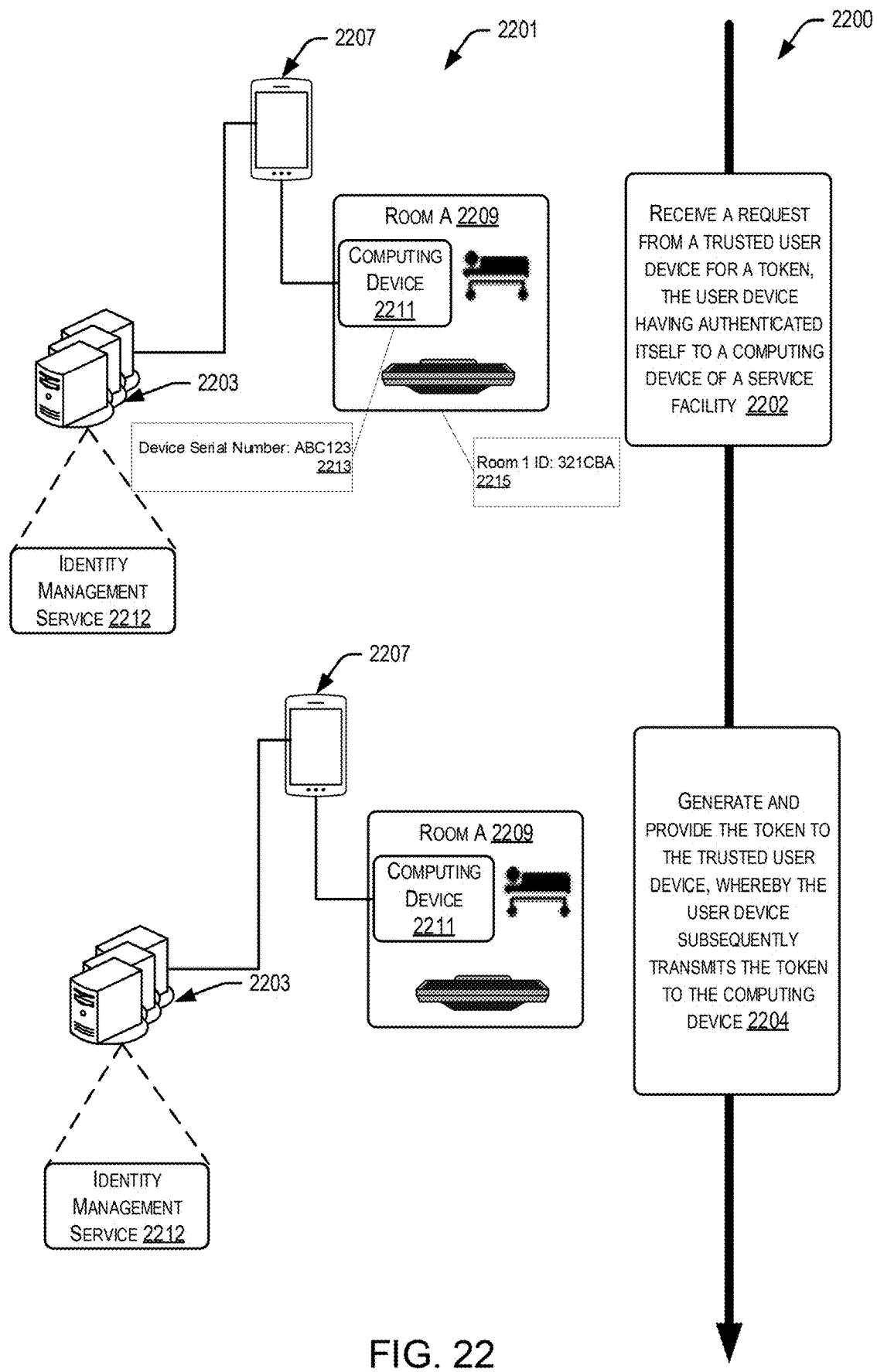
FIG. 22 is an example flowchart illustrating another process for provisioning a token to a computing device, according to at least one example.

FIG. 22 illustrates a simplified block diagram 2201 depicting an example process 2200, in accordance with at least one example. The process 2200 is another example process for assigning a computing device to a particular location within a service facility and providing a token to the computing device. In this example, instead of a headend device generating and providing a token to a computing device, a user device (e.g., a mobile device) operates as an intermediary for the computing device to procure the token on behalf of the computing device. In some embodiments, this method may enable technicians/administrators (e.g., who may carry mobile devices) to efficiently set up new computing devices throughout a service facility, as well as removing a requirement for a headend device (e.g., located at the service facility) to generate the token. Accordingly, this may simplify the infrastructure required to deploy tokens. The diagram 2201 depicts example states that correspond to the blocks of the process 2200. The diagram 2201 includes a vision management system 2203, an identity management service 2212, a user device 2207 (e.g., a mobile phone), a user room A 2209 of a particular service facility, and a computing device 2211 (e.g., a set-top box, smart TV device, etc.). In some embodiments, and, as depicted in FIG. 22, the identity management service 2212 may be a component of the vision management system 2203. In some embodiments, the identity management service 2212 may be a separate entity (e.g., a different computing system), but affiliated (e.g., associated) with the vision management system 2203 (e.g., executing as a service of the authentication system 1112 of FIG. 11). The identity management service 2212 may perform tasks that identity, authenticate, and authorize individuals and/or devices that request access to resources (e.g., computing resources, hardware resources, etc.). In one example, the identity management service 2212 may be federated identity service, whereby a person's identity is linked across multiple identity management systems.

Turning to process 2200 in further detail, at block 2202, the vision management system 2203 (e.g., and/or the identity management service 2212) may receive a request from a trusted user device for a token, whereby the user device may have authenticated itself to a computing device of a service facility. Using the diagram 2201 for illustration, and, similar to block 2102 of FIG. 21, in some embodiments, the user device 2207 may correspond to an administrator or technician mobile device. The user may be logged onto a user device application, which may have previously authenticated itself with the vision management system 2203 and/or the identity management service 2212. In some embodiments, the vision management system 2203 may trust the user device application of the user device 2207 based on any suitable authentication procedure (e.g., password-based authentication).

In one embodiment, the user device 2207 may then be positioned within a suitable close proximity to the computing device 2211. For example, the administrator may carry the user device 2207 into the room to perform one or more tasks related to registering the computing device 2211 with the vision management system 2203. The user device 2207 may be prompted to log on to a computing device application, for example, based on a suitable protocol for discovering and communicating with devices in close proximity (e.g., a Multi-peer Connectivity framework). The user device 2207 may then receive input corresponding to credentials that are utilized to log on to (e.g., authenticate itself with) the computing device 2211.

In some embodiments, and, similar to block 2102, the user device 2207 may receive input (e.g., from the administrator) to add a new entry that associates a device identifier of the computing device 2211 (e.g., computing device serial number "ABC123" 2213) with a location identifier of the room A 2209 (e.g., room A identifier "321CBA" 2215). Accordingly, the user device 2207 (e.g., the user device application) may transmit an assignment instruction that includes (I) the device identifier for the computing device (e.g., computing device 2211) and (II) the location identifier for a particular location (e.g., the room A 2209) within a service facility. The assignment instruction may instruct the vision management system 2203 to associate the computing device with the particular location.

In some embodiments, the assignment instruction that is transmitted by the user device 2207 to the vision management system 2203 may also include (and/or being transmitted alongside) a request for a token on behalf of the computing device 2211. For example, upon logging into the computing device application, the user device application of user device 2207 may transmit a request for the token. The request for the token may include any suitable information associated with the computing device 2211 (e.g., device serial number 2213). In some embodiments, the request for the token may be transmitted independently from the assignment instruction. For example, the computing device 2211 may have been previously assigned by the vision management system 2203 to the particular location. Then, subsequently, the user device 2207 may facilitate the process of ensuring that the computing device 2211 receives a token that may be later used to receive a unified data feed from the vision management system 2203. It should be understood that this mechanism for requesting and provisioning tokens may further enable embodiments to ensure that the computing device 2211 does not store sensitive information about a user and/or other sensitive credential data. In some embodiments, subsequent requests for a token may originate from the computing device 2211 and/or the user device 2207. For example, in a case where the token may be nearing expiration, the computing device 2211 may be configured to automatically request a new token from the identity management service 2212. In some embodiments, the existing token, may be used as a proof of authentication. In some embodiments, a combination of elements may be used to authenticate the computing device to receive a token (e.g., user credentials, an existing and valid token, etc.).

At block 2204, the identity management service 2212 associated with the vision management system 2203 may generate and provide the token to the trusted user device, whereby the user device subsequently transmits the token to the computing device. Continuing with the above illustration, upon receiving the request for a token, the identity management service 2212 may determine that the request is valid. For example, then identity management service 2212 may determine that the user device application of the user device 2207 that transmitted the request is properly authenticated. In some embodiments, the identity management service 2212 may also verify information about the computing device 2211. For example, the identity management service 2212 may verify the device serial number 2213 of the computing device 2211, a previously provisioned token, etc. Upon verifying that the request is valid (e.g., authenticated), the identity management service 2212 may generate a token. The token may be generated using any suitable technique, as described herein (e.g., utilizing one or more cryptographic techniques). The identity management service 2212 may then transmit the token back to the user device 2207. The user device 2207 may then transmit the token to the computing device 2211. For example, the user device application may receive the token from the identity management service 2212, and then pass that data to the computing device application of the computing device 2211, which was previously logged into (e.g., utilizing multi-peer connectivity), as described above. The computing device 2211 may then store the token for subsequent use in requesting a unified data feed from the vision management system 2203.

Figure 23:
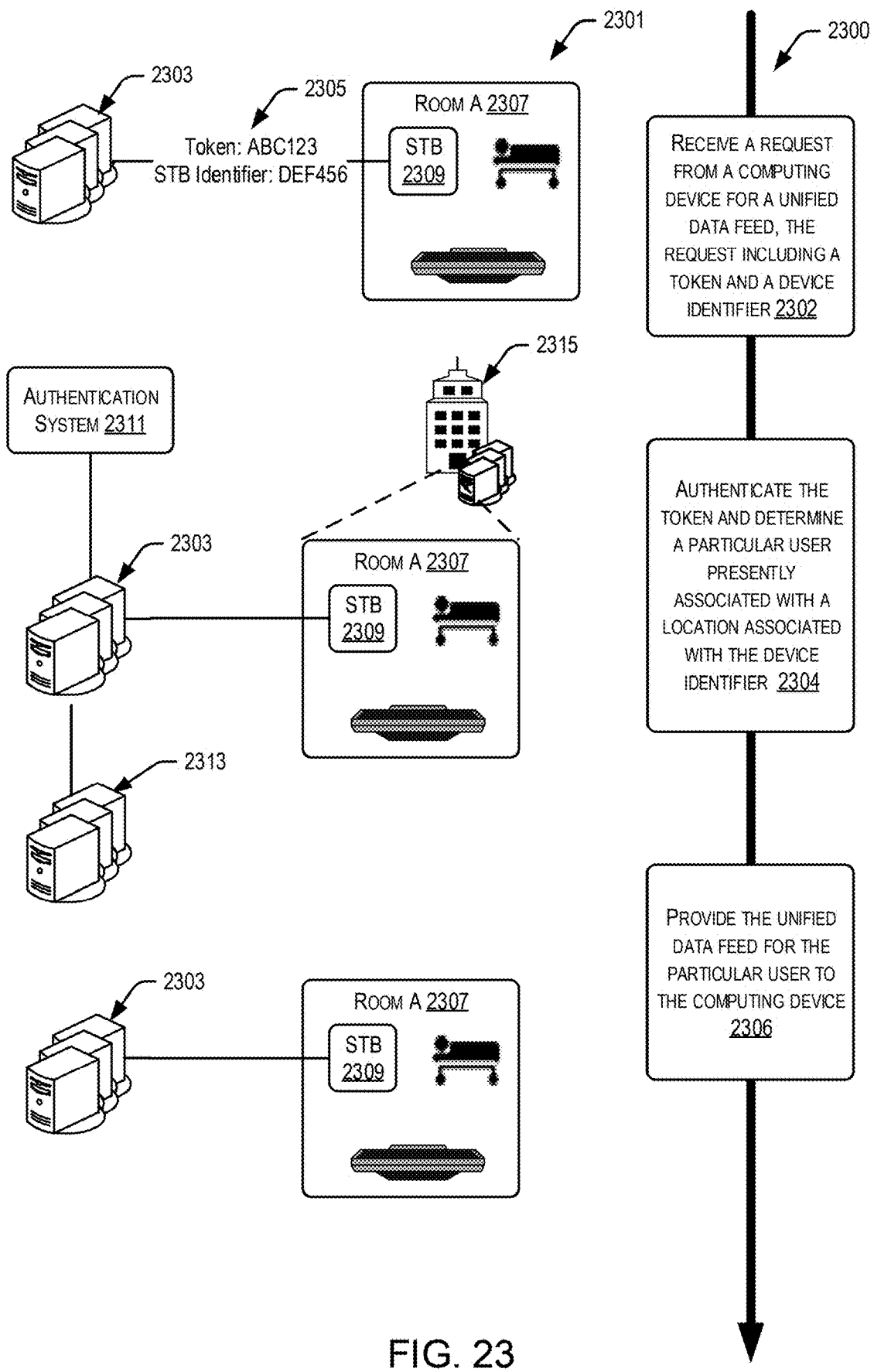
FIG. 23 is an example flowchart illustrating another process for providing a unified data feed to a computing device based on a verified (e.g., authenticated) token, according to at least one example.

FIG. 23 illustrates a simplified block diagram 2301 depicting an example process 2300, in accordance with at least one example. The process 2300 is an example process for providing a unified data feed to a device at a particular location based on a token authentication. In some embodiments, the process for assigning the computing device to the particular location and providing the token (e.g., for storage on the computing device) may be completed prior to the computing device receiving the unified data feed from a vision management system (e.g., see FIGS. 21 and 22, described above). The diagram 2301 depicts example states that correspond to the blocks of the process 2300. The diagram 2301 includes a vision management system 2303 (e.g., which may be similar any of the vision management systems described herein), a user room A 2307 of a particular service facility 2315, a computing device (e.g., set-top box 2309), an authentication system 2311 (e.g., similar to authentication system 1112 of FIG. 11), and a user processing system 2313 (e.g., similar to the ADT feed system 1136 of FIG. 11).

Turning to process 2300 in further detail, at block 2302, the vision management system 2303 may receive a request from a computing device for a unified data feed, whereby the request includes a token and a device identifier of the computing device. For example, as illustrated in diagram 2301, request 2305 includes "Token: ABC123" and "set-top box identifier: DEF456," which may, respectively, correspond to any suitable sequence of alphanumeric characters and/or bits. As described above, the device identifier may have been previously associated with the particular location (e.g., room A 2307). In some embodiments, the request 2305 may be independent of a particular user presently receiving service at the particular location. For example, note that there is no user specific information included in the request 2305 for the unified data feed. In some embodiments, the request 2305 may be transmitted at any suitable time and/or cadence. For example, as described herein, the vision management system 2303 may have previously transmitted a message to the set-top box 2309 that indicates that an update is available for presentation. The set-top box 2309 may then send the request 2305 for the update to the unified data feed upon receiving the update indication from the vision management system 2303. It should be understood that the token may be a valid token that has not expired. If the token had expired, a request for another token may be generated (e.g., see FIG. 21) prior to transmitting the request for the unified data feed at block 2302.

At block 2304, the vision management system 2303 may authenticate the token and determine the particular user that is presently associated with the particular location associated with the device identifier. For example, continuing with the illustration above, the vision management system 2303 may first validate that the token is valid (e.g., authenticated). In one embodiment, upon receiving the request 2305, the vision management system 2303 may transmit the token to the authentication system 2311 (e.g., via an API call). The authentication system 2311 may perform the authentication on behalf of the vision management system 2303. For example, the authentication system 2311 may decrypt the token (e.g., assuming the token was encrypted) using known keys that are managed by the authentication system 2311. The authentication system 2311 may then validate the token, and return a success (or failure) result to the vision management system 2303. Assuming that the authentication is valid, the vision management system 2303 may then determine the particular user that is presently assigned to the particular location. For example, the vision management system 2303 may execute an API call to the user processing system 2313, with the device identifier as an input parameter to the API call. The user processing system 2313 may return a result including a user identifier of the particular user who is receiving service at the particular location (e.g., room A 2307) to which the set-top box 2309 is assigned. In another embodiment, the vision management system 2303 may receive regular updates from the user processing system 2313 so that the vision management system 2303 keeps track of a real-time status for each user. In this example, upon receiving the request 2305, the vision management system 2303 may determine the particular user that is currently being serviced in that room (e.g., based on a correlating the device identifier with an internal data store that includes the user identifier of the user currently being serviced at the particular location).

At block 2306, the vision management system 2303 may provide the unified data feed for the particular user to the computing device. For example, as described herein (e.g., in reference to FIGS. 12 and 14), the vision management system 2303 may retrieve data (e.g., first data, second data, etc.) from a data source (e.g., a first data source, a second data source, etc.) of a plurality of data sources. The vision management system 2303 may then generate the unified data feed that includes the data from the data source. The vision management system 2303 may then provide the unified data feed to the computing device for presentation at a display that is communicatively connected to the computing device at the particular location. Accordingly, embodiments herein describe both an efficient mechanism for provisioning tokens to a computing device, and for utilizing the token (e.g., which may not include user-specific information) to receive a unified data feed.

Figure 24:
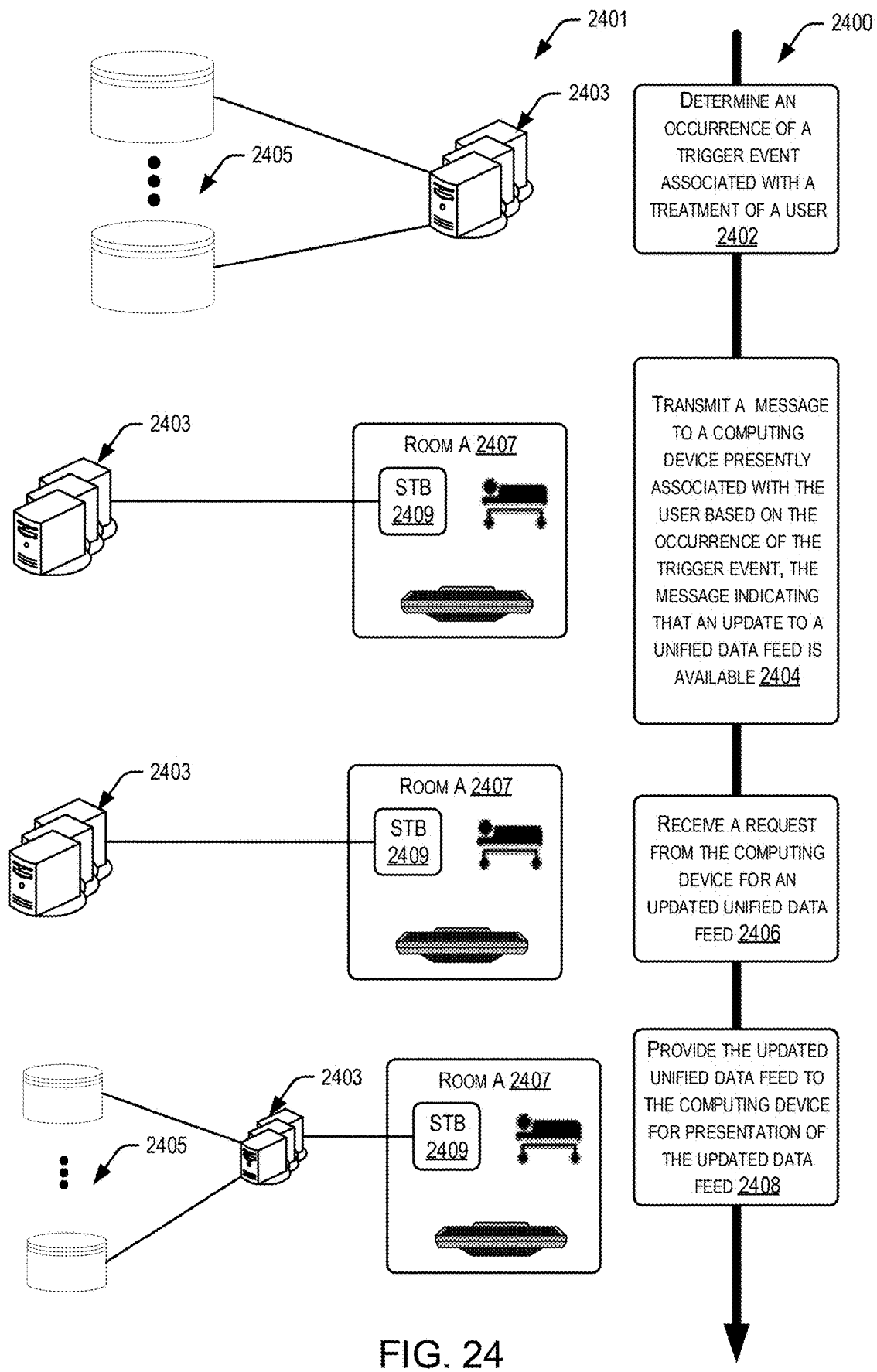
FIG. 24 illustrates another example graphical user interface for providing an updated unified data feed to a computing device based on determining an occurrence of a trigger event, according to at least one example.

FIG. 24 illustrates a simplified block diagram 2401 depicting an example process 2400 in accordance with at least one example. The process 2400 is an example process for providing a real-time update to a unified data feed based on an occurrence of at least one trigger event. In this example process, a vision management system may already be providing a unified data feed associated with a particular user to a particular computing device. The vision management system may receive respective indications from one or more data sources about a real-time update, and then provide an updated unified data feed to the computing device for presentation. The diagram 2401 depicts example states that correspond to the blocks of the process 2400. The diagram 2401 includes a vision management system 2403 (e.g., which may be similar any of the vision management systems described herein), one or more data sources 2405 (e.g., similar to the one or more data sources 1211 of FIG. 12, a user room A 2407 of a particular service facility 2115, and a computing device (e.g., set-top box 2409) assigned to the user room A 2407.

Turning to process 2400 in further detail, at block 2402, the vision management system 2403 may determine an occurrence of a trigger event associated with a service of a user. For example, the vision management system 2403 may receive an indication from at least one data source 2405 indicating that a trigger event has occurred. In some embodiments, the trigger event may correspond to any suitable event associated with the service of the user, including, but not limited to, an update to the user's vital statistics, an updated test result being available, an entrance into the admitted room (e.g., room A 2407) by a USP that is caring for the user (e.g., based on an update from the RTLS data API 1134), an update corresponding to the status of a service equipment (e.g., becoming available), an update to the user's daily schedule, etc. It should be understood that multiple trigger events may occur in close temporal proximity to each other (e.g., substantially at the same time). For example, multiple vital statistics may be continuously updated in parallel, each statistic update corresponding to a trigger event. In some embodiments, the vision management system 2403 may maintain one or more queues may be associated with processing different types of data incoming from different data sources. For example, one user statistic (e.g., weight, gender) may not require real-time updates to be presented. However, another user statistic (e.g., heart rate, blood pressure, temperature) may necessitate real-time updates. In some embodiments, different queues may be respectively associated with processing data with a particular priority. For example, one queue may have an elevated priority for handling events that should be processed and/or presented in real-time, while another queue may have a lower priority, associated with events that may not necessitate real-time processing or presentation. The vision management system 2403 may determine to pull data from queues as needed, to ensure that traffic flow that require high priority (e.g., real-time updates) are timely serviced.

At block 2404, the vision management system 2403 may transmit a message to a computing device (e.g., set-top box 2409) presently associated with the user based on the occurrence of the one or more trigger events. The message may correspond to an indication that an update to a unified data feed is available. In some embodiments, one or more operations of this block may be similar to those of block 1202 of FIG. 12. For example, the computing device may be assigned to room A 2407, and the user may also be presently admitted to room A 2407 for service. Accordingly, the vision management system 2403 may determine to transmit the message to the particular computing device (e.g., set-top box 2409).

At block 2406, the vision management system 2403 may receive a request from the computing device for an updated unified data feed. In some embodiments, the operations from this block may be similar to other blocks described herein (e.g., block 1204 of FIG. 12, block 1402 of FIG. 14). In some embodiments, the request may indicate that only an update to the current unified data feed being presented is required. In some embodiments, the computing device may determine to only request an update for certain data elements. For example, if a particular screen (e.g., showing the user's vital statistics) is being displayed, an update for resource availability may not be required for presentation. It should be understood that the computing device may request any suitable data for presentation. Note that, although the computing device may determine which data elements to request, the computing device may still not store user-specific data.

At block 2408, the vision management system 2403 may provide the updated unified data feed to the computing device for presentation of the updated unified data feed. In some embodiments, the operations from this block may be similar to other blocks described herein (e.g., block 1208, block 1406, block 2306). For example, the vision management system 2403 may subsequently retrieve data from the one or more data sources corresponding to the trigger event, generate the update to the unified data feed (e.g., utilizing an appropriate schema to package the update), and then provide the updated feed. In some embodiments, the one or more data sources may push data to the vision management system 2403. In some embodiments, the vision management system 2403 may pull data from the one or more data sources. Similarly, in some embodiments, the computing device (e.g., set-top box 2409) may pull data from the vision management system 2403 even without first receiving an indication of an update. For example, the set-top box 2409 may poll the vision management system 2403 on a predefined cadence, for example, if the set-top box 2409 knows that real-time updates from a particular data source should be continuously available for presentation (e.g., within a particular viewing screen).

Figure 25:
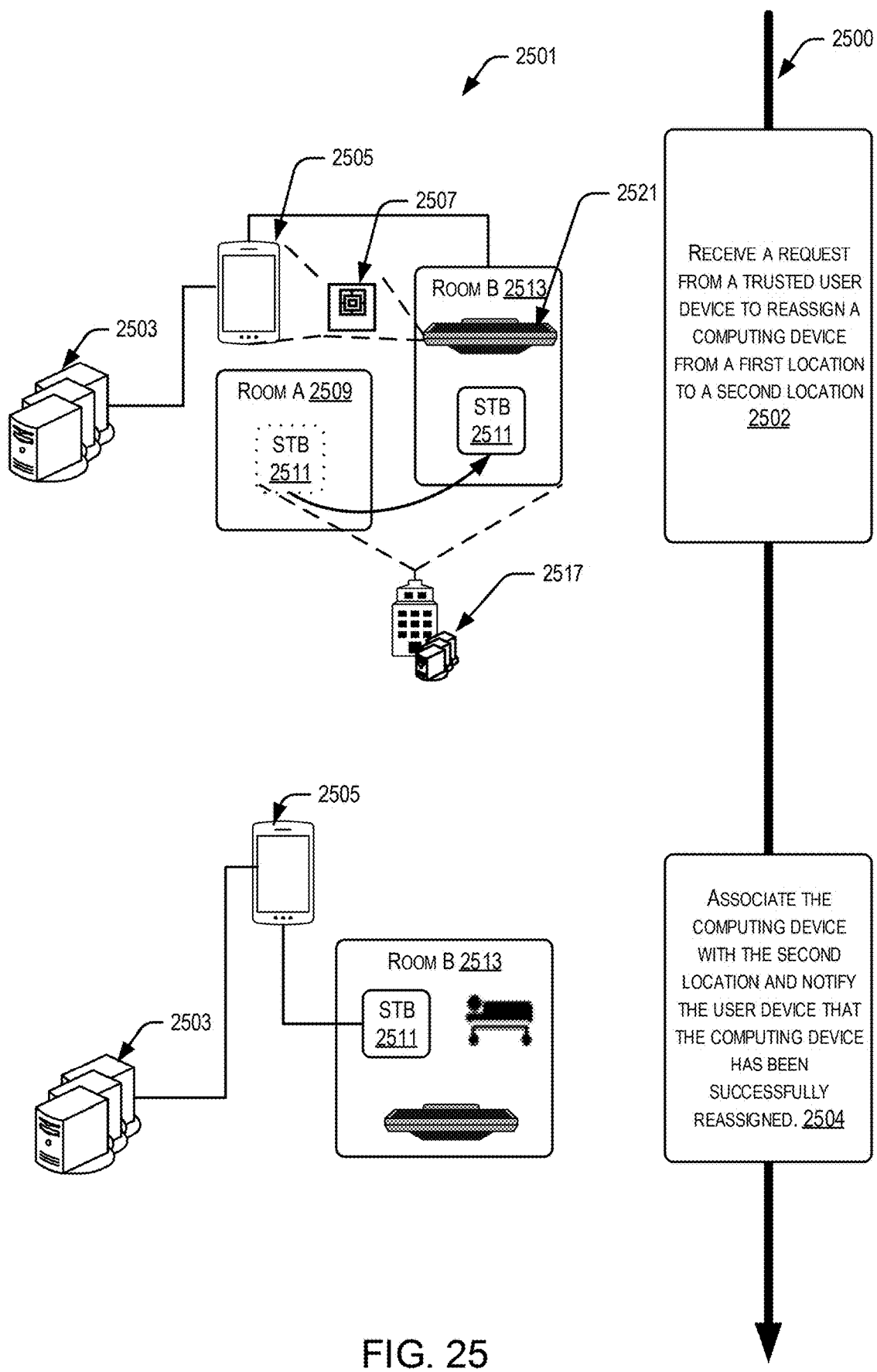
FIG. 25 illustrates an example flowchart for assigning a computing device with a new location, according to at least one example.

FIG. 25 illustrates a simplified block diagram depicting an example process 2500, in accordance with at least one example. The process 2500 is an example process for reassigning a computing device to a new location of a service facility. Although the process 2500 is directed towards reassigning a computing device to a different location from a previous location, it should be understood that a similar process may be employed for assigning a computing device to an original location (e.g., in a service facility). The diagram 2501 depicts example states that correspond to the blocks of the process 2500. The diagram 2501 includes a vision management system 2503 (e.g., which may be similar any of the vision management systems described herein), a user device 2505 (e.g., a mobile device such as a mobile phone or tablet), a first location in a service facility 2517 (e.g., room A 2509), a computing device (e.g., set-top box 2511) within the first (old) location (e.g., indicated by the dotted line enclosure), a second (new) location in the service facility 2517 (e.g., room B 2513), the computing device having been transferred to the second location (e.g., indicated by the solid line enclosure), a display device 2521 that is communicatively connected to the set-top box 2511, and a Quick Response (QR) code 2507 that may be displayed on the display device 2521.

Turning to process 2500 in further detail, at block 2502, the vision management system 2503 may receive a request from a trusted user device to reassign a computing device from a first location to a second location. Using the diagram 2501 for illustration, computing device (e.g., set-top box 2511) may have been physically transported from room A 2509 (e.g., the first location) to room B 2513 (e.g., the second location) within the service facility 2517. Upon being positioned in room B 2513, the set-top box 2511 may be communicatively connected to display device 2521. In some embodiments, the set-top box 2515 and/or display device 2521 may receive input that causes a QR code (or other suitable identifier, such as a pattern) to be displayed on the display device 2521. For example, a remote control device may receive input corresponding to a unique combination of button presses (e.g., 7+1+1++1, or the like). The remote control may then transmit a signal to the set-top box 2511 or display device 2521, which may then cause a QR code to be displayed on the display device 2521.

Meanwhile, an application executing on the user device 2505 may receive input that corresponds to credentials (e.g., administrator credentials) to log on to the application. In one embodiment, upon logging on to the application, the application may cause an input sensor of the user device (e.g., a camera component of the user device 2505) to capture and/or scan the QR code that is displayed on the display device 2521. Once the application receives data corresponding to a unique device identifier of the set-top box 2511, the application may prompt a user of the application to reassign the set-top box 2515 to a new location (e.g., room and/or bed) within the service facility. In some embodiments, the set-top box 2515 may be assigned to another service facility within the service organization. The application may thus receive any suitable input to choose, for example, the new unit, room, bed, etc., which may correspond to the new assigned location. The application may then transmit a request (e.g., via an API call to the vision management system 2503 API) that includes this information (e.g., including the device identifier of the set-top box 2511 and the new location identifier(s) of the new location).

Although, in this example, a QR code was used to illustrate a mechanism for efficiently determining a device identifier, and then using that identifier as input to initiate a request for reassignment, embodiments should not be construed to be so limited. For example, in another embodiments, instead of a QR code, audio patterns may be used to identify and/or recognize the device identifier. In another example, moving unique patterns displayed on the screen may be used to identify and/or recognize the device identifier.

In some embodiments, depending on the context for the reassignment, the request may include a request for a new token for the set-top box 2511. For example, suppose that the set-top box 2511 is moved to a different service facility, with a different headend device (e.g., see FIG. 21) associated with the new service facility. In this case, a new token may be required. In some embodiments, a new token may not be required.

At block 2504, the vision management system 2503 may associate the computing device with the second location and then transmit a message to the user device 2505 to notify the user that the set-top box 2511 has been successfully reassigned. For example, as described herein, the vision management system 2503 may store an association between the set-top box 2511 and the second location. In some embodiments, this association may be generated based in part on confirming that the user device is trusted (e.g., authenticated). For example, as noted above, an application of the user device may be logged into and trusted by the vision management system 2503, whereby the application transmits a request (e.g., an encrypted request) for reassignment. In some embodiments, in addition to storing the new association between the set-top box 2511 and the second location, the vision management system 2503 and/or an affiliated server device (e.g., authentication system 1112 of FIG. 11, which may include a federated identity management system) may determine that a new token should be generated for the set-top box 2511. The server device may generate the new token based in part on determining that the user device is authenticated and that an original token should be updated based at least in part on the second (new) location. The vision management system 2503 may then provide a response to the user device 2505, indicating that the set-top box 2511 was successfully reassigned to the second location. In some embodiments, where a new token is also generated, the response may include the new token. As described herein, the new token may be subsequently used by the set-top box 2511 for authenticating the set-top box 2511 with the vision management system 2503 (and/or affiliated authentication system) to receive a unified data feed at the second location.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction (s) and/or data.

While the principles of the disclosure have been described above in connection with specific apparatuses and methods, it is to be clearly understood that this description is made only by way of example and not as limitation on the scope of the disclosure.

What is claimed is:
1. A computer-implemented method, comprising:
 maintaining, by a computer system, an association between a device identifier of a computing device and a location identifier of a particular location of a service facility, the computing device being assigned to the particular location of the service facility and communicatively connected to a display at the particular location;

receiving, by the computer system, a request from the computing device for a unified data feed corresponding to the particular location, the request being independent of a particular user presently being serviced at the particular location and including a device identifier of the computing device;

retrieving, by the computer system from a user processing service, a user identifier that identifies a user that is currently being serviced at the particular location, the user processing service storing real-time data that associates the user currently being serviced with the location identifier;

determining, by the computer system, that the particular user is the user presently being serviced at the particular location;

retrieving, by the computer system, first data and second data associated with the servicing of the particular user, respectively from a first data source and a second data source of a plurality of data sources, the first data source being distinct from the second data source, the plurality of data sources respectively including at least one of: (I) a dietary data service, (II) a real-time location system (RTLS) service, (III) a user data service, (IV) a user education content service, or (V) an entertainment content service;

generating, by the computer system, a unified data feed that includes at least the first data and the second data, the unified data feed including parameters for formatting and presenting a home screen on the display, the home screen displaying at least one of (I) content derived from the first data or the second data, or (II) a selectable element that is associated with displaying additional content associated with the first data or the second data;

providing, by the computer system, the unified data feed to the computing device for presentation of the home screen at the display at the particular location;

receiving, by the computer system, a second request from the computing device for a second unified data feed corresponding to the particular location;

generating, by the computer system, the second unified data feed for a second user that is currently being serviced at the particular location;

providing, by the computer system, the second unified data feed to the computing device for presentation of the home screen at the display at the particular location;

receiving, by the computer system, traffic data, respectively, from one or more computing devices of a plurality of computing devices of the service facility, the plurality of computing devices including the computing device and respectively assigned to a particular unique location within the service facility, the respective traffic data associated with a data feed between the respective one or more computing devices and a third-party service;

analyzing, by the computer system, the respective traffic data from each of the one or more computing devices to determine a respective level of quality of network service between the one or more computing devices and the third-party service;

determining, by the computer system and based on analyzing the traffic data, a network traffic pattern, the network traffic pattern indicating that a portion of the one or more computing devices has a lower quality of network service compared to other computing devices of the one or more computing devices that interact with the third-party service;

determining, by the computer system, the particular unique location for each computing device of the portion of the one or more computing devices within the service facility;

determining, by the computer system, that the network traffic pattern of the portion of the one or more computing devices is localized to a particular region within the service facility based at least in part on the particular unique location for each computing device of the portion of the one or more computing devices; and transmitting, by the computer system, a message to a user device for presentation by the user device, the message providing instructions for performing maintenance service targeting the particular region of the service facility.

2. The computer-implemented method of claim 1, further comprising:

determining, by a user classification model of the computer system, a user classification of the particular user, the user classification determined based at least in part on at least one of: (I) a user record of the particular user or (II) previous interactions by the particular user with the computer system, and wherein the unified data feed is generated based at least in part on the user classification, the user classification indicating at least one of: (I) a graphical user interface (GUI) customization according to a user type of the particular user or (II) a particular data content that is relevant for the particular user.

3. The computer-implemented method of claim 2, wherein the user classification model comprises a machine learning model trained based at least in part on: (I) user data of a plurality of users, and (II) previous interactions with the computer system by each of the plurality of users.

4. The computer-implemented method of claim 1, further comprising:

receiving, by the computer system from a user processing service, an indication that the particular user who is receiving service at the particular location of the service facility will likely be discharged within a predetermined time interval; and including, by the computer system within the unified data feed, data associated with the predetermined time interval, wherein the home screen displays content based at least in part on the predetermined time interval.

5. The computer-implemented method of claim 4, further comprising:

receiving, by the computer system, a message from the computing device, the message corresponding to an interaction by the particular user with the content presented at the display, the interaction corresponding to at least one of: (I) an acknowledgment by the particular user that they have reviewed information associated with the discharge of the particular user, or (II) a request by the particular user for follow-up service;

updating, by the computer system, a user record of the particular user based at least in part on the message; and terminating, by the computer system, the unified data feed to the computing device based at least in part upon receiving a second indication from the user processing service indicating that the particular user has been discharged from the service facility.

6. A computer system, comprising:
  a memory configured to store computer-executable instructions; and
  a processor configured to access the memory and execute the computer-executable instructions to at least:
    maintain an association between a device identifier of a computing device and a location identifier of a particular location of a service facility, the computing device being assigned to the particular location of the service facility and communicatively connected to a display at the particular location;
    receive a request from the computing device for a unified data feed corresponding to a particular location, the request being independent of a particular user presently being serviced at the particular location and including a device identifier of the computing device;
    retrieve, from a user processing service, a user identifier that identifies a user that is currently being serviced at the particular location, the user processing service storing real-time data that associates the user currently being serviced with the location identifier;
    determine that the particular user is the user presently being serviced at the particular location;
    retrieve first data and second data associated with the servicing of the particular user, respectively from a first data source and a second data source of a plurality of data sources, the first data source being distinct from the second data source, the plurality of data sources respectively including at least one of: (I) a dietary data service, (II) a real-time location system (RTLS) service, (III) a user data service, (IV) a user education content service, or (V) an entertainment content service;
    generate a unified data feed that includes at least the first data and the second data, the unified data feed including parameters for formatting and presenting a home screen on the display, the home screen displaying at least one of (I) content derived from the first data or the second data, or (II) a selectable element that is associated with displaying additional content associated with the first data or the second data;
    provide the unified data feed to the computing device for presentation of the home screen at the display at the particular location;
    receive a second request from the computing device for a second unified data feed corresponding to the particular location;
    generate the second unified data feed for a second user that is currently being serviced at the particular location;
    provide the second unified data feed to the computing device for presentation of the home screen at the display at the particular location;
    receive traffic data, respectively, from one or more computing devices of a plurality of computing devices of the service facility, the plurality of computing devices including the computing device and respectively assigned to a particular unique location within the service facility, the respective traffic data associated with a data feed between the respective one or more computing devices and a third-party service;
    analyze the respective traffic data from each of the one or more computing devices to determine a respective level of quality of network service between the one or more computing devices and the third-party service;
    determine based on analyzing the traffic data, a network traffic pattern, the network traffic pattern indicating that a portion of the one or more computing devices has a lower quality of network service compared to other computing devices of the one or more computing devices that interact with the third-party service;
    determine the particular unique location for each computing device of the portion of the one or more computing devices within the service facility;
    determine that the network traffic pattern of the portion of the one or more computing devices is localized to a particular region within the service facility based at least in part on the particular unique location for each computing device of the portion of the one or more computing devices; and
    transmit a message to a user device for presentation by the user device, the message providing instructions for performing maintenance service targeting the particular region of the service facility.

7. The computer system of claim 6, wherein the processor is further configured to access the memory and execute additional instructions to, at least:
  receive an assignment instruction that includes (I) a device identifier for the computing device and (II) a location identifier for the particular location within the service facility, the assignment instruction instructing the computer system to associate the computing device with the particular location;
  store an association between the computing device and the particular location;
  receive, by a headend device of the computer system from the computing device, a request for a token, the token being operable for subsequently verifying the computing device to receive a data feed at the particular location;
  determine, by the headend device, that the computing device is physically located within the service facility based at least in part on determining that the request was transmitted over a local network managed by the headend device and associated with the service facility; and
  provide the token to the computing device based at least in part on determining that the computing device is physically located within the service facility.

8. The computer system of claim 6, wherein the request includes a token and a device identifier of the computing device, the device identifier having been previously associated with the particular location, and wherein the processor is further configured to access the memory and execute additional instructions to, at least:
  verifying the token received from the computing device, wherein the unified data feed is provided to the computing device based at least in part on a successful verification.

9. The computer system of claim 6, wherein the processor is further configured to access the memory and execute additional instructions to, at least:
  receive a first indication of a trigger event occurrence, the trigger event occurrence associated with the servicing of the particular user at the particular location of the service facility; and
  transmit a second indication of the trigger event occurrence to the computing device assigned to the particular location, wherein the request is sent by the computing device to the computer system based at least in part on receiving the second indication of the trigger event occurrence.

10. The computer system of claim 6, wherein the particular location corresponds to a first location within the service facility, and wherein the processor is further configured to access the memory and execute additional instructions to, at least:
receive a second request from user device previously verified by the computer system, the second request requesting to reassign the computing device from the first location to a second location within the service facility, the request including (I) a device identifier of the computing device that is obtained by the user device using an input sensor of the user device, and (II) a second location identifier of the second location within the service facility; and
store an association between the computing device and the second location based at least in part on determining that the user device is verified by the computer system.

11. The computer system of claim 10, wherein the processor is further configured to access the memory and execute additional instructions to, at least:
generate, by a server device of the computer system, a new token based at least in part on determining that the user device is verified and that an original token should be updated based at least in part on the second location; and
provide a response to the user device indicating that the computing device was successfully reassigned to the second location, the response including the new token for subsequent transmission by the user device to the computing device, the new token operable for subsequently verifying the computing device with the computer system to receive a data feed at the second location.

12. The computer system of claim 6, wherein the processor is further configured to access the memory and execute additional instructions to, at least:
determine, by a user classification model of the computer system, a user classification of the particular user, the user classification determined based at least in part on at least one of: (I) a user record of the particular user or (II) previous interactions by the particular user with the computer system, and wherein the unified data feed is generated based at least in part on the user classification, the user classification indicating at least one of: (I) a graphical user interface (GUI) customization according to a user type of the particular user or (II) a particular data content that is relevant for the particular user.

13. The computer system of claim 12, wherein the processor is further configured to access the memory and execute additional instructions to, at least:
receive first training data samples corresponding to a first subset of user data records of users of a plurality of service facilities affiliated with a service organization;
train, in a first training round, the user classification model utilizing the first training data samples;
receive second training data samples corresponding to a second subset of user data records of users of the service facility, the second subset being a subset of the first subset; and
train, in a second training round, the user classification model utilizing the second training data samples.

14. One or more non-transitory computer-readable storage devices comprising computer-executable instructions that, when executed by one or more computer systems of a computer system, cause the one or more computer systems to perform operations, comprising:
maintaining an association between a device identifier of a computing device and a location identifier of a particular location of a service facility, the computing device being assigned to the particular location of the service facility and communicatively connected to a display at the particular location;
receiving a request from the computing device for a unified data feed corresponding to the particular location, the request being independent of a particular user presently being serviced at the particular location and including a device identifier of the computing device;
retrieving, from a user processing service, a user identifier that identifies a user that is currently being serviced at the particular location, the user processing service storing real-time data that associates the user currently being serviced with the location identifier;
determining that the particular user is the user presently being serviced at the particular location;
retrieving first data and second data associated with the servicing of the particular user, respectively from a first data source and a second data source of a plurality of data sources, the first data source being distinct from the second data source, the plurality of data sources respectively including at least one of: (I) a dietary data service, (II) a real-time location system (RTLS) service, (III) a user data service, (IV) a user education content service, or (V) an entertainment content service;
generating a unified data feed that includes at least the first data and the second data, the unified data feed including parameters for formatting and presenting a home screen on the display, the home screen displaying at least one of (I) content derived from the first data or the second data, or (II) a selectable element that is associated with displaying additional content associated with the first data or the second data;
providing the unified data feed to the computing device for presentation of the home screen at the display at the particular location;
receiving a second request from the computing device for a second unified data feed corresponding to the particular location;
generating the second unified data feed for a second user that is currently being serviced at the particular location;
providing the second unified data feed to the computing device for presentation of the home screen at the display at the particular location;
receiving, by the computer system, traffic data, respectively, from one or more computing devices of a plurality of computing devices of the service facility, the plurality of computing devices including the computing device and respectively assigned to a particular unique location within the service facility, the respective traffic data associated with a data feed between the respective one or more computing devices and a third-party service;
analyzing, by the computer system, the respective traffic data from each of the one or more computing devices to determine a respective level of quality of network service between the one or more computing devices and the third-party service;

determining, by the computer system and based on analyzing the traffic data, a network traffic pattern, the network traffic pattern indicating that a portion of the one or more computing devices has a lower quality of network service compared to other computing devices of the one or more computing devices that interact with the third-party service;

determining, by the computer system, the particular unique location for each computing device of the portion of the one or more computing devices within the service facility;

determining, by the computer system, that the network traffic pattern of the portion of the one or more computing devices is localized to a particular region within the service facility based at least in part on the particular unique location for each computing device of the portion of the one or more computing devices; and transmitting, by the computer system, a message to a user device for presentation by the user device, the message providing instructions for performing maintenance service targeting the particular region of the service facility.

15. The one or more non-transitory computer-readable storage devices of claim 14, further comprising additional instructions that, when executed by the one or more computer systems, cause the one or more computer systems to perform additional operations comprising:

determining, by a user classification model of the computer system, a user classification of the particular user, the user classification determined based at least in part on at least one of: (I) a user record of the particular user or (II) previous interactions by the particular user with the computer system, and wherein the unified data feed is generated based at least in part on the user classification, the user classification indicating at least one of: (I) a graphical user interface (GUI) customization according to a user type of the particular user or (II) a particular data content that is relevant for the particular user.

16. The one or more non-transitory computer-readable storage devices of claim 15, wherein the user classification model comprises a machine learning model trained based at least in part on: (I) user data of a plurality of users, and (II) previous interactions with the computer system by each of the plurality of users.

17. The one or more non-transitory computer-readable storage devices of claim 14, further comprising additional instructions that, when executed by the one or more computer systems, cause the one or more computer systems to perform additional operations comprising:

receiving from a user processing service, an indication that the particular user who is receiving service at the particular location of the service facility will likely be discharged within a predetermined time interval; and including, within the unified data feed, data indicating the predetermined time interval, wherein the home screen displays content based at least in part on the predetermined time interval.

18. The one or more non-transitory computer-readable storage devices of claim 17, further comprising additional instructions that, when executed by the one or more computer systems, cause the one or more computer systems to perform additional operations comprising:

receiving a message from the computing device, the message corresponding to an interaction by the particular user with the content presented at the display, the interaction corresponding to at least one of: (I) an acknowledgment by the particular user that they have reviewed information associated with the discharge of the particular user, or (II) a request by the particular user for follow-up service;

updating a user record of the particular user based at least in part on the message; and terminating the unified data feed to the computing device based at least in part upon receiving a second indication from the user processing service indicating that the particular user has been discharged from the service facility.

19. The one or more non-transitory computer-readable storage devices of claim 14, further comprising additional instructions that, when executed by the one or more computer systems, cause the one or more computer systems to perform additional operations comprising:

receiving an assignment instruction that includes (I) a device identifier for the computing device and (II) a location identifier for the particular location within the service facility, the assignment instruction instructing the computer system to associate the computing device with the particular location;

storing an association between the computing device and the particular location;

receiving, by a headend device of the computer system from the computing device, a request for a token, the token being operable for subsequently authenticating the computing device to receive a data feed at the particular location;

determining, by the headend device, that the computing device is physically located within the service facility based at least in part on determining that the request was transmitted over a local network managed by the headend device and associated with the service facility; and providing the token to the computing device based at least in part on determining that the computing device is physically located within the service facility.

* * * * *